(12) United States Patent
Regani et al.

(10) Patent No.: US 12,493,666 B2
(45) Date of Patent: Dec. 9, 2025

(54) WIRELESS SENSING USING CLASSIFIER PROBING AND REFINEMENT

(71) Applicants: Sai Deepika Regani, Campbell, CA (US); Beibei Wang, Clarksville, MD (US); K. J. Ray Liu, Potomac, MD (US); Oscar Chi-Lim Au, Rockville, MD (US)

(72) Inventors: Sai Deepika Regani, Campbell, CA (US); Beibei Wang, Clarksville, MD (US); K. J. Ray Liu, Potomac, MD (US); Oscar Chi-Lim Au, Rockville, MD (US)

(73) Assignee: ORIGIN RESEARCH WIRELESS, INC., Rockville, MD (US)

( * ) Notice: Subject to any disclaimer, the term of this patent is extended or adjusted under 35 U.S.C. 154(b) by 0 days.

(21) Appl. No.: 18/991,632

(22) Filed: Dec. 22, 2024

(65) Prior Publication Data

US 2025/0124110 A1   Apr. 17, 2025

Related U.S. Application Data

(63) Continuation-in-part of application No. PCT/US2022/045708, filed on Oct. 4, 2022, and a
(Continued)

(51) Int. Cl.
*G06F 18/241* (2023.01)

(52) U.S. Cl.
CPC .................................. *G06F 18/241* (2023.01)

(58) Field of Classification Search
CPC ........ G01S 13/003; G01S 7/415; G01S 7/006; G01S 13/56; G01S 13/88; G01S 13/86; G01S 7/417; G01S 2013/462; G01S 13/343; G01S 13/42; G01S 13/584; G01S 13/886; G01S 5/0273; G01S 5/0252; G01S 5/0278; G01S 5/06; G01S 11/06; G01S 13/04; G01S 13/284; G01S 13/34; G01S 13/44; G01S 13/46; G01S 13/52; G01S 13/582;
(Continued)

(56) References Cited

U.S. PATENT DOCUMENTS 10,318,890 B1 * 6/2019 Kravets ................... G01S 7/415
10,565,860 B1 * 2/2020 Omer ....................... G08B 29/24
(Continued)

*Primary Examiner* — Zhiyu Lu

(57) ABSTRACT

Wireless sensing using classifier probing and refinement is described. In one example, a described method comprises: computing output analytics by a classifier based on input data constructed based on raw measurement data; mapping each output analytics to a respective mapped outcome; identifying at least one reference input data each associated with a reference output analytics and a reference mapped outcome; each reference input data being one of the input data for the classifier for which a respective reference outcome is available and is different from the reference mapped outcome; and for each reference input data for the classifier: computing a respective plurality of perturbed output analytics by the classifier, generating selected perturbed input data based on the plurality of perturbed output analytics; and re-training the classifier based on the selected perturbed input data and the associated reference outcome.

30 Claims, 15 Drawing Sheets

Related U.S. Application Data continuation-in-part of application No. 18/401,681, filed on Jan. 1, 2024, and a continuation-in-part of application No. 18/401,684, filed on Jan. 1, 2024, and a continuation-in-part of application No. 18/395,544, filed on Dec. 23, 2023, and a continuation-in-part of application No. 18/395,537, filed on Dec. 23, 2023, and a continuation-in-part of application No. 18/395,543, filed on Dec. 23, 2023, and a continuation-in-part of application No. 18/395,539, filed on Dec. 23, 2023, and a continuation-in-part of application No. 18/395,533, filed on Dec. 23, 2023, and a continuation-in-part of application No. 18/379,622, filed on Oct. 12, 2023, and a continuation-in-part of application No. 18/199,963, filed on May 21, 2023, and a continuation-in-part of application No. 18/108,563, filed on Feb. 10, 2023, and a continuation-in-part of application No. 17/960,080, filed on Oct. 4, 2022, and a continuation-in-part of application No. 17/959,487, filed on Oct. 4, 2022, and a continuation-in-part of application No. 17/537,432, filed on Nov. 29, 2021, and a continuation-in-part of application No. 17/149,625, filed on Jan. 14, 2021, and a continuation-in-part of application No. 17/838,244, filed on Jun. 12, 2022, and a continuation-in-part of application No. 17/838,231, filed on Jun. 12, 2022, and a continuation-in-part of application No. 17/838,228, filed on Jun. 12, 2022, and a continuation-in-part of application No. 17/827,902, filed on May 30, 2022.

(60) Provisional application No. 63/614,621, filed on Dec. 24, 2023, provisional application No. 63/721,406, filed on Nov. 15, 2024, provisional application No. 63/651,921, filed on May 24, 2024.

(58) Field of Classification Search
CPC .. G01S 13/765; G01S 13/878; G01S 2205/02; G01S 2205/09; G01S 7/2883; G01S 7/354; G01S 7/356; G01S 7/411; G01S 7/412; G01S 5/0226; H04W 84/18; H04W 4/029; H04W 4/027; H04W 4/021; H04W 24/08; H04W 64/003; H04W 4/023; H04W 4/026; H04W 64/006; H04W 72/21; A61B 5/0507; A61B 5/0816; A61B 2505/07; A61B 2562/0219; A61B 5/0015; A61B 5/0026; A61B 5/02405; A61B 5/1116; A61B 5/1121; A61B 5/1123; A61B 5/113; A61B 5/1135; A61B 5/4809; A61B 5/4812; A61B 5/7207; A61B 5/7264; A61B 2503/22; A61B 5/0002; A61B 5/002; A61B 5/7235; A61B 5/7253; G06F 2218/04; G06F 2218/10; G06F 2221/2111; G06F 21/32; G06F 21/554; G06F 2203/0384; G06F 3/0346; G06F 3/03545; G06F 3/038; G06F 21/552; H04L 27/2647; H04L 5/0026; H04L 5/0048; H04L 25/0202; H04L 25/0204; H04L 25/022; H04L 27/362; H04L 5/0051; G01C 21/206; G01C 21/383; G01C 21/3841; G01C 21/3867; G01C 21/387; G01N 22/00; G06N 20/00; G08B 21/043; G08B 21/0469; H04B 17/309; H04B 1/38; H04B 17/17; G10L 2025/783; G10L 21/0208; G10L 21/0272; G10L 25/18; G10L 25/30; G10L 25/78; G10L 25/90; H01Q 3/22

See application file for complete search history.

(56) References Cited

U.S. PATENT DOCUMENTS

| | | | |
|---|---|---|---|
| 12,050,993 B2* | 7/2024 | Lee | G06F 16/285 |
| 2022/0091275 A1* | 3/2022 | Held | G06F 18/23 |
| 2022/0095950 A1* | 3/2022 | Cheng | A61B 5/7257 |
| 2022/0180242 A1* | 6/2022 | Lee | G06N 3/047 |

* cited by examiner

Algorithm 1 Algorithm for ID-CAM generation.

1: $I_o \rightarrow$ d-ACF input of size $R \times C$.
2: $D \sim \mathcal{N}(\mu, \sigma) \rightarrow$ 2D distortion mask of size $m_h \times m_w$, where $1 \leq m_h \leq R, 1 \leq m_w \leq C$.
3: $\Omega = \{(a, b), a \in \{1, 2, \ldots, R\}, b \in \{1, 2, \ldots, C\}\}$.
4: $p_{f_o} \rightarrow$ output fail probability with input $I_o$.
5: $N \rightarrow$ Number of iterations.
6: for $i = 1 : N$ do
7: $\quad \theta \rightarrow$ random selection from $\{1, 2, 3, 4, 5\}$.
8: $\quad I_i = I_o$ (copy of $I_o$), $C_i \rightarrow$ zeros of size $R \times C$.
9: $\quad \phi = \{(\alpha_j, \beta_j) \in \Omega, j = 1, 2, \ldots \theta\}$ {random selection}
10: $\quad$ for $j = 1 : \theta$ do
11: $\qquad I_i[\alpha_j : \alpha_j + m_h, \beta_j : \beta_j + m_w] = D$.
12: $\quad$ end for
13: $\quad p_{f_i} \rightarrow$ output fail probability with input $I_i$.
14: $\quad p_{d_i} = p_{f_o} - p_{f_i}$.
15: $\quad$ for $j = 1 : \theta$ do
16: $\qquad C_i[\alpha_j : \alpha_j + m_h, \beta_j : \beta_j + m_w] = p_{d_i}$
17: $\quad$ end for
18: end for
19: $ID - CAM(I_o) = \frac{1}{N} \sum_{i=1}^{N} C_i$.

FIG. 4

WIRELESS SENSING USING CLASSIFIER PROBING AND REFINEMENT

CROSS-REFERENCE TO RELATED APPLICATIONS

The present application hereby incorporates by reference the entirety of the disclosures of, and claims priority to, each of the following cases:
(a) U.S. Provisional Patent application 63/721,406, entitled "METHOD. APPARATUS, AND SYSTEM FOR WIRELESS SENSING", filed on Nov. 15, 2024,
(b) U.S. Provisional Patent application 63/651,921, entitled "METHOD. APPARATUS, AND SYSTEM FOR WIRELESS SENSING IN NETWORK OF NETWORKS WITH INTER-NETWORK SOUNDING", filed on May 24, 2024.
(c) U.S. Provisional Patent application 63/614,621, entitled "METHOD. APPARATUS. AND SYSTEM FOR WIRELESS SENSING", filed on Dec. 24, 2023.
(d) U.S. patent application Ser. No. 17/149,625, entitled "METHOD. APPARATUS, AND SYSTEM FOR WIRELESS MONITORING WITH MOTION LOCALIZATION", filed on Jan. 14, 2021,
(e) U.S. patent application Ser. No. 17/537,432, entitled "METHOD. APPARATUS, AND SYSTEM FOR AUTOMATIC AND ADAPTIVE WIRELESS MONITORING AND TRACKING", filed on Nov. 29, 2021,
(f) U.S. patent application Ser. No. 17/827,902, entitled "METHOD. APPARATUS, AND SYSTEM FOR SPEECH ENHANCEMENT AND SEPARATION BASED ON AUDIO AND RADIO SIGNALS", filed on May 30, 2022.
(g) U.S. patent application Ser. No. 17/838,228, entitled "METHOD. APPARATUS, AND SYSTEM FOR WIRELESS SENSING BASED ON CHANNEL INFORMATION", filed on Jun. 12, 2022.
(h) U.S. patent application Ser. No. 17/838,231, entitled "METHOD. APPARATUS. AND SYSTEM FOR IDENTIFYING AND QUALIFYING DEVICES FOR WIRELESS SENSING", filed on Jun. 12, 2022,
(i) U.S. patent application Ser. No. 17/838,244, entitled "METHOD. APPARATUS, AND SYSTEM FOR WIRELESS SENSING BASED ON LINKWISE MOTION STATISTICS", filed on Jun. 12, 2022,
(j) U.S. patent application Ser. No. 17/959,487, entitled "METHOD, APPARATUS. AND SYSTEM FOR VOICE ACTIVITY DETECTION BASED ON RADIO SIGNALS", filed on Oct. 4, 2022.
(k) U.S. patent application Ser. No. 17/960,080, entitled "METHOD. APPARATUS, AND SYSTEM FOR ENHANCED WIRELESS MONITORING OF VITAL SIGNS", filed on Oct. 4, 2022.
(l) PCT Patent application PCT/US22/45708, entitled "METHOD. APPARATUS, AND SYSTEM FOR WIRELESS SENSING MEASUREMENT AND REPORTING", filed on Oct. 4, 2022.
(m) U.S. patent application Ser. No. 18/108,563, entitled "METHOD. APPARATUS. AND SYSTEM FOR WIRELESS SENSING BASED ON MULTIPLE GROUPS OF WIRELESS DEVICES", filed on Feb. 10, 2023,
(n) U.S. patent application Ser. No. 18/199,963, entitled "METHOD. APPARATUS. AND SYSTEM FOR WIRELESS SENSING MEASUREMENT AND REPORTING", filed on May 21, 2023.
(o) U.S. patent application Ser. No. 18/379,622, entitled "METHOD. APPARATUS, AND SYSTEM FOR WIRELESS PROXIMITY DETECTION", filed on Oct. 12, 2023.
(p) U.S. patent application Ser. No. 18/391,529, entitled "METHOD. APPARATUS, AND SYSTEM FOR WIRELESS HUMAN AND NON-HUMAN MOTIONDETECTION", filed on Dec. 20, 2023.
(q) U.S. patent application Ser. No. 18/395,533, entitled "METHOD, APPARATUS, AND SYSTEM FOR WIRELESS SENSING MEASUREMENT AND REPORTING", filed on Dec. 23, 2023.
(r) U.S. patent application Ser. No. 18/395,539, entitled "METHOD. APPARATUS, AND SYSTEM FOR WIRELESS SENSING MEASUREMENT AND REPORTING", filed on Dec. 23, 2023.
(s) U.S. patent application Ser. No. 18/395,543, entitled "METHOD. APPARATUS, AND SYSTEM FOR WIRELESS SENSING MEASUREMENT AND REPORTING", filed on Dec. 23, 2023.
(t) U.S. patent application Ser. No. 18/395,537, entitled "METHOD. APPARATUS, AND SYSTEM FOR WIRELESS SENSING MEASUREMENT AND REPORTING", filed on Dec. 23, 2023.
(u) U.S. patent application Ser. No. 18/395,544, entitled "METHOD. APPARATUS, AND SYSTEM FOR WIRELESS SENSING MEASUREMENT AND REPORTING", filed on Dec. 23, 2023.
(v) U.S. patent application Ser. No. 18/401,684, entitled "METHOD. APPARATUS, AND SYSTEM FOR WIRELESS SENSING MEASUREMENT AND REPORTING", filed on Jan. 1, 2024.
(w) U.S. patent application Ser. No. 18/401,681, entitled "METHOD. APPARATUS. AND SYSTEM FOR WIRELESS SENSING BASED ON DEEP LEARNING", filed on Jan. 1, 2024.

TECHNICAL FIELD

The present teaching generally relates to wireless sensing. More specifically, the present teaching relates to wireless sensing using classifier probing and refinement.

BACKGROUND

With the proliferation of Internet of Things (IoT) applications, billions of household appliances, phones, smart devices, security systems, environment sensors, vehicles and buildings, and other radio-connected devices will transmit data and communicate with each other or people, and everything will be able to be measured and tracked all the time. Among the various approaches to measure what is happening in the surrounding environment, wireless sensing has received an increasing attention in recent years because of the ubiquitous deployment of wireless radio devices. In addition, human activities affect wireless signal propagations, therefore understanding and analyzing the way how wireless signals react to human activities can reveal rich information about the activities. As more bandwidth becomes available in the new generation of wireless systems, wireless sensing will make many smart IoT applications only imagined today possible in the near future. That is because when the bandwidth increases, one can see many more multipaths, in a rich-scattering environment such as in indoors or metropolitan area, which can be treated as hundreds of virtual antennas/sensors. Because there may be many IoT devices available for wireless sensing, an efficient and effective method for making use multiple devices for wireless sensing is desirable.

SUMMARY

The present teaching generally relates to wireless sensing. More specifically, the present teaching relates to wireless sensing using classifier probing and refinement.

In one embodiment, a method performed by a system for wireless sensing with classifier probing and refinement is described. The method comprises: in a probing phase of the system: obtaining a plurality of raw measurement data by a sensing device of the system, processing the plurality of raw measurement data by a processor of the system to construct a plurality of input data for a classifier, performing a classification by the processor using the classifier by inputting each of the plurality of input data to the classifier, computing a plurality of output analytics by the classifier based on the plurality of input data, each output analytics computed by the classifier based on a respective input data, mapping the plurality of output analytics to a plurality of mapped outcome, each output analytics mapped to a respective mapped outcome, identifying at least one reference input data each associated with a reference output analytics and a reference mapped outcome, each reference input data being one of the plurality of input data for the classifier for which a respective reference outcome is available and is different from the reference mapped outcome, and for each reference input data for the classifier: constructing a respective plurality of perturbed input data for the classifier by perturbing the reference input data, each perturbed input data constructed based on a respective perturbation of the reference input data, performing the classification using the classifier by inputting each of the plurality of perturbed input data to the classifier, computing a respective plurality of perturbed output analytics by the classifier based on the plurality of perturbed input data, each perturbed output analytics computed by the classifier based on a respective perturbed input data, mapping the plurality of perturbed output analytics to a plurality of perturbed mapped outcome, each perturbed output analytics mapped to a respective perturbed mapped outcome, comparing each perturbed mapped outcome with the reference outcome associated with the reference input data which is different from the reference mapped outcome, and when at least one perturbed mapped outcome deviates from the reference mapped outcome such that it is the same as the reference outcome, selecting at least one selected perturbed input data each being one of the respective plurality of perturbed input data associated with one of the at least one perturbed mapped outcome as selected perturbed input data for re-training the classifier; and in a re-training phase of the system: re-training the classifier based on each of the at least one selected perturbed input data and the associated reference outcome.

In another embodiment, a device for wireless sensing with classifier probing and refinement is described. The device comprises: a receiver configured to obtain a plurality of raw measurement data in a probing phase of the device; and a classifier comprising a memory and a processor. The processor is configured in the probing phase of the device to: process the plurality of raw measurement data to construct a plurality of input data, perform a classification using each of the plurality of input data as input to the classifier, compute a plurality of output analytics based on the plurality of input data, each output analytics computed based on a respective input data, map the plurality of output analytics to a plurality of mapped outcome, each output analytics mapped to a respective mapped outcome, identify at least one reference input data each associated with a reference output analytics and a reference mapped outcome, each reference input data being one of the plurality of input data for the classifier for which a respective reference outcome is available and is different from the reference mapped outcome, and for each reference input data for the classifier: construct a respective plurality of perturbed input data for the classifier by perturbing the reference input data, each perturbed input data constructed based on a respective perturbation of the reference input data, perform the classification using each of the plurality of perturbed input data as input to the classifier, compute a respective plurality of perturbed output analytics based on the plurality of perturbed input data, each perturbed output analytics computed based on a respective perturbed input data, map the plurality of perturbed output analytics to a plurality of perturbed mapped outcome, each perturbed output analytics mapped to a respective perturbed mapped outcome, compare each perturbed mapped outcome with the reference outcome associated with the reference input data which is different from the reference mapped outcome, and when at least one perturbed mapped outcome deviates from the reference mapped outcome such that it is the same as the reference outcome, select at least one selected perturbed input data each being one of the respective plurality of perturbed input data associated with one of the at least one perturbed mapped outcome as selected perturbed input data for re-training the classifier. The processor is configured to re-train the classifier based on each of the at least one selected perturbed input data and the associated reference outcome in a re-training phase of the device.

In yet another embodiment, a system for wireless sensing with classifier probing and refinement is described. The system comprises: a sensing device configured to obtain a plurality of raw measurement data in a probing phase of the system; and a classifier comprising a memory and a processor. The processor is configured in the probing phase of the system to: process the plurality of raw measurement data to construct a plurality of input data, perform a classification using each of the plurality of input data as input to the classifier, compute a plurality of output analytics based on the plurality of input data, each output analytics computed based on a respective input data, map the plurality of output analytics to a plurality of mapped outcome, each output analytics mapped to a respective mapped outcome, identify at least one reference input data each associated with a reference output analytics and a reference mapped outcome, each reference input data being one of the plurality of input data for the classifier for which a respective reference outcome is available and is different from the reference mapped outcome, and for each reference input data for the classifier: construct a respective plurality of perturbed input data for the classifier by perturbing the reference input data, each perturbed input data constructed based on a respective perturbation of the reference input data, perform the classification using each of the plurality of perturbed input data as input to the classifier, compute a respective plurality of perturbed output analytics based on the plurality of perturbed input data, each perturbed output analytics computed based on a respective perturbed input data, map the plurality of perturbed output analytics to a plurality of perturbed mapped outcome, each perturbed output analytics mapped to a respective perturbed mapped outcome, compare each perturbed mapped outcome with the reference outcome associated with the reference input data which is different from the reference mapped outcome, and when at least one perturbed mapped outcome deviates from the reference mapped outcome such that it is the same as the reference outcome, select at least one selected perturbed input data each being one of the respective plurality of perturbed input data associated with one of the at least one perturbed mapped outcome as selected perturbed input data for re-training the classifier. The processor is configured to re-train the classifier based on each of the at least one selected perturbed input data and the associated reference outcome in a re-training phase of the system.

Other concepts relate to software for implementing the present teaching on wireless sensing using classifier probing and refinement. Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

BRIEF DESCRIPTION OF DRAWINGS

The methods, systems, and/or devices described herein are further described in terms of example embodiments. These example embodiments are described in detail with reference to the drawings. These embodiments are non-limiting example embodiments, in which like reference numerals represent similar structures throughout the several views of the drawings.

FIG. 4 illustrates an example method for iterative distortion-class activation map (ID-CAM), according to some embodiments of the present disclosure.

DETAILED DESCRIPTION

Figure 1:
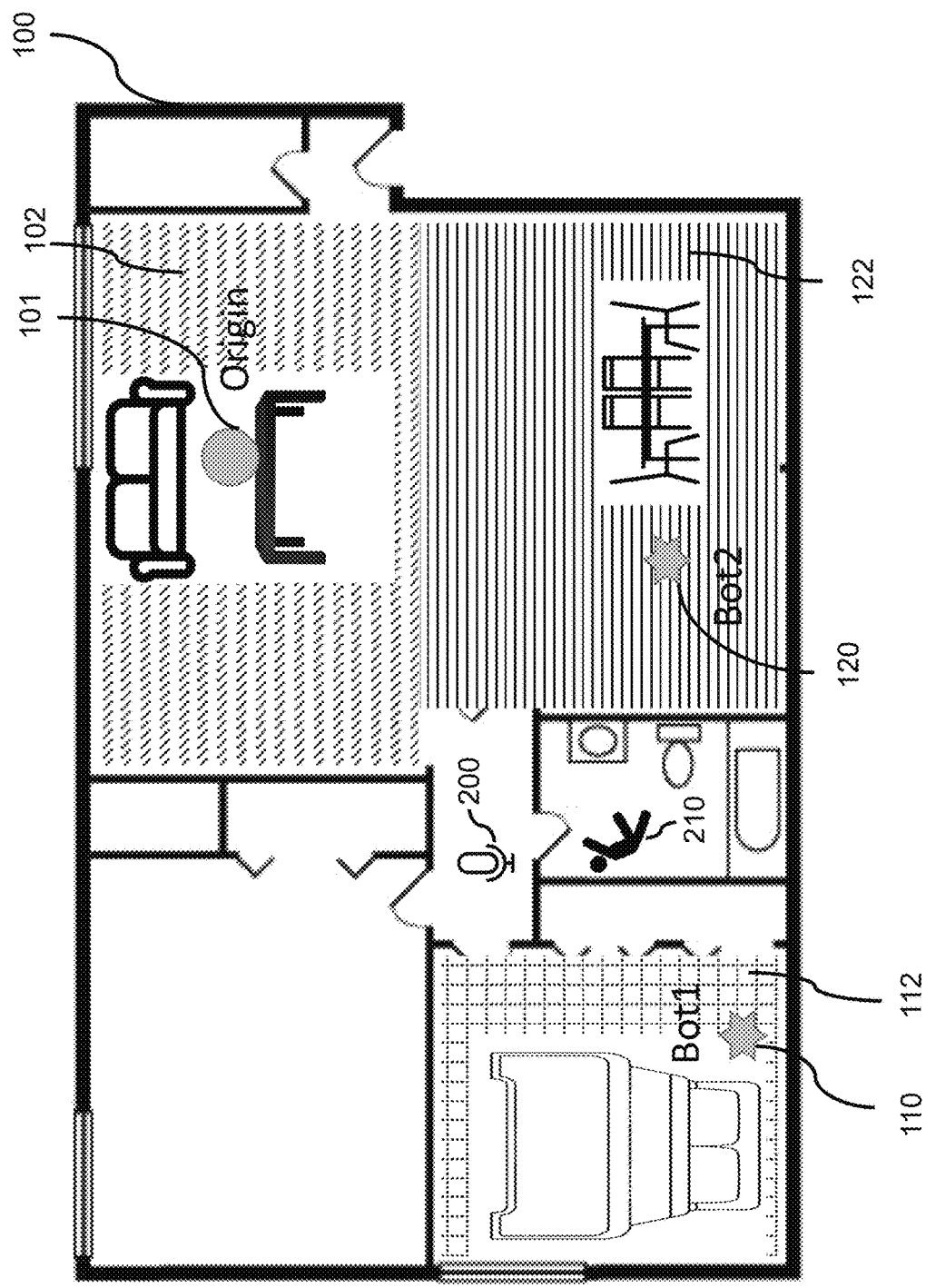
FIG. 1 illustrates an example scenario for wireless sensing in a venue, according to some embodiments of the present disclosure.

The symbol "/" disclosed herein means "and/or". For example, "A/B" means "A and/or B." In some embodiments, a method/device/system/software of a wireless monitoring system is disclosed. A time series of channel information (CI) of a wireless multipath channel is obtained using a processor, a memory communicatively coupled with processor and a set of instructions stored in memory. The time series of CI (TSCI) may be extracted from a wireless signal transmitted from a Type1 heterogeneous wireless device (e.g. wireless transmitter (TX), "Bot" device) to a Type2 heterogeneous wireless device (e.g. wireless receiver (RX), "Origin" device) in a venue through the channel. The channel is impacted by an expression/motion of an object in venue. A characteristics/spatial-temporal information (STI)/motion information (MI) of object/expression/motion may be computed/monitored based on the TSCI. A task may be performed based on the characteristics/STI/MI. A task-related presentation may be generated in a user-interface (UI) on a device of a user.

Expression may comprise placement, placement of moveable parts, location/speed/acceleration/position/orientation/direction/identifiable place/region/presence/spatial coordinate, static expression/presentation/state/size/length/width/height/angle/scale/curve/surface/area/volume/pose/posture/manifestation/body language, dynamic expression/motion/sequence/movement/activity/behavior/gesture/gait/extension/contraction/distortion/deformation, body expression (e.g. head/face/eye/mouth/tongue/hair/voice/neck/limbs/arm/hand/leg/foot/muscle/moveable parts), surface expression/shape/texture/material/color/electromagnetic (EM) characteristics/visual pattern/wetness/reflectance/translucency/flexibility, material property (e.g. living tissue/hair/fabric/metal/wood/leather/plastic/artificial material/solid/liquid/gas/temperature), expression change, and/or some combination.

Wireless multipath channel may comprise: communication channel, analog frequency channel (e.g. with carrier frequency near 700/800/900 MHZ, or 1.8/1.9/2.4/3/5/6/27/60/70+ GHz), coded channel (e.g. in CDMA), and/or channel of wireless/cellular network/system (e.g. WLAN, WiFi, mesh, 4G/LTE/5G/6G/7G/8G, Bluetooth, Zigbee, UWB, RFID, microwave). It may comprise multiple channels, which may be consecutive (e.g. adjacent/overlapping bands) or non-consecutive (e.g. non-overlapping bands, 2.4 GHz/5 GHZ). While channel is used to transmit wireless signal and perform sensing measurements, data (e.g. TSCI/feature/ component/characteristics/STI/MI/analytics/task outputs, auxiliary/non-sensing data/network traffic) may be communicated/transmitted in channel.

Wireless signal may comprise a series of probe signals. It may be any of: EM radiation, radio frequency (RF)/light/bandlimited/baseband signal, signal in licensed/unlicensed/ISM band, wireless/mobile/cellular/optical communication/network/mesh/downlink/uplink/unicast/multicast/broadcast signal. It may be compliant to standard/protocol (e.g. WLAN, WWAN, WPAN, WBAN, international/national/industry/defacto, IEEE/802/802.11/15/16, WiFi, 802.11n/ac/ax/be/bf, 3G/4G/LTE/5G/6G/7G/8G, 3GPP/Bluetooth/BLE/Zigbee/NFC/RFID/UWB/WiMax). A probe signal may comprise any of: protocol/standard/beacon/pilot/sounding/excitation/illumination/handshake/synchronization/reference/source/motion probe/detection/sensing/management/control/data/null-data/beacon/pilot/request/response/association/reassociation/disassociation/authentication/action/report/poll/announcement/extension/enquiry/acknowledgement frame/packet/signal, and/or null-data-frame (NDP)/RTS/CTS/QoS/CF-Poll/CF-Ack/block acknowledgement/reference/training/synchronization. It may comprise line-of-sight (LOS)/non-LOS components (or paths/links). It may have data embedded. Probe signal may be replaced by (or embedded in) data signal. Each frame/packet/signal may comprise: preamble/header/payload. It may comprise: training sequence, short (STF)/long (LTF) training field, L-STF/L-LTF/L-SIG/HE-STF/HE-LTF/HE-SIG-A/HE-SIG-B, channel estimation field (CEF). It may be used to transfer power wirelessly from Type1 device to Type2 device. Sounding rate of signal may be adjusted to control amount of transferred power. Probe signals may be sent in burst.

TSCI may be extracted/obtained (e.g. by IC/chip) from wireless signal at a layer of Type2 device (e.g. layer of OSI reference model, PHY/MAC/data link/logical link control/network/transport/session/presentation/application layer, TCP/IP/internet/link layer). It may be extracted from received wireless/derived signal. It may comprise wireless sensing measurements obtained in communication protocol (e.g. wireless/cellular communication standard/network, 4G/LTE/5G/6G/7G/8G, WiFi, IEEE 802.11/11bf/15/16). Each CI may be extracted from a probe/sounding signal, and may be associated with time stamp. TSCI may be associated with starting/stopping time/duration/amount of CI/sampling/sounding frequency/period. A motion detection/sensing signal may be recognized/identified base on probe signal. TSCI may be stored/retrieved/accessed/preprocessed/processed/postprocessed/conditioned/analyzed/monitored. TSCI/features/components/characteristics/STI/MI/analytics/task outcome may be communicated to edge/cloud server/Type1/Type2/hub/data aggregator/another device/system/network.

Type1/Type2 device may comprise components (hardware/software) such as electronics/chip/integrated circuit (IC)/RF circuitry/antenna/modem/TX/RX/transceiver/RF interface (e.g. 2.4/5/6/27/60/70+ GHz radio/front/back haul radio)/network/interface/processor/memory/module/circuit/board/software/firmware/connectors/structure/enclosure/housing/structure. It may comprise access point (AP)/base-station/mesh/router/repeater/hub/wireless station/client/terminal/"Origin Satellite"/"Tracker Bot", and/or internet-of-things (IoT)/appliance/wearable/accessory/peripheral/furniture/amenity/gadget/vehicle/module/wireless- enabled/unicast/multicast/broadcasting/node/hub/target/sensor/portable/mobile/cellular/communication/motion-detection/source/destination/standard-compliant device. It may comprise additional attributes such as auxiliary functionality/network connectivity/purpose/brand/model/appearance/form/shape/color/material/specification. It may be heterogeneous because the above (e.g. components/device types/additional attributes) may be different for different Type1 (or Type2) devices.

Type1/Type2 devices may/may not be authenticated/associated/collocated. They may be same device. Type1/Type2/portable/nearby/another device, sensing/measurement session/link between them, and/or object/expression/motion/characteristics/STI/MI/task may be associated with an identity/identification/identifier (ID) such as UUID, associated/unassociated STA ID (ASID/USID/AID/UID). Type2 device may passively observe/monitor/receive wireless signal from Type1 device without establishing connection (e.g. association/authentication/handshake) with, or requesting service from, Type1 device. Type1/Type2 device may move with object/another object to be tracked.

Type1 (TX) device may function as Type2 (RX) device temporarily/sporadically/continuously/repeatedly/interchangeably/alternately/simultaneously/contemporaneously/concurrently; and vice versa. Type1 device may be Type2 device. A device may function as Type1/Type2 device temporarily/sporadically/continuously/repeatedly/simultaneously/concurrently/contemporaneously. There may be multiple wireless nodes each being Type1/Type2 device. TSCI may be obtained between two nodes when they exchange/communicate wireless signals. Characteristics/STI/MI of object may be monitored individually based on a TSCI, or jointly based on multiple TSCI.

Motion/expression of object may be monitored actively with Type1/Type2 device moving with object (e.g. wearable devices/automated guided vehicle/AGV), or passively with Type1/Type2 devices not moving with object (e.g. both fixed devices).

Task may be performed with/without reference to reference/trained/initial database/profile/baseline that is trained/collected/processed/computed/transmitted/stored in training phase. Database may be re-training/updated/reset.

Presentation may comprise UI/GUI/text/message/form/webpage/visual/image/video/graphics/animation/graphical/symbol/emoticon/sign/color/shade/sound/music/speech/audio/mechanical/gesture/vibration/haptics presentation. Time series of characteristic/STI/MI/task outcome/another quantity may be displayed/presented in presentation. Any computation may be performed/shared by processor (or logic unit/chip/IC)/Type1/Type2/user/nearby/another device/local/edge/cloud server/hub/data/signal analysis subsystem/sensing initiator/response/SBP initiator/responder/AP/non-AP. Presentation may comprise any of: monthly/weekly/daily/simplified/detailed/cross-sectional/small/large/form-factor/color-coded/comparative/summary/web view, animation/voice announcement/another presentation related to periodic/repetition characteristics of repeating motion/expression.

Multiple Type1 (or Type 2) devices may interact with a Type2 (or Type1) device. The multiple Type1 (or Type2) devices may be synchronized/asynchronous, and/or may use same/different channels/sensing parameters/settings (e.g. sounding frequency/bandwidth/antennas). Type2 device may receive another signal from Type1/another Type1 device. Type1 device may transmit another signal to Type2/another Type2 device. Wireless signals sent (or received) by them may be sporadic/temporary/continuous/repeated/synchronous/simultaneous/concurrent/contemporaneous. They may operate independently/collaboratively. Their data (e.g. TSCI/feature/characteristics/STI/MI/intermediate task outcomes) may be processed/monitored/analyzed independently or jointly/collaboratively.

Any devices may operate based on some state/internal state/system state. Devices may communicate directly, or via another/nearby/portable device/server/hub device/cloud server. Devices/system may be associated with one or more users, with associated settings. Settings may be chosen/selected/pre-programmed/changed/adjusted/modified/varied over time. The method may be performed/executed in shown order/another order. Steps may be performed in parallel/iterated/repeated. Users may comprise human/adult/older adult/man/woman/juvenile/child/baby/pet/animal/creature/machine/computer module/software. Step/operation/processing may be different for different devices (e.g. based on locations/orientation/direction/roles/user-related characteristics/settings/configurations/available resources/bandwidth/power/network connection/hardware/software/processor/co-processor/memory/battery life/antennas/directional antenna/power setting/device parameters/characteristics/conditions/status/state). Any/all device may be controlled/coordinated by a processor (e.g. associated with Type1/Type2/nearby/portable/another device/server/designated source). Some device may be physically in/of/attached to a common device.

Type1 (or Type2) device may be capable of wirelessly coupling with multiple Type2 (or Type1) devices. Type1 (or Type2) device may be caused/controlled to switch/establish wireless coupling (e.g. association/authentication) from Type2 (or Type1) device to another Type2 (or another Type1) device. The switching may be controlled by server/hub device/processor/Type1 device/Type2 device. Radio channel may be different before/after switching. A second wireless signal may be transmitted between Type1 (or Type2) device and second Type2 (or second Type1) device through the second channel. A second TSCI of second channel may be extracted/obtained from second signal. The first/second signals, first/second channels, first/second Type1 device, and/or first/second Type2 device may be same/similar/co-located.

Type1 device may transmit/broadcast wireless signal to multiple Type2 devices, with/without establishing connection (association/authentication) with individual Type2 devices. It may transmit to a particular/common MAC address, which may be MAC address of some device (e.g. dummy receiver). Each Type2 device may adjust to particular MAC address to receive wireless signal. Particular MAC address may be associated with venue, which may be recorded in an association table of an Association Server (e.g. hub device). Venue may be identified by Type1 device/Type2 device based on wireless signal received at particular MAC address.

For example, Type2 device may be moved to a new venue. Type1 device may be newly set up in venue such that Type1 and Type2 devices are not aware of each other. During set up, Type1 device may be instructed/guided/caused/controlled (e.g. by dummy receiver, hardware pin setting/connection, stored setting, local setting, remote setting, downloaded setting, hub device, and/or server) to send wireless signal (e.g. series of probe signals) to particular MAC address. Upon power up, Type2 device may scan for probe signals according to a table of MAC addresses (e.g. stored in designated source, server, hub device, cloud server) that may be used for broadcasting at different locations (e.g. different MAC address used for different venue such as house/office/enclosure/floor/multi-storey building/store/airport/mall/stadium/hall/station/subway/lot/area/zone/region/district/city/country/continent). When Type2 device detects wireless signal sent to particular MAC address, it can use the table to identify venue.

Channel may be selected from a set of candidate/selectable/admissible channels. Candidate channels may be associated with different frequency bands/bandwidth/carrier frequency/modulation/wireless standards/coding/encryption/payload characteristics/network/ID/SSID/characteristics/settings/parameters. Particular MAC address/selected channel may be changed/adjusted/varied/modified over time (e.g. according to time table/rule/policy/mode/condition/situation/change). Selection/change may be based on availability/collision/traffic pattern/co-channel/inter-channel interference/effective bandwidth/random selection/pre-selected list/plan. It may be done by a server (e.g. hub device). They may be communicated (e.g. from/to Type1/Type2/hub/another device/local/edge/cloud server).

Wireless connection (e.g. association/authentication) between Type1 device and nearby/portable/another device may be established (e.g. using signal handshake). Type1 device may send first handshake signal (e.g. sounding frame/probe signal/request-to-send RTS) to the nearby/portable/another device. Nearby/portable/another device may reply to first signal by sending second handshake signal (e.g. command/clear-to-send/CTS) to Type1 device, triggering Type1 device to transmit/broadcast wireless signal to multiple Type2 devices without establishing connection with the Type2 devices. Second handshake signals may be response/acknowledge (e.g. ACK) to first handshake signal. Second handshake signal may contain information of venue/Type1 device. Nearby/portable/another device may be a dummy device with purpose (e.g. primary purpose, secondary purpose) to establish wireless connection with Type1 device, to receive first signal, or send second signal. Nearby/portable/another device may be physically attached to Type1 device.

In another example, nearby/portable/another device may send third handshake signal to Type1 device triggering Type1 device to broadcast signal to multiple Type2 devices without establishing connection with them. Type1 device may reply to third signal by transmitting fourth handshake signal to the another device.

Nearby/portable/another device may be used to trigger multiple Type1 devices to broadcast. It may have multiple RF circuitries to trigger multiple transmitters in parallel. Triggering may be sequential/partially sequential/partially/fully parallel. Parallel triggering may be achieved using additional device(s) to perform similar triggering in parallel to nearby/portable/another device. After establishing connection with Type1 device, nearby/portable/another device may suspend/stop communication with Type1 device. It may enter an inactive/hibernation/sleep/stand-by/low-power/OFF/power-down mode. Suspended communication may be resumed. Nearby/portable/another device may have the particular MAC address and Type1 device may send signal to particular MAC address.

The (first) wireless signal may be transmitted by a first antenna of Type1 device to some first Type2 device through a first channel in a first venue. A second wireless signal may be transmitted by a second antenna of Type1 device to some second Type2 device through a second channel in a second venue. First/second signals may be transmitted at first/second (sounding) rates respectively, perhaps to first/second MAC addresses respectively. Some first/second channels/signals/rates/MAC addresses/antennas/Type2 devices may be same/different/synchronous/asynchronous. First/second venues may have same/different sizes/shape/multipath characteristics. First/second venues/immediate areas around first/second antennas may overlap. First/second channels/ signals may be WiFi+LTE (one being WiFi, one being LTE), or WiFi+WiFi, or WiFi (2.4 GHz)+WiFi (5 GHZ), or WiFi (5 GHZ, channel=a1, BW=a2)+WiFi (5 GHZ/channel=b1, BW=b2). Some first/second items (e.g. channels/signals/ rates/MAC addresses/antennas/Type1/Type2 devices) may be changed/adjusted/varied/modified over time (e.g. based on time table/rule/policy/mode/condition/situation/another change).

Each Type1 device may be signal source of multiple Type2 devices (i.e. it sends respective probe signal to respective Type2 device). Each respective Type2 device may choose asynchronously the Type1 device from among all Type1 devices as its signal source. TSCI may be obtained by each respective Type2 device from respective series of probe signals from Type1 device. Type2 device may choose Type1 device from among all Type1 devices as its signal source (e.g. initially) based on identity/identification/identifier of Type1/Type2 device, task, past signal sources, history, characteristics, signal strength/quality, threshold for switching signal source, and/or information of user/account/profile/ access info/parameters/input/requirement/criteria.

Database of available/candidate Type1 (or Type2) devices may be initialized/maintained/updated by Type2 (or Type1) device. Type2 device may receive wireless signals from multiple candidate Type1 devices. It may choose its Type1 device (i.e. signal source) based on any of: signal quality/ strength/regularity/channel/traffic/characteristics/properties/states/task requirements/training task outcome/MAC addresses/identity/identifier/past signal source/history/user instruction/another consideration.

An undesirable/bad/poor/problematic/unsatisfactory/unacceptable/intolerable/faulty/demanding/undesirable/inadequate/lacking/inferior/unsuitable condition may occur when (1) timing between adjacent probe signals in received wireless signal becomes irregular, deviating from agreed sounding rate (e.g. time perturbation beyond acceptable range), and/or (2) processed/signal strength of received signal is too weak (e.g. below third threshold, or below fourth threshold for significant percentage of time), wherein processing comprises any lowpass/bandpass/highpass/median/moving/weighted average/linear/nonlinear/smoothing filtering. Any thresholds/percentages/parameters may be time-varying. Such condition may occur when Type1/Type2 device become progressively far away, or when channel becomes congested.

Some settings (e.g. Type1-Type2 device pairing/signal source/network/association/probe signal/sounding rate/ scheme/channel/bandwidth/system state/TSCI/TSMA/task/ task parameters) may be changed/varied/adjusted/modified. Change may be according to time table/rule/policy/mode/ condition (e.g. undesirable condition)/another change. For example, sounding rate may normally be 100 Hz, but changed to 1000 Hz in demanding situations, and to 1 Hz in low power/standby situation.

Settings may change based on task requirement (e.g. 100 Hz normally and 1000 Hz momentarily for 20 seconds). In task, instantaneous system may be associated adaptively/ dynamically to classes/states/conditions (e.g. low/normal/ high priority/emergency/critical/regular/privileged/non-subscription/subscription/paying/non-paying). Settings (e.g. sounding rate) may be adjusted accordingly. Change may be controlled by: server/hub/Type1/Type2 device. Scheduled changes may be made according to time table. Changes may be immediate when emergency is detected, or gradual when developing condition is detected.

Characteristics/STI/MI may be monitored/analyzed individually based on a TSCI associated with a particular Type1/Type2 device pair, or jointly based on multiple TSCI associated multiple Type1/Type2 pairs, or jointly based on any TSCI associated with the particular Type2 device and any Type1 devices, or jointly based on any TSCI associated with the particular Type1 device and any Type2 devices, or globally based on any TSCI associated with any Type1/ Type2 devices.

A classifier/classification/recognition/detection/estimation/projection/feature extraction/processing/filtering may be applied (e.g. to CI/CI-feature/characteristics/STI/MI), and/or trained/re-trained/updated. In a training stage, training may be performed based on multiple training TSCI of some training wireless multipath channel, or characteristic/ STI/MI computed from training TSCI, the training TSCI obtained from training wireless signals transmitted from training Type1 devices and received by training Type2 devices. Re-training/updating may be performed in an operating stage based on training TSCI/current TSCI. There may be multiple classes (e.g. groupings/categories/events/motions/expression/activities/objects/locations) associated with venue/regions/zones/location/environment/home/office/building/warehouse/facility object/expression/motion/ movement/process/event/manufacturing/assembly-line/ maintenance/repairing/navigation/object/emotional/mental/ state/condition/stage/gesture/gait/action/motion/presence/ movement/daily/activity/history/event.

Classifier may comprise linear/nonlinear/binary/multiclass/Bayes classifier/Fisher linear discriminant/logistic regression/Markov chain/Monte Carlo/deep/neural network/ perceptron/self-organization maps/boosting/meta algorithm/ decision tree/random forest/genetic programming/kernel learning/KNN/support vector machine (SVM).

Feature extraction/projection may comprise any of: subspace projection/principal component analysis (PCA)/independent component analysis (ICA)/vector quantization/singular value decomposition (SVD)/eigen-decomposition/ eigenvalue/time/frequency/orthogonal/non-orthogonal decomposition, processing/preprocessing/postprocessing. Each CI may comprise multiple components (e.g. vector/ combination of complex values). Each component may be preprocessed to give magnitude/phase or a function of such.

Feature may comprise: output of feature extraction/projection, amplitude/magnitude/phase/energy/power/strength/ intensity, presence/absence/proximity/likelihood/histogram, time/period/duration/frequency/component/decomposition/ projection/band, local/global/maximum (max)/minimum (min)/zero-crossing, repeating/periodic/typical/habitual/ one-time/atypical/abrupt/mutually-exclusive/evolving/transient/changing/time/related/correlated feature/pattern/trend/ profile/events/tendency/inclination/behavior, cause-andeffect/short-term/long-term/correlation/statistics/frequency/ period/duration, motion/movement/location/map/ coordinate/height/speed/acceleration/angle/rotation/size/ volume, suspicious/dangerous/alarming event/warning/ belief/proximity/collision, tracking/breathing/heartbeat/gait/ action/event/statistical/hourly/daily/weekly/monthly/yearly parameters/statistics/analytics, well-being/health/disease/ medical statistics/analytics, an early/instantaneous/contemporaneous/delayed indication/suggestion/sign/indicator/ verifier/detection/symptom of a state/condition/situation/ disease/biometric, baby/patient/machine/device/ temperature/vehicle/parking lot/venue/lift/elevator/spatial/ road/fluid flow/home/room/office/house/building/ warehouse/storage/system/ventilation/fan/pipe/duct/people/ human/car/boat/truck/airplane/drone/downtown/crowd/ impulsive event/cyclo-stationary/environment/vibration/ material/surface/3D/2D/local/global, and/or another measurable quantity/variable. Feature may comprise monotonic function of feature, or sliding aggregate of features in sliding window.

Training may comprise AI/machine/deep/supervised/unsupervised/discriminative training/auto-encoder/linear discriminant analysis/regression/clustering/tagging/labeling/ Monte Carlo computation.

A current event/motion/expression/object in venue at current time may be classified by applying classifier to current TSCI/characteristics/STI/MI obtained from current wireless signal received by Type2 device in venue from Type1 devices in an operating stage. If there are multiple Type1/ Type2 devices, some/all (or their locations/antenna locations) may be a permutation of corresponding training Type1/Type2 devices (or locations/antenna locations). Type1/Type2 device/signal/channel/venue/object/motion may be same/different from corresponding training entity. Classifier may be applied to sliding windows. Current TSCI/ characteristics/STI/MI may be augmented by training TSCI/ characteristics/STI/MI (or fragment/extract) to bootstrap classification/classifier.

A first section/segment (with first duration/starting/ending time) of a first TSCI (associated with first Type1-Type2 device pair) may be aligned (e.g. using dynamic time warping/DTW/matched filtering, perhaps based on some mismatch/distance/similarity score/cost, or correlation/autocorrelation/cross-correlation) with a second section/segment (with second duration/starting/ending time) of a second TSCI (associated with second Type1-Type2 device pair), with each CI in first section mapped to a CI in second section. First/second TSCI may be preprocessed. Some similarity score (component/item/link/segment-wise) may be computed. The similarity score may comprise any of: mismatch/distance/similarity score/cost. Component-wise similarity score may be computed between a component of first item (CI/feature/characteristics/STI/MI) of first section and corresponding component of corresponding mapped item (second item) of second section. Item-wise similarity score may be computed between first/second items (e.g. based on aggregate of corresponding component-wise similarity scores). An aggregate may comprise any of: sum/ weighted sum, weighted average/robust/trimmed mean/ arithmetic/geometric/harmonic mean, median/mode. Link-wise similarity score may be computed between first/second items associated with a link (TX-RX antenna pair) of first/second Type1-Type2 device pairs (e.g. based on aggregate of corresponding item-wise similarity scores). Segment-wise similarity score may be computed between first/ second segments (e.g. based on aggregate of corresponding link-wise similarity scores). First/second segment may be sliding.

In DTW, a function of any of: first/second segment, first/second item, another first (or second) item of first (or second) segment, or corresponding timestamp/duration/difference/differential, may satisfy a constraint. Time difference between first/second items may be constrained (e.g. upper/lower bounded). First (or second) section may be entire first (or second) TSCI. First/second duration/starting/ ending time may be same/different.

In one example, first/second Type1-Type2 device pairs may be same and first/second TSCI may be same/different. When different, first/second TSCI may comprise a pair of current/reference, current/current or reference/reference TSCI. For "current/reference", first TSCI may be current TSCI obtained in operating stage and second TSCI may be reference TSCI obtained in training stage. For "reference/ reference", first/second TSCI may be two TSCI obtained during training stage (e.g. for two training events/states/ classes). For "current/current", first/second TSCI may be two TSCI obtained during operating stage (e.g. associated with two different antennas, or two measurement setups). In another example, first/second Type1-Type2 device pairs may be different, but share a common device (Type1 or Type2).

Aligned first/second segments (or portion of each) may be represented as first/second vectors. Portion may comprise all items (for "segment-wise"), or all items associated with a TX-RX link (for "link-wise"), or an item (for "item-wise"), or a component of an item (for "component-wise"). Similarity score may comprise combination/aggregate/function of any of: inner product/correlation/autocorrelation/correlation indicator/covariance/discriminating score/distance/Euclidean/absolute/L_k/weighted distance (between first/second vectors). Similarity score may be normalized by vector length. A parameter derived from similarity score may be modeled with a statistical distribution. A scale/location/ another parameter of the statistical distribution may be estimated.

Recall there may be multiple sliding segments. Classifier may be applied to a sliding first/second segment pair to obtain a tentative classification result. It may associate current event with a particular class based on one segment pair/tentative classification result, or multiple segment pairs/ tentative classification results (e.g. associate if similarity scores prevail (e.g. being max/min/dominant/matchless/ most significant/excel) or significant enough (e.g. higher/ lower than some threshold) among all candidate classes for N consecutive times, or for a high/low enough percentage, or most/least often in a time period).

Channel information (CI) may comprise any of: signal strength/amplitude/phase/timestamp, spectral power measurement, modem parameters, dynamic beamforming information, transfer function components, radio state, measurable variables, sensing data/measurement, coarse/fine-grained layer information (e.g. PHY/MAC/datalink layer), digital gain/RF filter/frontend-switch/DC offset/correction/ IQ-compensation settings, environment effect on wireless signal propagation, channel input-to-output transformation, stable behavior of environment, state profile, wireless channel measurements/received signal strength indicator (RSSI)/ channel state information (CSI)/channel impulse response (CIR)/channel frequency response (CFR)/characteristics of frequency components (e.g. subcarriers)/channel characteristics/channel filter response, auxiliary information, data/ meta/user/account/access/security/session/status/supervisory/device/network/household/neighborhood/environment/ real-time/sensor/stored/encrypted/compressed/protected data, identity/identifier/identification.

Each CI may be associated with timestamp/arrival time/ frequency band/signature/phase/amplitude/trend/characteristics, frequency-like characteristics, time/frequency/time-frequency domain element, orthogonal/non-orthogonal decomposition characteristics of signal through channel. Timestamps of TSCI may be irregular and may be corrected (e.g. by interpolation/resampling) to be regular, at least for a sliding time window.

TSCI may be/comprise a link-wise TSCI associated with an antenna of Type1 device and an antenna of Type2 device. For Type1 device with M antennas and Type2 device with N antennas, there may be MN link-wise TSCI.

CI/TSCI may be preprocessed/processed/postprocessed/ stored/retrieved/transmitted/received. Some modem/radio state parameter may be held constant. Modem parameters may be applied to radio subsystem and may represent radio state. Motion detection signal (e.g. baseband signal, packet decoded/demodulated from it) may be obtained by processing (e.g. down-converting) wireless signal (e.g. RF/WiFi/LTE/5G/6G signal) by radio subsystem using radio state represented by stored modem parameters. Modem parameters/radio state may be updated (e.g. using previous modem parameters/radio state). Both previous/updated modem parameters/radio states may be applied in radio subsystem (e.g. to process signal/decode data). In the disclosed system, both may be obtained/compared/analyzed/processed/monitored.

Each CI may comprise N1 CI components (CIC) (e.g. time/frequency domain component, decomposition components), each with corresponding CIC index. Each CIC may comprise a real/imaginary/complex quantity, magnitude/phase/Boolean/flag, and/or some combination/subset. Each CI may comprise a vector/matrix/set/collection of CIC. CIC of TSCI associated with a particular CIC index may form a CIC time series. TSCI may be divided into N1 time series of CIC (TSCIC), each associated with respective CIC index. Characteristics/STI/MI may be monitored based on TSCIC. Some TSCIC may be selected based on some criteria/cost function/signal quality metric (e.g. SNR, interference level) for further processing.

Multi-component characteristics/STI/MI of multiple TSCIC (e.g. two components with indices 6 and 7, or three components indexed at 6, 7, 10) may be computed. In particular, k-component characteristics may be a function of k TSCIC with k corresponding CIC indices. With k=1, it is single-component characteristics which may constitute/form a one-dimensional (1D) function as CIC index spans all possible values. For k=2, two-component characteristics may constitute/form a 2D function. In special case, it may depend only on difference between the two indices. In such case, it may constitute 1D function. A total characteristics may be computed based on one or more multi-component characteristics (e.g. weighted average/aggregate). Characteristics/STI/MI of object/motion/expression may be monitored based on any multi-component characteristics/total characteristics.

Characteristics/STI/MI may comprise: instantaneous/short-/long- term/historical/repetitive/repeated/repeatable/recurring/periodic/pseudoperiodic/regular/habitual/incremental/average/initial/final/current/past/future/predicted/changing/deviational/change/time/frequency/orthogonal/non- orthogonal/transform/decomposition/deterministic/stochastic/probabilistic/dominant/key/prominent/representative/characteristic/significant/insignificant/indicative/common/averaged/shared/typical/prototypical/persistent/abnormal/a brupt/impulsive/sudden/unusual/unrepresentative/atypical/suspicious/dangerous/alarming/evolving/transient/one-time quantity/characteristics/analytics/feature/information, cause-and-effect, correlation indicator/score, auto/cross correlation/covariance, autocorrelation function (ACF), spectrum/spectrogram/power spectral density, time/frequency function/transform/projection, initial/final/temporal/change/trend/pattern/tendency/inclination/behavior/activity/history/profile/event, location/position/localization/spatial coordinate/change on map/path/navigation/tracking, linear/rotational/horizontal/vertical/location/distance/displacement/height/speed/velocity/acceleration/change/angular speed, direction/orientation, size/length/width/height/azimuth/area/volume/capacity, deformation/transformation, object/motion direction/angle/shape/form/shrinking/expanding, behavior/activity/movement, occurrence, fall-down/accident/security/event, period/frequency/rate/cycle/rhythm/count/quantity, timing/duration/interval, starting/initiating/ending/current/past/next time/quantity/information, type/grouping/classification/composition, presence/absence/proximity/approaching/receding/entrance/exit, identity/identifier, head/mouth/eye/breathing/heart/hand/handwriting/arm/body/gesture/leg/gait/organ characteristics, tidal volume/depth of breath/airflow rate/inhale/exhale time/ratio, gait/walking/tool/machine/complex motion, signal/motion characteristic/information/feature/statistics/parameter/magnitude/phase/degree/dynamics/anomaly/variability/detection/estimation/recognition/identification/indication, slope/derivative/higher order derivative of function/feature/mapping/transformation of another characteristics, mismatch/distance/similarity score/cost/metric, Euclidean/statistical/weighted distance, L1/L2/Lk norm, inner/outer product, tag, test quantity, consumed/unconsumed quantity, state/physical/health/well-being/emotional/mental state, output responses, any composition/combination, and/or any related characteristics/information/combination.

Test quantities may be computed. Characteristics/STI/MI may be computed/monitored based on CI/TSCI/features/similarity scores/test quantities. Static (or dynamic) segment/profile may be identified/computed/analyzed/monitored/extracted/obtained/marked/presented/indicated/highlighted/stored/communicated by analyzing CI/TSCI/features/functions of features/test quantities/characteristics/STI/MI (e.g. target motion/movement presence/detection/estimation/recognition/identification). Test quantities may be based on CI/TSCI/features/functions of features/characteristics/STI/MI. Test quantities may be processed/tested/analyzed/compared.

Test quantity may comprise any/any function of: data/vector/matrix/structure, characteristics/STI/MI, CI information (CII, e.g. CI/CIC/feature/magnitude/phase), directional information (DI, e.g. directional CII), dominant/representative/characteristic/indicative/key/archetypal/example/paradigmatic/prominent/common/shared/typical/prototypical/averaged/regular/persistent/usual/normal/atypical/unusual/abnormal/unrepresentative data/vector/matrix/structure, similarity/mismatch/distance score/cost/metric, auto/cross correlation/covariance, sum/mean/average/weighted/trimmed/arithmetic/geometric/harmonic mean, variance/deviation/absolute/square deviation/averaged/median/total/standard deviation/derivative/slope/variation/total/absolute/square variation/spread/dispersion/variability, divergence/skewness/kurtosis/range/interquartile range/coefficient of variation/dispersion/L-moment/quartile coefficient of dispersion/mean absolute/square difference/Gini coefficient/relative mean difference/entropy/maximum (max)/minimum (min)/median/percentile/quartile, variance-to-mean ratio, max-to-min ratio, variation/regularity/similarity measure, transient event/behavior, statistics/mode/likelihood/histogram/probability distribution function (pdf)/moment generating function/expected function/value, behavior, repeatedness/periodicity/pseudo-periodicity, impulsiveness/suddenness/occurrence/recurrence, temporal profile/characteristics, time/timing/duration/period/frequency/trend/history, starting/initiating/ending time/quantity/count, motion classification/type, change, temporal/frequency/cycle change, etc.

Identification/identity/identifier/ID may comprise: MAC address/ASID/USID/AID/UID/UUID, label/tag/index, web link/address, numeral/alphanumeric ID, name/password/account/account ID, and/or another ID. ID may be assigned (e.g. by software/firmware/user/hardware, hardwired, via dongle). ID may be stored/retrieved (e.g. in database/ memory/cloud/edge/local/hub server, stored locally/remotely/permanently/temporarily). ID may be associated with any of: user/customer/household/information/data/address/phone number/social security number, user/customer number/record/account, timestamp/duration/timing. ID may be made available to Type1/Type2 device/sensing/SBP initiator/responder. ID may be for registration/initialization/communication/identification/verification/detection/recognition/authentication/access control/cloud access/networking/social networking/logging/recording/cataloging/classification/tagging/association/pairing/transaction/electronic transaction/intellectual property control (e.g. by local/cloud/server/hub, Type1/Type2/nearby/user/another device, user).

Object may be person/pet/animal/plant/machine/user, baby/child/adult/older person, expert/specialist/leader/commander/manager/personnel/staff/officer/doctor/nurse/worker/teacher/technician/serviceman/repairman/passenger/patient/customer/student/traveler/inmate/high-value person/, object to be tracked, vehicle/car/AGV/drone/robot/wagon/transport/remote-controlled machinery/cart/moveable objects/goods/items/material/parts/components/machine/lift/elevator, merchandise/goods/cargo/people/items/food/package/luggage/equipment/cleaning tool in/on workflow/assembly-line/warehouse/factory/store/supermarket/distribution/logistic/transport/manufacturing/retail/wholesale/business center/facility/hub, phone/computer/laptop/tablet/dongle/plugin/companion/tool/peripheral/accessory/wearable/furniture/appliance/amenity/gadget, IoT/networked/smart/portable devices, watch/glasses/speaker/toys/stroller/keys/wallet/purse/handbag/backpack, goods/cargo/luggage/equipment/motor/machine/utensil/table/chair/air-conditioner/door/window/heater/fan, light/fixture/stationary object/television/camera/audio/video/surveillance equipment/parts, ticket/parking/toll/airplane ticket, credit/plastic/access card, object with fixed/changing/no form, mass/solid/liquid/gas/fluid/smoke/fire/flame, signage, electromagnetic (EM) source/medium, and/or another object.

Object may have multiple parts, each with different movement (e.g. position/location/direction change). Object may be a person walking forward. While walking, his left/right hands may move in different directions, with different instantaneous motion/speed/acceleration.

Object may/may not be communicatively coupled with some network, such as WiFi, MiFi, 4G/LTE/5G/6G/7G/8G, Bluetooth/NFC/BLE/WiMax/Zigbee/mesh/adhoc network. Object may be bulky machinery with AC power supply that is moved during installation/cleaning/maintenance/renovation. It may be placed on/in moveable platforms such as elevator/conveyor/lift/pad/belt/robot/drone/forklift/car/boat/vehicle. Type1/Type2 device may attach to/move with object. Type1/Type2 device may be part of/embedded in portable/another device (e.g. module/device with module, which may be large/sizeable/small/heavy/bulky/light, e.g. coin-sized/cigarette-box-sized). Type1/Type2/portable/another device may/may not be attached to/move with object, and may have wireless (e.g. via Bluetooth/BLE/Zigbee/NFC/WiFi) or wired (e.g. USB/micro-USB/Firewire/HDMI) connection with a nearby device for network access (e.g. via WiFi/cellular network). Nearby device may be object/phone/AP/IoT/device/appliance/peripheral/amenity/furniture/vehicle/gadget/wearable/networked/computing device. Nearby device may be connected to some server (e.g. cloud server via network/internet). It may/may not be portable/moveable, and may/may not move with object. Type1/Type2/portable/nearby/another device may be powered by battery/solar/DC/AC/other power source, which may be replaceable/non-replaceable, and rechargeable/non-rechargeable. It may be wirelessly charged.

Type1/Type2/portable/nearby/another device may comprise any of: computer/laptop/tablet/pad/phone/printer/monitor/battery/antenna, peripheral/accessory/socket/plug/charger/switch/adapter/dongle, internet-of-thing (IoT), TV/sound bar/HiFi/speaker/set-top box/remote control/panel/gaming device, AP/cable/broadband/router/repeater/extender, appliance/utility/fan/refrigerator/washer/dryer/microwave/oven/stove/range/light/lamp/tube/pipe/tap/lighting/air-conditioner/heater/smoke detector, wearable/watch/glasses/goggle/button/bracelet/chain/jewelry/ring/belt/clothing/garment/fabric/shirt/pant/dress/glove/handwear/shoe/footwear/hat/headwear/bag/purse/wallet/makeup/cosmetic/ornament/book/magazine/paper/stationary/signage/poster/display/printed matter, furniture/fixture/table/desk/chair/sofa/bed/cabinet/shelf/rack/storage/box/bucket/basket/packaging/carriage/tile/shingle/brick/block/mat/panel/curtain/cushion/pad/carpet/material/building material/glass, amenity/sensor/clock/pot/pan/ware/container/bottle/can/utensil/plate/cup/bowl/toy/ball/tool/pen/racket/lock/bell/camera/microphone/painting/frame/mirror/coffee-maker/door/window, food/pill/medicine, embeddable/implantable/gadget/instrument/equipment/device/apparatus/machine/controller/mechanical tool, garage-opener, key/plastic/payment/credit card/ticket, solar panel, key tracker, fire-extinguisher, garbage can/bin, WiFi-enabled device, smart device/machine/machinery/system/house/office/building/warehouse/facility/vehicle/car/bicycle/motorcycle/boat/vessel/airplane/cart/wagon, home/vehicle/office/factory/building/manufacturing/production/computing/security/another device.

One/two/more of Type1/Type2/portable/nearby/another device/server may determine an initial characteristics/STI/MI of object, and/or may share intermediate information. One of Type1/Type2 device may move with object (e.g. "Tracker Bot"). The other one of Type1/Type2 device may not move with object (e.g. "Origin Satellite", "Origin Register"). Either may have known characteristics/STI/MI. Initial STI/MI may be computed based on known STI/MI.

Venue may be any space such as sensing area, room/house/home/office/workplace/building/facility/warehouse/factory/store/vehicle/property, indoor/outdoor/enclosed/semi-enclosed/open/semi-open/closed/over-air/floating/underground space/area/structure/enclosure, space/area with wood/glass/metal/material/structure/frame/beam/panel/column/wall/floor/door/ceiling/window/cavity/gap/opening/reflection/refraction medium/fluid/construction material/fixed/adjustable layout/shape, human/animal/plant body/cavity/organ/bone/blood/vessel/air-duct/windpipe/teeth/soft/hard/rigid/non-rigid tissue, manufacturing/repair/maintenance/mining/parking/storage/transportation/shipping/logistic/sports/entertainment/amusement/public/recreational/government/community/seniors/elderly care/geriatric/space facility/terminal/hub, distribution center/store, machine/engine/device/assembly line/workflow, urban/rural/suburban/metropolitan area, staircase/escalator/elevator/hallway/walkway/tunnel/cave/cavern/channel/duct/pipe/tube/lift/well/pathway/roof/basement/den/alley/road/path/highway/sewage/ventilation system/network, car/truck/bus/van/container/ship/boat/submersible/train/tram/airplane/mobile home, stadium/city/playground/park/field/track/court/gymnasium/hall/mart/market/supermarket/plaza/square/construction site/hotel/museum/school/hospital/university/garage/mall/airport/train/bus station/terminal/hub/platform, valley/forest/wood/terrain/ landscape/garden/park/patio/land, and/or gas/oil/water pipe/line. Venue may comprise inside/outside of building/facility. Building/facility may have one/multiple floors, with a portion underground.

A event may be monitored based on TSCI. Event may be object/motion/gesture/gait related, such as fall-down, rotation/hesitation/pause, impact (e.g. person hitting sandbag/door/bed/window/chair/table/desk/cabinet/box/another person/animal/bird/fly/ball/bowling/tennis/soccer/volley ball/football/baseball/basketball), two-body action (e.g. person releasing balloon/catching fish/molding clay/writing paper/typing on computer), car moving in garage, person carrying smart phone/walking around venue, autonomous/moveable object/machine moving around (e.g. vacuum cleaner/utility/self-driving vehicle/car/drone).

Task may comprise: (a) sensing task, any of: monitoring/sensing/detection/recognition/estimation/verification/identification/authentication/classification/locationing/guidance/navigation/tracking/counting of/in any of: object/objects/vehicle/machine/tool/human/baby/elderly/patient/intruder/pet presence/proximity/activity/daily-activity/well-being/breathing/vital sign/heartbeat/health condition/sleep/sleep stage/walking/location/distance/speed/acceleration/navigation/tracking/exercise/safety/danger/fall-down/intrusion/security/life- threat/emotion/movement/motion/degree/pattern/periodic/repeated/cyclo-stationary/stationary/regular/transient/sudden/suspicious motion/irregularity/trend/change/breathing/human biometrics/environment informatics/gait/gesture/room/region/zone/venue, (b) computation task, any of: signal processing/preprocess/postprocessing/conditioning/denoising/calibration/analysis/feature extraction/transformation/mapping/supervised/unsupervised/semi-supervised/discriminative/machine/deep learning/training/clustering/training/PCA/eigen-decomposition/frequency/time/functional decomposition/neural network/map-based/model-based processing/correction/geometry estimation/analytics computation, (c) IoT task, any of: smart task for venue/user/object/human/pet/house/home/office/workplace/building/facility/warehouse/factory/store/vehicle/property/structure/assembly-line/IoT/device/system, energy/power management/transfer, wireless power transfer, interacting/engage with user/object/intruder/human/animal (e.g. presence/motion/gesture/gait/activity/behavior/voice/command/instruction/query/music/sound/image/video/location/movement/danger/threat detection/recognition/monitoring/analysis/response/execution/synthesis, generate/retrieve/play/display/render/synthesize dialog/exchange/response/presentation/experience/media/multimedia/expression/sound/speech/music/image/imaging/video/animation/webpage/text/message/notification/reminder/enquiry/warning, detect/recognize/monitor/interpret/analyze/record/store user/intruder/object input/motion/gesture/location/activity), activating/controlling/configuring (e.g. turn on/off/control/lock/unlock/open/close/adjust/configure) a device/system (e.g. vehicle/drone/electrical/mechanical/air-conditioning/heating/lighting/ventilation/clearning/entertainment/IoT/security/siren/access system/device/door/window/garage/lift/elevator/escalator/speaker/television/light/peripheral/accessory/wearable/furniture/appliance/amenity/gadget/alarm/camera/gaming/coffee/cooking/heater/fan/housekeeping/home/office machine/device/robot/vacuum cleaner/assembly line), (d) miscellaneous task, any of: transmission/coding/encryption/storage/analysis of data/parameters/analytics/derived data, upgrading/administration/configuration/coordination/broadcasting/synchronization/networking/encryption/communication/protection/compression/storage/database/archiving/query/cloud computing/presentation/augmented/virtual reality/other processing/task. Task may be performed by some of: Type1/Type2/nearby/portable/another device, and/or hub/local/edge/cloud server.

Task may also comprise: detect/recognize/monitor/locate/interpret/analyze/record/store user/visitor/intruder/object/pet, interact/engage/converse/dialog/exchange with user/object/visitor/intruder/human/baby/pet, detect/locate/localize/recognize/monitor/analyze/interpret/learn/train/respond/execute/synthesize/generate/record/store/summarize health/well-being/daily-life/activity/behavior/pattern/exercise/food-intake/restroom visit/work/play/rest/sleep/relaxation/danger/routine/timing/habit/trend/normality/normalcy/anomaly/regularity/irregularity/change/presence/motion/gesture/gait/expression/emotion/state/stage/voice/command/instruction/question/query/music/sound/location/movement/fall-down/threat/discomfort/sickness/environment/, generate/retrieve/play/display/render/synthesize dialog/exchange/response/presentation/report/experience/media/multimedia/expression/sound/speech/music/image/imaging/video/animation/webpage/text/message/notification/reminder/enquiry/warning, detect/recognize/monitor/interpret/analyze/record/store user/intruder/object input/motion/gesture/location/activity), detect/check/monitor/locate/manage/control/adjust/configure/lock/unlock/arm/disarm/open/close/fully/partially/activate/turn on/off some system/device/object (e.g. vehicle/robot/drone/electrical/mechanical/air-conditioning/heating/ventilation/HVAC/lighting/cleaning/entertainment/IoT/security/siren/access systems/devices/items/components, door/window/garage/lift/elevator/escalator/speaker/television/light/peripheral/accessory/wearable/furniture/appliance/amenity/gadget/alarm/camera/gaming/coffee/cooking/heater/fan/housekeeping/home/office machine/device/vacuum cleaner/assembly line/window/garage/door/blind/curtain/panel/solar panel/sun shade), detect/monitor/locate user/pet do something (e.g. sitting/sleeping on sofa/in bedroom/running on treadmill/cooking/watching TV/eating in kitchen/dining room/going upstairs/downstairs/outside/inside/using rest room), do something (e.g. generate message/response/warning/clarification/notification/report) automatically upon detection, do something for user automatically upon detecting user presence, turn on/off/wake/control/adjust/dim light/music/radio/TV/HiFi/STB/computer/speaker/smart device/air-conditioning/ventilation/heating system/curtains/light shades, turn on/off/pre-heat/control coffee-machine/hot-water-pot/cooker/oven/microwave oven/another cooking device, check/manage temperature/setting/weather forecast/telephone/message/mail/system check, present/interact/engage/dialog/converse (e.g. through smart speaker/display/screen; via webpage/email/messaging system/notification system).

When user arrives home by car, task may be to, automatically, detect user/car approaching, open garage/door upon detection, turn on driveway/garage light as user approaches garage, and/or turn on air conditioner/heater/fan. As user enters house, task may be to, automatically, turn on entrance light/off driveway/garage light, play greeting message to welcome user, turn on user's favorite music/radio/news/channel, open curtain/blind, monitor user's mood, adjust lighting/sound environment according to mood/current/imminent event (e.g. do romantic lighting/music because user is scheduled to eat dinner with girlfriend soon) on user's calendar, warm food in microwave that user prepared in morning, do diagnostic check of all systems in house, check weather forecast for tomorrow/news of interest to user, check calendar/to-do list, play reminder, check telephone answering/messaging system/email, give verbal report using dialog system/speech synthesis, and/or remind (e.g. using audible tool such as speakers/HiFi/speech synthesis/sound/field/voice/music/song/dialog system, using visual tool such as TV/entertainment system/computer/notebook/tablet/display/light/color/brightness/patterns symbols, using haptic/virtual reality/gesture/tool, using smart device/appliance/material/furniture/fixture, using server/hub device/cloud/fog/edge server/home/mesh network, using messaging/notification/communication/scheduling/email tool, using UI/GUI, using scent/smell/fragrance/taste, using neural/nervous system/tool, or any combination) user of someone's birthday/call him, prepare/give report. Task may turn on air conditioner/heater/ventilation system in advance, and/or adjust temperature setting of smart thermostat in advance. As user moves from entrance to living room, task may be to turn on living room light, open living room curtain, open window, turn off entrance light behind user, turn on TV/set-top box, set TV to user's favorite channel, and/or adjust an appliance according to user's preference/conditions/states (e.g. adjust lighting, choose/play music to build romantic atmosphere).

When user wakes up in morning, task may be to detect user moving around in bedroom, open blind/curtain/window, turn off alarm clock, adjust temperature from night-time to day-time profile, turn on bedroom light, turn on restroom light as user approaches restroom, check radio/streaming channel and play morning news, turn on coffee machine, preheat water, and/or turn off security system. When user walks from bedroom to kitchen, task may be to turn on kitchen/hallway lights, turn off bedroom/restroom lights, move music/message/reminder from bedroom to kitchen, turn on kitchen TV, change TV to morning news channel, lower kitchen blind, open kitchen window, unlock backdoor for user to check backyard, and/or adjust temperature setting for kitchen.

When user leaves home for work, task may be to detect user leaving, play farewell/have-a-good-day message, open/close garage door, turn on/off garage/driveway light, close/lock all windows/doors (if user forgets), turn off appliance (e.g. stove/microwave/oven), turn on/arm security system, adjust light/air-conditioning/heating/ventilation systems to "away" profile to save energy, and/or send alerts/reports/updates to user's smart phone.

Motion may comprise any of: no-motion, motion sequence, resting/non-moving motion, movement/change in position/location, daily/weekly/monthly/yearly/repeating/activity/behavior/action/routine, transient/time-varying/fall-down/repeating/repetitive/periodic/pseudo-periodic motion/breathing/heartbeat, deterministic/non-deterministic/probabilistic/chaotic/random motion, complex/combination motion, non-/pseudo-/cyclo-/stationary random motion, change in electro-magnetic characteristics, human/animal/plant/body/machine/mechanical/vehicle/drone motion, air-/wind-/weather-/water-/fluid-/ground/sub-surface/seismic motion, man-machine interaction, normal/abnormal/dangerous/warning/suspicious motion, imminent/rain/fire/flood/tsunami/explosion/collision, head/facial/eye/mouth/tongue/neck/finger/hand/arm/shoulder/upper/lower/body/chest/abdominal/hip/leg/foot/joint/knee/elbow/skin/below-skin/subcutaneous tissue/blood vessel/intravenous/organ/heart/lung/stomach/intestine/bowel/eating/breathing/talking/singing/dancing/coordinated motion, facial/eye/mouth expression, and/or hand/arm/gesture/gait/UI/keystroke/typing stroke.

Type1/Type2 device may comprise heterogeneous IC, low-noise amplifier (LNA), power amplifier, transmit-receive switch, media access controller, baseband radio, and/or 2.4/3.65/4.9/5/6/sub-7/over-7/28/60/76 GHz/another radio. Heterogeneous IC may comprise processor/memory/software/firmware/instructions. It may support broadband/wireless/mobile/mesh/cellular network, WLAN/WAN/MAN, standard/IEEE/3GPP/WiFi/4G/LTE/5G/6G/7G/8G, IEEE 802.11/a/b/g/n/ac/ad/af/ah/ax/ay/az/be/bf/15/16, and/or Bluetooth/BLE/NFC/Zigbee/WiMax.

Processor may comprise any of: general-/special-/purpose/embedded/multi-core processor, microprocessor/microcontroller, multi-/parallel/CISC/RISC processor, CPU/GPU/DSP/ASIC/FPGA, and/or logic circuit. Memory may comprise non-/volatile, RAM/ROM/EPROM/EEPROM, hard disk/SSD, flash memory, CD-/DVD-ROM, magnetic/optical/organic/storage system/network, network/cloud/edge/local/external/internal storage, and/or any non-transitory storage medium. Set of instructions may comprise machine executable codes in hardware/IC/software/firmware, and may be embedded/pre-loaded/loaded upon-boot-up/on-the-fly/on-demand/pre-installed/installed/downloaded.

Processing/preprocessing/postprocessing may be applied to data (e.g. TSCI/feature/characteristics/STI/MI/test quantity/intermediate/data/analytics) and may have multiple steps. Step/pre-/post-/processing may comprise any of: computing function of operands/LOS/non-LOS/single-link/multi-link/component/item/quantity, magnitude/norm/phase/feature/energy/timebase/similarity/distance/characterization score/measure computation/extraction/correction/cleaning, linear/nonlinear/FIR/IIR/MA/AR/ARMA/Kalman/particle filtering, lowpass/bandpass/highpass/median/rank/quartile/percentile/mode/selective/adaptive filtering, interpolation/intrapolation/extrapolation/decimation/subsampling/upsampling/resampling, matched filtering/enhancement/restoration/denoising/smoothing/conditioning/spectral analysis/mean subtraction/removal, linear/nonlinear/inverse/frequency/time transform, Fourier transform (FT)/DTFT/DFT/FFT/wavelet/Laplace/Hilbert/Hadamard/trigonometric/sine/cosine/DCT/power-of-2/sparse/fast/frequency transform, zero/cyclic/padding, graph-based transform/processing, decomposition/orthogonal/non-orthogonal/over-complete projection/eigen-decomposition/SVD/PCA/ICA/compressive sensing, grouping/folding/sorting/comparison/soft/hard/thresholding/clipping, first/second/high order derivative/integration/convolution/multiplication/division/addition/subtraction, local/global/maximization/minimization, recursive/iterative/constrained/batch processing, least mean square/absolute error/deviation, cost function optimization, neural network/detection/recognition/classification/identification/estimation/labeling/association/tagging/mapping/remapping/training/clustering/machine/supervised/unsupervised/semi-supervised learning/network, vector/quantization/encryption/compression/matching pursuit/scrambling/coding/storing/retrieving/transmitting/receiving/time-domain/frequency- domain/normalization/scaling/expansion/representing/merging/combining/splitting/tracking/monitoring/shape/silhouette/motion/activity/analysis, pdf/histogram estimation/importance/Monte Carlo sampling, error detection/protection/correction, doing nothing, time-varying/adaptive processing, conditioning/weighted/averaging/over selected components/links, arithmetic/geometric/harmonic/trimmed mean/centroid/medoid computation, morphological/logical operation/permutation/combination/sorting/AND/OR/XOR/union/intersection, vector operation/addition/subtraction/multiplication/division, and/or another operation. Processing may be applied individually/jointly. Acceleration using GPU/DSP/coprocessor/multicore/multiprocessing may be applied.

Function may comprise: characteristics/feature/magnitude/phase/energy, scalar/vector/discrete/continuous/polynomial/exponential/logarithmic/trigonometric/transcendental/logical/piecewise/linear/algebraic/nonlinear/circular/piecewise linear/real/complex/vector-valued/inverse/absolute/indicator/limiting/floor/rounding/sign/composite/sliding/moving function, derivative/integration, function of function, one-to-one/one-to-many/many-to-one/many-to-many function, mean/mode/median/percentile/max/min/range/statistics/histogram, local/global max/min/zero-crossing, variance/variation/spread/dispersion/deviation/standard deviation/divergence/range/interquartile range/total variation/absolute/total deviation, arithmetic/geometric/harmonic/trimmed mean/square/cube/root/power, thresholding/clipping/rounding/truncation/quantization/approximation, time function processed with an operation (e.g. filtering), sine/cosine/tangent/cotangent/secant/cosecant/elliptical/parabolic/hyperbolic/game/zeta function, probabilistic/stochastic/random/ergodic/stationary/deterministic/periodic/repeated function, inverse/transformation/frequency/discrete time/Laplace/Hilbert/sine/cosine/triangular/wavelet/integer/power-of-2/sparse transform, orthogonal/non-orthogonal/eigen projection/decomposition/eigenvalue/singular value/PCA/ICA/SVD/compressive sensing, neural network, feature extraction, function of moving window of neighboring items of time series, filtering function/convolution, short-time/discrete transform/Fourier/cosine/sine/Hadamard/wavelet/sparse transform, matching pursuit, approximation, graph-based processing/transform/graph signal processing, classification/identification/class/group/category/labeling, processing/preprocessing/postprocessing, machine/learning/detection/estimation/feature extraction/learning network/feature extraction/denoising/signal enhancement/coding/encryption/mapping/vector quantization/remapping/lowpass/highpass/bandpass/matched/Kalman/particle/FIR/IIR/MA/AR/ARMA/median/mode/adaptive filtering, first/second/high order derivative/integration/zero crossing/smoothing, up/down/random/importance/Monte Carlo sampling/resampling/converting, interpolation/extrapolation, short/long term statistics/auto/cross correlation/moment generating function/time averaging/weighted averaging, special/Bessel/Beta/Gamma/Gaussian/Poisson/integral complementary error function.

Sliding time window may have time-varying width/size. It may be small/large at beginning to enable fast/accurate acquisition and increase/decrease over time to steady-state size comparable to motion frequency/period/transient motion duration/characteristics/STI/MI to be monitored. Window size/time shift between adjacent windows may be constant/adaptively/dynamically/automatically changed/adjusted/varied/modified (e.g. based on battery life/power consumption/available computing power/change in amount of targets/nature of motion to be monitored/user request/choice/instruction/command).

Characteristics/STI/MI may be determined based on characteristic value/point of function and/or associated argument of function (e.g. time/frequency). Function may be outcome of a regression. Characteristic value/point may comprise local/global/constrained/significant/first/second/i^th maximum/minimum/extremum/zero-crossing (e.g. with positive/negative time/frequency/argument) of function. Local signal-to-noise-ratio (SNR) or SNR-like parameter may be computed for each pair of adjacent local max (peak)/local min (valley) of function, which may be some function (e.g. linear/log/exponential/monotonic/power/polynomial) of fraction or difference of a quantity (e.g. power/magnitude) of local max over the quantity of local min. Local max (or min) may be significant if its SNR is greater than threshold and/or if its amplitude is greater (or smaller) than another threshold. Local max/min may be selected/identified/computed using persistence-based approach. Some significant local max/min may be selected based on selection criterion (e.g. quality criterion/condition, strongest/consistent significant peak in a range). Unselected significant peaks may be stored/monitored as "reserved" peaks for use in future selection in future sliding time windows. E.g. a particular peak (e.g. at particular argument/time/frequency) may appear consistently over time. Initially, it may be significant but not selected (as other peaks may be stronger). Later, it may become stronger/dominant consistently. When selected, it may be back-traced in time and selected in earlier time to replace previously selected peaks (momentarily strong/dominant but not persistent/consistent). Consistency of peak may be measured by trace, or duration of being significant. Alternatively, local max/min may be selected based on finite state machine (FSM). Decision thresholds may be time-varying, adjusted adaptively/dynamically (e.g. based on back-tracing timing/FSM, or data distribution/statistics).

A similarity score (SS)/component SS may be computed based on two temporally adjacent CI/CIC, of one TSCI or of two different TSCI. The pair may come from same/different sliding window(s). SS or component SS may comprise: time reversal resonating strength (TRRS), auto/cross correlation/covariance, inner product of two vectors, L1/L2/Lk/Euclidean/statistical/weighted/distance score/norm/metric/quality metric, signal quality condition, statistical characteristics, discrimination score, neural network/deep learning network/machine learning/training/discrimination/weighted averaging/preprocessing/denoising/signal conditioning/filtering/time correction/timing compensation/phase offset compensation/transformation/component-wise operation/feature extraction/FSM, and/or another score.

Any threshold may be fixed (e.g. 0, 0.5, 1, 1.5, 2), pre-determined and/or adaptively/dynamically determined (e.g. by FSM, or based on time/space/location/antenna/path/link/state/battery life/remaining battery life/available resource/power/computation power/network bandwidth). Threshold may be applied to test quantity to differentiate two events/conditions/situations/states, A and B. Data (e.g. CI/TSCI/feature/similarity score/test quantity/characteristics/STI/MI) may be collected under A/B in training situation. Test quantity (e.g. its distribution) computed based on data may be compared under A/B to choose threshold based on some criteria (e.g. maximum likelihood (ML), maximum aposterior probability (MAP), discriminative training, minimum Type 1 (or 2) error for given Type 2 (or 1) error, quality criterion, signal quality condition). Threshold may be adjusted (e.g. to achieve different sensitivity), automatically/semi-automatically/manually/adaptively/dynamically, once/sometimes/often/periodically/repeatedly/occasionally/sporadically/on-demand (e.g. based on object/movement/location direction/action/characteristics/STI/MI/size/property/trait/habit/behavior/venue/feature/fixture/furniture/barrier/material/machine/living thing/thing/boundary/surface/medium/map/constraint/model/event/state/situation/condition/time/timing/duration/state/history/user/preference). An iterative algorithm may stop after N iterations, after time-out period, or after test quantity satisfies a condition (e.g. updated quantity greater than threshold) which may be fixed/adaptively/dynamically adjusted.

Searching for local extremum may comprise constrained/minimization/maximization, statistical/dual/constraint/convex/global/local/combinatorial/infinite-dimensional/multi-objective/multi-modal/non-differentiable/particle-swarm/simulation-based optimization, linear/nonlinear/quadratic/higher-order regression, linear/nonlinear/stochastic/constraint/dynamic/mathematical/disjunctive/convex/semidefinite/conic/cone/interior/fractional/integer/sequential/quadratic programming, conjugate/gradient/subgradient/coordinate/reduced descent, Newton's/simplex/iterative/point/ellipsoid/quasi-Newton/interpolation/memetic/genetic/evolutionary/pattern-/gravitational-search method/algorithm, constraint satisfaction, calculus of variations, optimal control, space mapping, heuristics/metaheuristics, numerical analysis, simultaneous perturbation stochastic approximation, stochastic tunneling, dynamic relaxation, hill climbing, simulated annealing, differential evolution, robust/line/Tabu/reactive search/optimization, curve fitting, least square, variational calculus, and/or variant. It may be associated with an objective/loss/cost/utility/fitness/energy function.

Regression may be performed using regression function to fit data, or function (e.g. ACF/transform/mapped) of data, in regression window. During iterations, length/location of regression window may be changed. Regression function may be linear/quadratic/cubic/polynomial/another function. Regression may minimize any of: mean/weighted/absolute/square deviation, error, aggregate/component/weighted/mean/sum/absolute/square/high-order/another error/cost (e.g. in projection domain/selected axes/orthogonal axes), robust error (e.g. first error (e.g. square) for smaller error magnitude, second error (e.g. absolute) for larger error magnitude), and/or weighted sum/mean of multiple errors (e.g. absolute/square error). Error associated with different links/path may have different weights (e.g. link with less noise may have higher weight). Regression parameter (e.g. time-offset associated with max/min regression error of regression function in regression window, location/width of window) may be initialized and/or updated during iterations (e.g. based on target value/range/profile, characteristics/STI/MI/test quantity, object motion/quantity/count/location/state, past/current trend, location/amount/distribution of local extremum in previous windows, carrier/subcarrier frequency/bandwidth of signal, amount of antennas associated with the channel, noise characteristics, histogram/distribution/central/F-distribution, and/or threshold). When converged, current time offset may be at center/left/right (or fixed relative location) of regression window.

In presentation, information may be displayed/presented (e.g. with venue map/environmental model). Information may comprise: current/past/corrected/approximate/map/location/speed/acceleration/zone/region/area/segmentation/coverage-area, direction/path/trace/history/traffic/summary, frequently-visited areas, customer/crowd event/distribution/behavior, crowd-control information, acceleration/speed/vital-sign/breathing/heart-rate/activity/emotion/sleep/state/rest information, motion-statistics/MI/STI, presence/absence of motion/people/pets/object/vital sign, gesture (e.g. hand/arm/foot/leg/body/head/face/mouth/eye)/meaning/control (control of devices using gesture), location-based gesture-control/motion-interpretation, identity/identifier (ID) (e.g. of object/person/user/pet/zone/region, device/machine/vehicle/drone/car/boat/bicycle/TV/air-con/fan/, self-guided machine/device/vehicle), environment/weather information, gesture/gesture control/motion trace, earthquake/explosion/storm/rain/fire/temperature, collision/impact/vibration, event/door/window/open/close/fall-down/accident/burning/freezing/water-/wind-/air-movement event, repeated/pseudo-periodic event (e.g. running on treadmill, jumping up/down, skipping rope, somersault), and/or vehicle event. Location may be one/two/three dimensional (e.g. expressed/represented as 1D/2D/3D rectangular/polar coordinates), relative (e.g. w.r.t. map/environmental model) or relational (e.g. at/near/distance-from a point, halfway between two points, around corner, upstairs, on table top, at ceiling, on floor, on sofa).

Information (e.g. location) may be marked/displayed with some symbol. Symbol may be time-varying/flashing/pulsating with changing color/intensity/size/orientation. Symbol may be a number reflecting instantaneous quantity (e.g. analytics/gesture/state/status/action/motion/breathing/heart rate, temperature/network traffic/connectivity/remaining power). Symbol/size/orientation/color/intensity/rate/characteristics of change may reflect respective motion. Information may be in text or presented visually/verbally (e.g. using pre-recorded voice/voice synthesis)/mechanically (e.g. animated gadget, movement of movable part).

User device may comprise smart phone/tablet/speaker/camera/display/TV/gadget/vehicle/appliance/device/IoT, device with UI/GUI/voice/audio/record/capture/sensor/playback/display/animation/VR/AR (augmented reality)/voice (assistance/recognition/synthesis) capability, and/or tablet/laptop/PC.

Map/floor plan/environmental model (e.g. of home/office/building/store/warehouse/facility) may be 2-/3-/higher-dimensional. It may change/evolve over time (e.g. rotate/zoom/move/jump on screen). Walls/windows/doors/entrances/exits/forbidden areas may be marked. It may comprise multiple layers (overlays). It may comprise maintenance map/model comprising water pipes/gas pipes/wiring/cabling/air ducts/crawl-space/ceiling/underground layout.

Venue may be segmented/subdivided/zoned/grouped into multiple zones/regions/sectors/sections/territories/districts/precincts/localities/neighborhoods/areas/stretches/expance such as bedroom/living/dining/rest/storage/utility/warehouse/conference/work/walkway/kitchen/foyer/garage/first/second floor/offices/reception room/area/regions. Segments/regions/areas may be presented in map/floor plan/model with presentation characteristic (e.g. brightness/intensity/luminance/color/chrominance/texture/animation/flashing/rate).

An example of disclosed system/apparatus/method. Stephen and family want to install disclosed wireless motion detection system to detect motion in their 2000 sqft two-storey town house in Seattle, Washington. Because his house has two storeys, Stephen decides to use one Type2 device (named A) and two Type1 devices (named B and C) in ground floor. His ground floor has three rooms: kitchen, dining and living rooms arranged in straight line, with dining room in middle. He put A in dining room, and B in kitchen and C in living room, partitioning ground floor into 3 zones (dining room, living room, kitchen). When motion is detected by AB pair and/or AC pair, system would analyze TSCI/feature/characteristics/STI/MI and associate motion with one of 3 zones.

When Stephen and family go camping in holiday, he uses mobile phone app (e.g. Android phone app or iPhone app) to turn on motion detection system. If system detects motion, warning signal is sent to Stephen (e.g. SMS, email, push message to mobile phone app). If Stephen pays monthly fee (e.g. $10/month), a service company (e.g. security company) will receive warning signal through wired (e.g. broadband)/wireless (e.g. WiFi/LTE/5G) network and perform security procedure (e.g. call Stephen to verify any problem, send someone to check on house, contact police on behalf of Stephen).

Stephen loves his aging mother and cares about her well-being when she is alone in house. When mother is alone in house while rest of family is out (e.g. work/shopping/vacation), Stephen turns on motion detection system using his mobile app to ensure mother is ok. He uses mobile app to monitor mother's movement in house. When Stephen uses mobile app to see that mother is moving around house among the three regions, according to her daily routine, Stephen knows that mother is ok. Stephen is thankful that motion detection system can help him monitor mother's well-being while he is away from house.

On typical day, mother would wake up at 7 am, cook her breakfast in kitchen for 20 minutes, eat breakfast in dining room for 30 minutes. Then she would do her daily exercise in living room, before sitting down on sofa in living room to watch favorite TV show. Motion detection system enables Stephen to see timing of movement in 3 regions of house. When motion agrees with daily routine, Stephen knows roughly that mother should be doing fine. But when motion pattern appears abnormal (e.g. no motion until 10 am, or in kitchen/motionless for too long), Stephen suspects something is wrong and would call mother to check on her. Stephen may even get someone (e.g. family member/neighbor/paid personnel/friend/social worker/service provider) to check on mother.

One day Stephen feels like repositioning a device. He simply unplugs it from original AC power plug and plugs it into another AC power plug. He is happy that motion detection system is plug-and-play and the repositioning does not affect operation of system. Upon powering up, it works right away.

Sometime later, Stephen decides to install a similar setup (i.e. one Type2 and two Type1 devices) in second floor to monitor bedrooms in second floor. Once again, he finds that system set up is extremely easy as he simply needs to plug Type2 device and Type1 devices into AC power plug in second floor. No special installation is needed. He can use same mobile app to monitor motion in both ground/second floors. Each Type2 device in ground/second floors can interact with all Type1 devices in both ground/second floors. Stephen has more than double capability with combined systems.

Disclosed system can be applied in many applications. Type1/Type2 devices may be any WiFi-enabled devices (e.g. smart IoT/appliance/TV/STB/speaker/refrigerator/stove/oven/microwave/fan/heater/air-con/router/phone/computer/tablet/accessory/plug/pipe/lamp/smoke detector/furniture/fixture/shelf/cabinet/door/window/lock/sofa/table/chair/piano/utensil/wearable/watch/tag/key/ticket/belt/wallet/pen/hat/necklace/implantable/phone/eyeglasses/glass panel/gaming device) at home/office/facility, on table, at ceiling, on floor, or at wall. They may be placed in conference room to count people. They may form a well-being monitoring system to monitor daily activities of older adults and detect any sign of symptoms (e.g. dementia, Alzheimer's disease). They may be used in baby monitors to monitor vital signs (breathing) of babies. They may be placed in bedrooms to monitor sleep quality and detect any sleep apnea. They may be placed in cars to monitor well-being of passengers and drivers, detect sleepy drivers or babies left in hot cars. They may be used in logistics to prevent human trafficking by monitoring any human hidden in trucks/containers. They may be deployed by emergency service at disaster area to search for trapped victims in debris. They may be deployed in security systems to detect intruders.

Indoor falls are fatal to many people due to a lack of timely assistance. Existing approaches for fall detection using cameras and wearable devices intrude on privacy and cause inconvenience. Passive sensing approaches using radar have limited coverage and demand dense deployment. Solutions using commercial off-the-shelf (COTS) WiFi devices are either environment dependent or lack extensive testing in real environments to confidently assess false alarm rates. The present disclosure shows a fusion approach to detect falls with COTS WiFi, where signal processing techniques are leveraged to extract environment-independent features, a neural network is used to detect differentiating patterns in those features. A disclosed system can utilize a lightweight Long Short-Term Memory (LSTM)-based neural network with parameters that can easily be deployed on edge devices. A framework is disclosed to generate an explanation of the network's behavior that supports a calibration-free design. The explanation is generated by probing the neural network (e.g. LSTM) with multiple controlled perturbations. Some controlled perturbations with desirable characteristics or behavior (e.g. causing bad outcome to change and become good outcome, or causing wrong outcome to become correct) are selected to refine or re-train the neural network. The system's detection performance has been extensively tested on to show that the system can detect falls with a high average detection rate in unseen environments.

In some embodiments, the system computes the difference of auto-correlation function (ACF) from CSI power response that holds speed-related information. This allows the system to boost the dynamic signal and extract environment-independent speed-related information, which is a first step in designing a robust fall detection system.

In some embodiments, rather than relying on the extracted speed alone from the wireless CSI for fall detection, the system utilizes other relevant information in the ACF to filter out "fall-like" activities which may trigger false alarms. For example, d-ACF includes information about the peak and valley locations, intensities, and widths. Since it is not possible to design an exhaustive list of handcrafted features, the system may resort to a learning approach that uses ACF information for its classification. Learning approaches generally demand a large dataset to observe useful patterns. However, having extracted the ACF already, the burden is reduced on the classifier module to learn the differentiating features in CSI from the very beginning and overcome the large data set requirement. Additionally, the system can use data augmentation methods to increase the effective data set size.

The present disclosure also discloses explainability or explanation to interpret behaviors of the learning module in the system. To build trust in a system, one need to know if the system is relying on the correct information to make its decisions, as it is not possible to test in all environments. Explainability or explanation has other advantages such as identifying under-fit and over-fit scenarios and reducing computational complexity by removing or avoiding preprocessing of irrelevant parts of the data. In some embodiments, a novel technique called ID-CAM (Iterative Distortion-Class Activation Map) is used to obtain a heatmap highlighting the significance of different portions of the input. From the resultant heatmap, one can prove that the disclosed learning module is indeed focusing on portions of the input that embed high speed information to classify a fall event. With this design, an example system called FallAware is disclosed, which is an explainable and environment-independent fall detection system. Extensive testing has proven the robustness of FallAware. The explanation may be generated by applying controlled or systematic perturbation to input data and monitoring how the outcome changes with the perturbation. Some controlled perturbation that cause bad (or wrong) outcomes to become good (or correct) outcomes may be selected for retraining or refining the classifier (e.g. neural network) of the system. Similarly, some controlled perturbation that cause good outcomes to become bad may be selected also for retraining or refining the classifier.

Fall detection is distinct from other applications (e.g. activity sensing, breathing detection, sleep monitoring, indoor tracking and human identification) due to the rapid and transient nature of a fall. In some embodiments, unlike other applications, falls need to be detected using <2 sec of CSI and there is limited potential for improvement in detection using a longer CSI observation time. The disclosed system can use a higher sampling rate to build a robust system that can detect falls with high accuracy and minimal false alarms.

In some embodiments, FallAware can achieve high detection rate and low false alarm rate with comprehensive real world fall, showing superior performance and generalizability compared to other systems. In some embodiments, FallAware is a high-accuracy environment-independent fall detection system that uses wireless CSI from COTS WiFi devices. By leveraging a model-based feature extraction approach, combined with the power of learning techniques, a method or software solution can easily be used alongside existing WiFi infrastructure.

In some embodiments, the system may use of a preprocessed feature (e.g. d-ACF) that embeds speed-related information, as input to the learning module. Speed-related information is an intuitive and reliable feature for fall vs non-fall activity classification. With a novel feature significance visualization technique called 1D-CAM, the classifier is indeed relying on the high-speed regions of the input for its fall decisions, which builds trust in the system and mitigates unforeseen behavior in new environments.

In some embodiments, instead of a binary classification of an activity into a fall event or normal activity, a disclosed method calculates the likelihood of a fall event. By choosing different thresholds on the likelihood, FallAware can be tailored to different scenarios for optimum performance. For example, a single occupancy home with an older person can use a high sensitivity (e.g. a threshold of 0.2), while a household with multiple people and kids/pets can work with a lower sensitivity (e.g. a threshold of 0.7). This flexibility enhances the overall user experience by reducing false alarms, yet ensuring a good fall detection rate in that scenario.

In some embodiments, a disclosed neural network architecture includes a small number of parameters, thanks to a robust model-based feature selection. Such an efficient solution enables implementation on edge devices, without the need for a cloud platform and thus ensures low cost and stability.

FIG. 1 illustrates an example scenario where a motion/event/activity (e.g. fall/abrupt/impulsive/transient/impactful motion, motion that generates sound/vibration/pressure change, or target motion) is detected (or monitored) based on wireless signal or auxiliary signal or both in a venue, according to one embodiment of the present teaching. For example, as shown in FIG. 1, in a 2-bedroom apartment 100, Origin 101 (Type2 device) may be placed in the living-room area 102, Bot 1 110 (e.g. Type1 device) may be placed in a bedroom1-area 112, and Bot 2 120 (e.g. Type1 device) may be placed in the dining-room area 122. A sensor 200 (e.g. microphone/camera/light sensor/pressure sensor) may also be placed somewhere in the apartment 100 to capture auxiliary sensing signals (e.g. sound/image/video/light/pressure/vibration). During the motion/event/activity (e.g. a person 210 falls down making sound that is picked up by microphone sensor 200), each of Bot 1 110 and Bot 2 120 can transmit a wireless (sounding/probe) signal to the Origin 101, which can obtain channel information of a wireless multipath channel based on the wireless signal. A motion information (MI) or radio-based MI (RMI) can be computed based on the channel information. During the motion/event/activity, the sensor 200 can capture an associated auxiliary signal. An aux-based motion information (AMI) can be computed based on the auxiliary signal. The motion/event/activity can be detected/monitored individually based on the RMI alone (radio-based), individually based on the AMI alone (aux-based), or jointly based on both the RMI and AMI (radio-aux-based, e.g. sequentially radio-based followed by aux-based, or sequentially aux-based followed by radio-based, or simultaneously/contemporaneously by both radio-based and aux-based).

If object motion/activity is detected based on wireless signals transmitted by both Bot 1 110 and Bot 2 120, localization may be performed such that a location of the activity/motion/event or the object (e.g. person/user) may be determined the living-room area 102. If detection is based only on wireless signals transmitted by Bot 1 110, the location may be determined to be in the bedroom-1 area 112. If detection is based only on wireless signals transmitted by Bot 2 120, the location may be determined in the dining-room area 122. If target motion/event/activity cannot be detected based on wireless signals transmitted by either Bot 1 110 or Bot 2 120, then it may be determined that nobody and no object is in the apartment 100. The corresponding area where the activity/motion/event/person/user is detected may be marked with a predetermined pattern.

Figure 2:
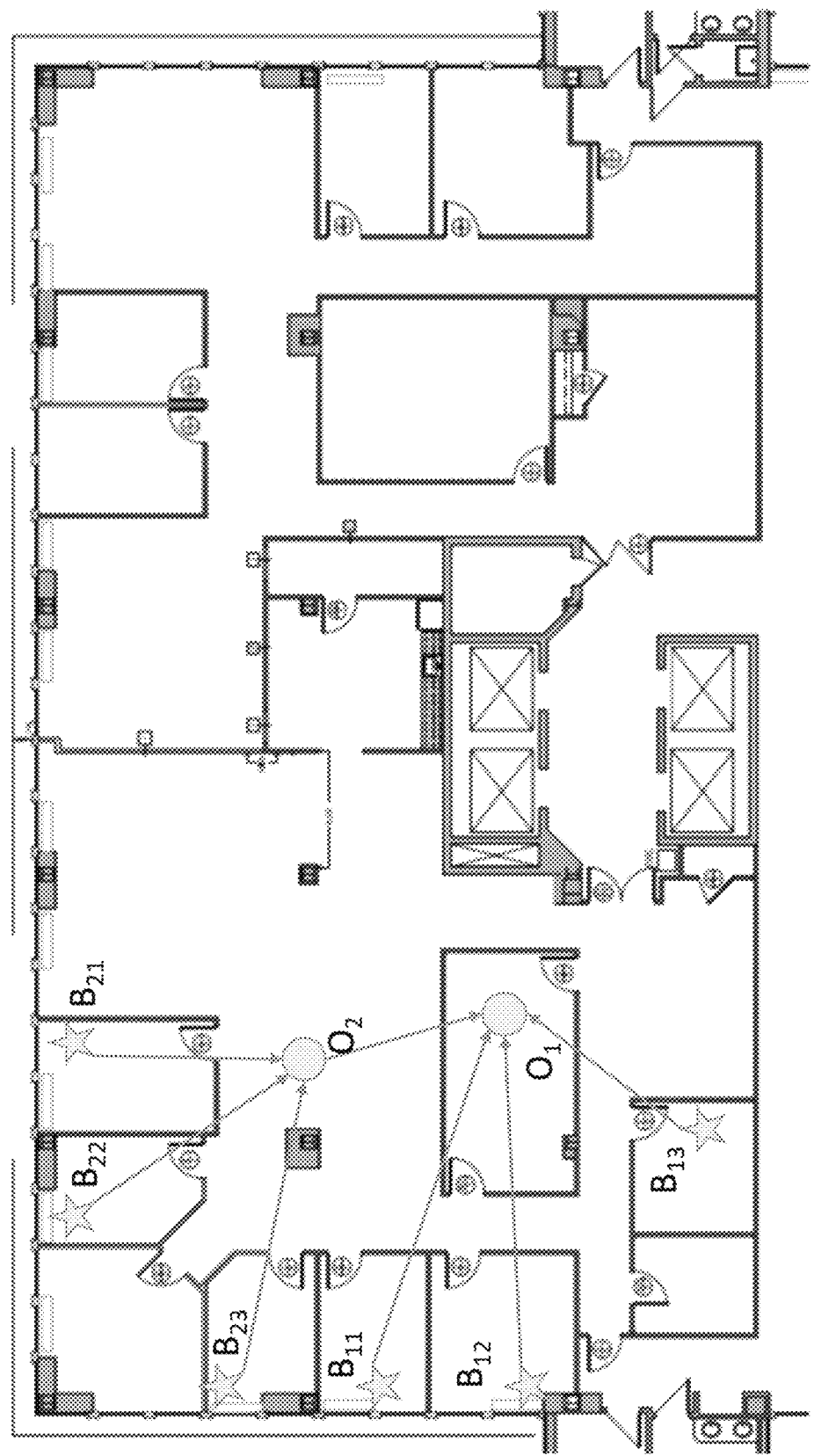
FIG. 2 illustrates an example floor plan and placement of wireless devices for wireless sensing, according to some embodiments of the present disclosure.

FIG. 2 illustrates an example floor plan and placement of wireless devices for wireless monitoring with motion/event/activity detection and localization, according to some embodiments of the present disclosure. In the example shown in FIG. 2, there are two origins O1 and O2. Each origin is associated with three bots. For example, O1 is associated with bots B11, B12, and B13 (together constitute a first origin group); and O2 is associated with bots B21, B22, and B23 (together constitute a second origin group). Each device of the bots and origins is fixed at a different location. In one embodiment, the origin O1 is called a master origin; and the origin O2 is called a child origin, where the child origin can transmit statistics and information to the master origin for combination.

In some embodiments, the floor plan and placement of wireless devices in FIG. 2 can be used to perform multi-person or multi-object motion localization based on motion statistics. When there are two or more origins, motion statistics (or RMI) measured from different links of different origins are combined to contribute together to the motion localization. For each activated bot, it is determined which origin the bot is associated with, e.g. based on a smoothed motion statistics in a time window. For example, when the smoothed motion statistics of Bot k with respect to Origin j is larger than a threshold, Bot k is determined to be associated with Origin j. The same threshold can be used for other origins. Thus, for each origin, a set of activated bots associated with the origin can be determined. A likelihood is calculated for each activated bot k to detect a motion, and is smoothed over a time window. For each origin group including an origin and its associated bots (e.g. O1, B11, B12, B13), an average motion statistics is computed for the origin group across all the associated bots. Each calculation or computation above can be performed at the origin or the bot.

When there is any motion detected in the environment, an origin group with the highest average motion statistics is chosen. When the average motion statistics of the chosen origin group is larger than a threshold, the motion is determined to be around the origin of the group. Otherwise, when the average motion statistics of the chosen origin group is not larger than a threshold, the motion is determined to be around the bot with the highest likelihood within the origin group.

WiFi signals in the 5 GHz band experience multiple reflections and scattering in typically crowded indoor environments. In some embodiments, the channel response of OFDM-based WiFi systems is available in the form of Channel State Information (CSI) from COTS WiFi devices. If X(t,f) and Y(t,f) are the transmitted and received signals over the subcarrier frequency f at time t, then the estimate of CSI is given by $$H(t, f) = \frac{Y(t, f)}{X(t, f)}.$$

Given a rich-scattering indoor environment, one can derive that, (i) speed of the dynamic scatterers is embedded in the autocorrelation function (ACF) of the received electric field at the receiver (Rx), and (ii) the power of the channel response from WiFi devices, given by $G(t,f)=|H(t,f)|^2$, can be treated as an equivalent of the power of the received electric field. From (i) and (ii), the ACF of G can be derived to be proportional to a weighted sum of ACF of different electric field components. The magnitudes of the theoretical ACFs of these different electric field components decay with oscillations with distance. However, it can be observed that, (iii) the first local peak of differential of ACF of G coincides with the first local peak of the differential of these superimposed ACFs of electric field components.

Specifically, $\rho_G(\tau,f)=[\gamma_G(\tau,f)/\gamma_G(0,f)]$ gives the ACF of G, where $\gamma_G(\tau,f)$ is the sample covariance of G at a time lag $\tau$. Using (i) and (iii), it can be shown that the location of the first local peak of $\Delta\rho_G(\tau,f)$ includes the speed of movement information. If $\hat{\tau}$ is the location of the first peak in $\Delta\rho_G(\tau,f)$, the speed of movement is given by $v=0.54\lambda/\hat{\tau}$, where $\lambda$ is the wavelength (5.17 cm for 5.805 GHz carrier frequency).

In practice, $\Delta\rho_G(\tau,f)$, is noisy, and therefore values from different subcarriers are aggregated to boost the SNR of the signal. For this, Maximal Ratio Combining (MRC) may be adopted to combine signals from multiple receiver antennae. For MRC, the top 5 subcarriers based on the highest value of $$\rho_G\left(\frac{1}{F_s}, f\right),$$

which is indicative of the "strength" of motion recorded by each subcarrier are selected in some embodiments. In the following discussions, variable f is ignored and $\Delta\rho_G(\tau,f)$ after MRC is simply denoted by $\Delta\rho_G(\tau)$. In some embodiments, several instances of $\Delta\rho_G(\tau)$ over 4 sec for a human walking may be determined. This matrix will be referred to as d-ACF, which is computed with a time step of 0.02 sec and with a maximum time lag, $\Delta=0.1$ sec. The black dots highlight the location of the first peak at every time instance. It can be shown that d-ACF plays a significant role in the design of FallAware.

Figure 3:
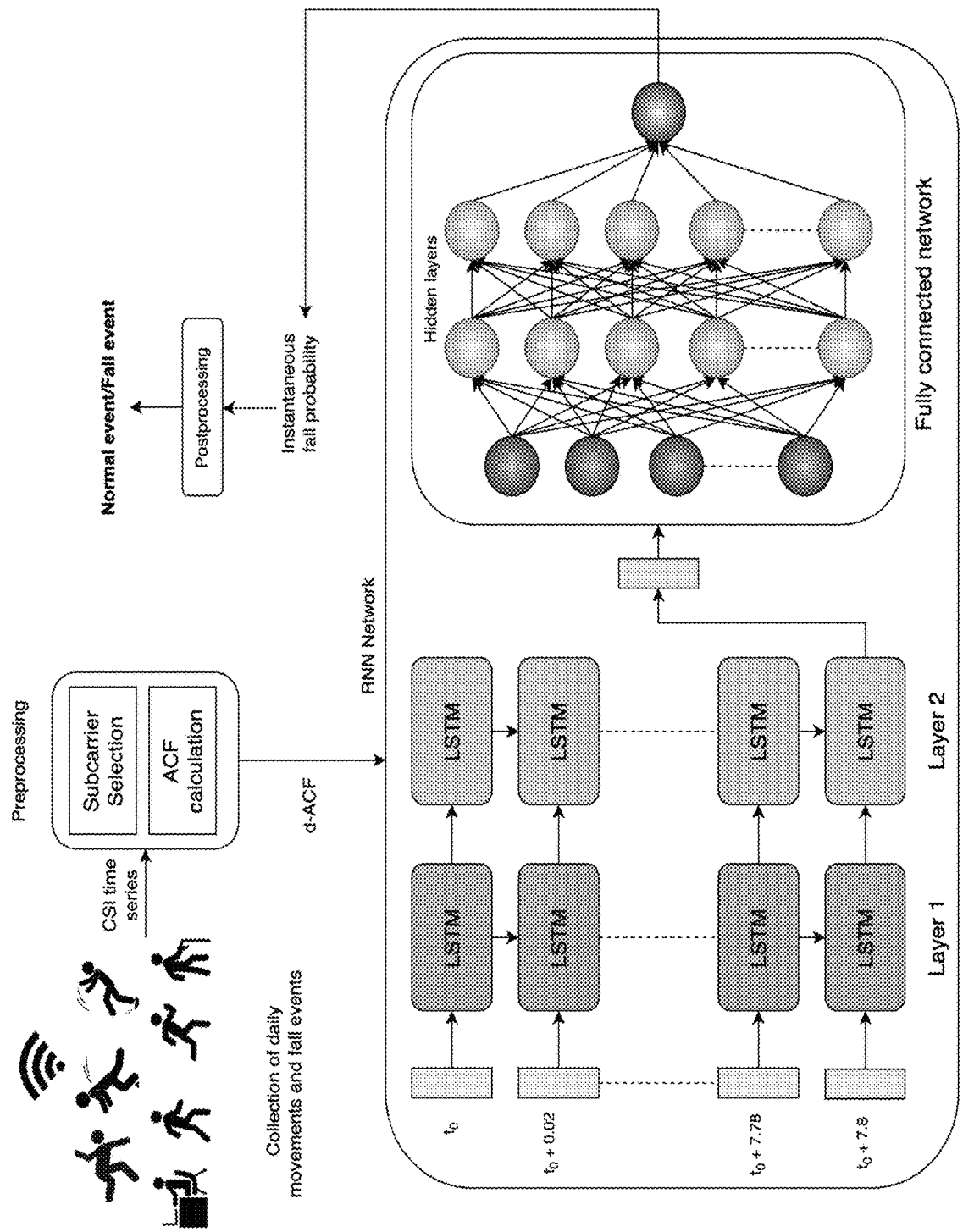
FIG. 3 illustrates an example framework of a system for fall detection, according to some embodiments of the present disclosure.

In some embodiments, the design of FallAware has three stages: (1) Preprocessing, (2) Learning, and (3) Postprocessing. In some embodiments, an example overview of the FallAware system is shown in FIG. 3. The CSI time series is processed in stage (1), which is fed into a neural network in stage (2). The output of stage (2) is processed in stage (3) to determine if a fall has occurred in the given observation time of the CSI. More details of each stage are provided below.

In the Preprocessing stage, among the features that could be extracted from the WiFi CSI, the most intuitive and differentiating feature for an environment-independent fall event classification is the speed of movement. The speed extraction from d-ACF could potentially remove other useful context information. Also, the noisy d-ACF could result in incorrect speed values at times, which might affect the performance, given the transient nature of the fall event. Therefore, the system can use d-ACF as input for stage (2) to include more information and context. In some embodiments, using speed alone has lower classification performance compared to using d-ACF in stage (2). In some embodiments, the pattern of fall events typically involves an increasing speed region (where the peak moves closer to the zero time lag) and a quickly decreasing speed region (where the peak moves away from the zero time lag). This pattern is similar in different environments, which is crucial for the design of an environment-independent fall detector. In some examples, one can use a time lag ($\Delta$) of 0.03 sec and a CSI time duration of 8 sec to calculate the d-ACF input to stage (2).

Given the d-ACF from the stage (1), the goal in the Learning stage is to identify patterns that can segregate fall events. The location of the peaks in the d-ACF is related to the speed of movement. Therefore, it is important to keep track of the relative time information in the d-ACF both in the time lag (t) dimension and the observation time, t. The observation time t could help to differentiate falls from other normal activities that "look" like falls but are slower. For instance, when a door closes, it is possible to have an increasing speed followed by a deceleration period, which is similar to a fall. The duration of this increasing and decreasing speed pattern could be a key feature in differentiating falls from door-closing events. Recurrent Neural Networks (RNNs) are effective at both time series classification and pattern recognition due to their inherent ability to remember and learn correlations among data. The system can adopt the Long-Short Term Memory (LSTM) variation of RNNs to overcome the exploding/vanishing gradient problem and to retain information from past time steps. In some embodiments, FallAware may use other neural network architectures with a similar number of learnable parameters. The output of the Learning stage is a scalar with fall probability pf.

In the Postprocessing stage, a straightforward approach to do a binary classification of fall vs non-fall events is to apply a threshold of 0.5 on pf and classify all activities above the threshold as falls. However, such an approach discards useful information about the value of pf. In some embodiments, instead of using a fixed threshold of 0.5 on pf, the system can apply different thresholds (0-1), to obtain different pairs of detection and false alarm rates, which together formed the ROC curve. Further, instead of using pf from one time instance, t, pf is observed from several previous time instances and its mean value is compared against the threshold. The ROC curve obtained by thresholding on the instantaneous pf is compared against the ROC curve where the threshold is applied on a moving average of pf. When using a window, there are more points on the ROC, closer to the low FAR. This enables users to pick a threshold corresponding to the desired detection rate and tolerable low FAR according to the household scenario. For example, if the user intends to be notified of every potential fall event and can tolerate a few false alarms, the threshold can be set to a very low value. In some examples, given an observation window length (e.g. 5 seconds) and a likelihood threshold, the mean value of pf in the observation window is compared against the threshold to determine if the activity is a fall or a routine activity.

In some embodiments, to generate explainability or explanation of FallAware, an LSTM network is used in stage (2) of FallAware. One can train the LSTM network with fall and routine activities from different environments and test it on unseen environments. However, since it is not practically possible to test on all types of environments, it is vital to verify if the LSTM network is drawing its inferences from the correct regions of the input. Class Activation Maps (CAMs) may be used to highlight the important portions of images in Convolution Neural Networks (CNN). In some embodiments, an approach called Iterative Distortion-Class Activation Map (ID-CAM) is utilized to provide high-resolution importance maps. The explanation may be generated by applying controlled perturbation with various perturbation types and sizes (or degrees) to input data and monitoring how the outcome changes with the perturbation types and sizes. Some controlled perturbation with minimal perturbation sizes that cause bad (or wrong) outcomes to become good (or correct) outcomes may be searched and selected for retraining or refining the classifier (e.g. neural network) of the system. Similarly, some controlled perturbation with minimal perturbation sizes that cause good outcomes to become bad may be selected also for retraining or refining the classifier.

An example method and algorithm of ID-CAM is shown in FIG. 4, according to some embodiments. The idea may be to distort different portions of the input ($I_o$) and observe the corresponding output class probabilities. By averaging the difference between the updated output probabilities ($\rho_{fi}$) and the class probability without input distortion ($\rho_{fo}$), one can obtain the regions that are most important for a decision, as a heatmap. As the number of iterations (N) of distortion increases, the heatmap converges to highlight the most important portions of the input. An example of the convergence of the heatmap can show that after several iterations, the heatmap converges to the high-speed region of the fall, indicating that the network is mostly relying on this part of the data for its fall decision. The observation also aligns with an intuition and the physical differentiating characteristics of a fall from other events. From the true positive and false positive examples, it is evident that highspeed regions contribute the most to a fall decision. On the other hand, for a no-fall decision, the focus region is lower in the vertical dimension (time lag), indicating reliance on low-speed related information. The LSTM network is thus able to generalize well to unseen data and learn to focus on the important regions of the input, justifying our design. In some embodiments, the ID-CAM is used only to verify the training and to interpret the model's behavior in the design phase, and is not included in the pipeline of FallAware.

In some embodiments, the explainability of FallAware comes from not only IDCAM but also the different system components. First, d-ACF contains speed and gait-related information. Second, the significance of peak locations along the time-lag dimension is directly linked to speed estimations. Further, ID-CAM demonstrates that the network indeed uses the peak and valley locations corresponding to the high-speed regions to make fall decisions.

In some embodiments, motion classification algorithms can be incorporated into the system to account for active pet movements and any resultant false alarms. Adding training data from pets could further enhance FallAware for these scenarios.

In some embodiments, there is no other significant source of motion in the environment at the time of a fall. In some embodiments, in a multi-person scenario, the fallen person will likely get help. In the case of interference from mechanical objects such as the ceiling fan, additional preprocessing might be needed to remove periodic interferences.

In some embodiments, FallAware treats each Tx-Rx link as an independent system. When multiple Tx-Rx links are available in some embodiments, fusing information from multiple Rx can give better insights about the type of motion and improve overall performance.

In some embodiments, the system uses MRC to generate overall d-ACF using information from individual subcarriers. In some embodiments, different subcarrier ACFs could capture/embed speed information of different body parts that can provide more contexts for the learning module of the system to better detect softer falls.

Figure 5:
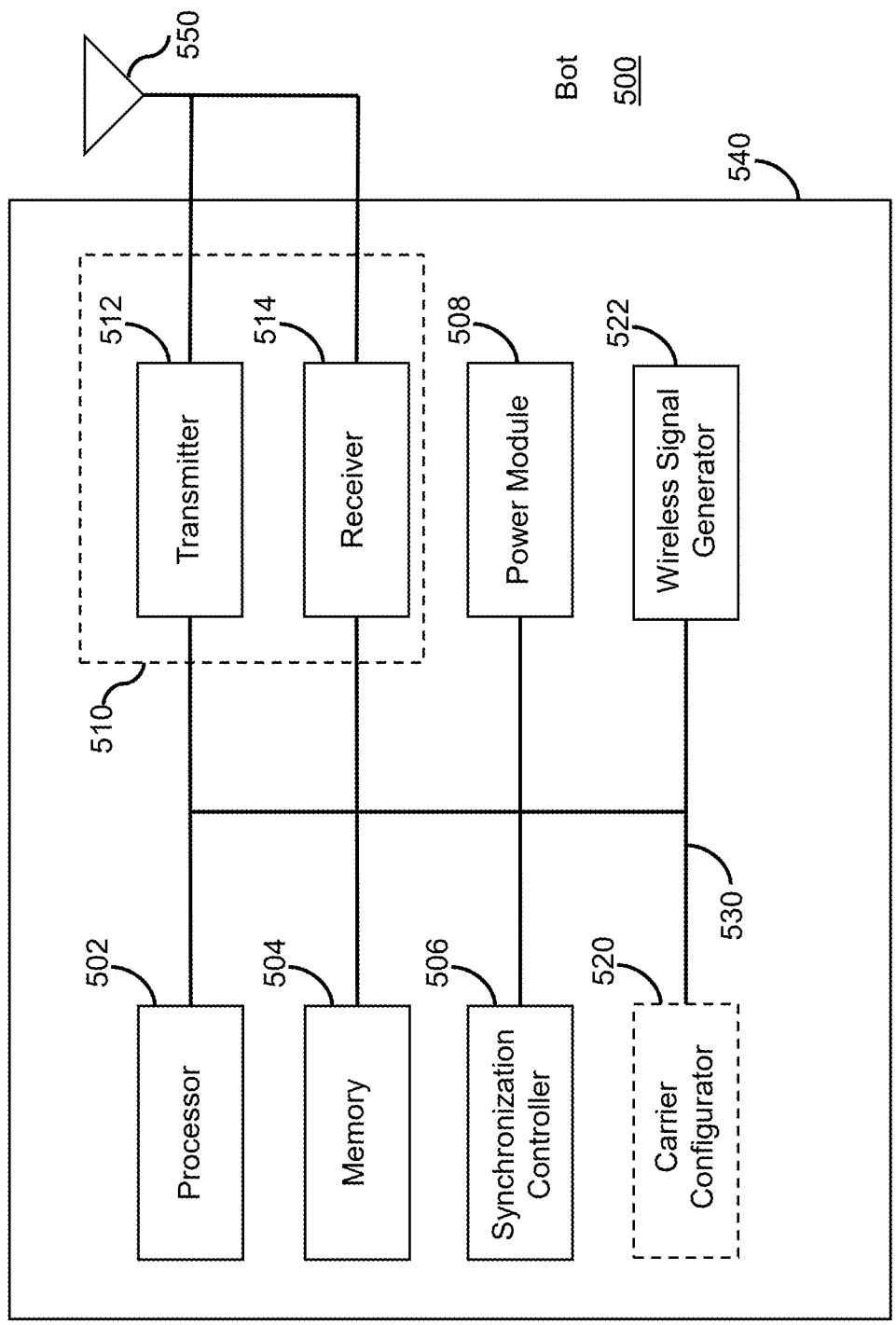
FIG. 5 illustrates an example block diagram of a first wireless device of a system for wireless sensing, according to some embodiments of the present disclosure.

FIG. 5 illustrates an example block diagram of a first wireless device, e.g. a Bot 500, of a wireless sensing system, according to one embodiment of the present teaching. The Bot 500 is an example of a device that can be configured to implement the various methods described herein. As shown in FIG. 5, the Bot 500 includes a housing 540 containing a processor 502, a memory 504, a transceiver 510 comprising a transmitter 512 and receiver 514, a synchronization controller 506, a power module 508, an optional carrier configurator 520 and a wireless signal generator 522.

In this embodiment, the processor 502 controls the general operation of the Bot 500 and can include one or more processing circuits or modules such as a central processing unit (CPU) and/or any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable circuits, devices and/or structures that can perform calculations or other manipulations of data.

The memory 504, which can include both read-only memory (ROM) and random access memory (RAM), can provide instructions and data to the processor 502. A portion of the memory 504 can also include non-volatile random access memory (NVRAM). The processor 502 typically performs logical and arithmetic operations based on program instructions stored within the memory 504. The instructions (a.k.a., software) stored in the memory 504 can be executed by the processor 502 to perform the methods described herein. The processor 502 and the memory 504 together form a processing system that stores and executes software. As used herein, "software" means any type of instructions, whether referred to as software, firmware, middleware, microcode, etc. which can configure a machine or device to perform one or more desired functions or processes. Instructions can include code (e.g., in source code format, binary code format, executable code format, or any other suitable format of code). The instructions, when executed by the one or more processors, cause the processing system to perform the various functions described herein.

The transceiver 510, which includes the transmitter 512 and receiver 514, allows the Bot 500 to transmit and receive data to and from a remote device (e.g., an Origin or another Bot). An antenna 550 is typically attached to the housing 540 and electrically coupled to the transceiver 510. In various embodiments, the Bot 500 includes (not shown) multiple transmitters, multiple receivers, and multiple transceivers. In one embodiment, the antenna 550 is replaced with a multi-antenna array 550 that can form a plurality of beams each of which points in a distinct direction. The transmitter 512 can be configured to wirelessly transmit signals having different types or functions, such signals being generated by the processor 502. Similarly, the receiver 514 is configured to receive wireless signals having different types or functions, and the processor 502 is configured to process signals of a plurality of different types.

The Bot 500 in this example may serve as Bot 1 110 or Bot 2 120 in FIG. 1 for detecting object motion in a venue. For example, the wireless signal generator 522 may generate and transmit, via the transmitter 512, a wireless signal through a wireless multipath channel impacted by a motion of an object in the venue. The wireless signal carries information of the channel. Because the channel was impacted by the motion, the channel information includes motion information that can represent the motion of the object. As such, the motion can be indicated and detected based on the wireless signal. The generation of the wireless signal at the wireless signal generator 522 may be based on a request for motion detection from another device, e.g. an Origin, or based on a system pre-configuration. That is, the Bot 500 may or may not know that the wireless signal transmitted will be used to detect motion.

The synchronization controller 506 in this example may be configured to control the operations of the Bot 500 to be synchronized or un-synchronized with another device, e.g. an Origin or another Bot. In one embodiment, the synchronization controller 506 may control the Bot 500 to be synchronized with an Origin that receives the wireless signal transmitted by the Bot 500. In another embodiment, the synchronization controller 506 may control the Bot 500 to transmit the wireless signal asynchronously with other Bots. In another embodiment, each of the Bot 500 and other Bots may transmit the wireless signals individually and asynchronously.

The carrier configurator 520 is an optional component in Bot 500 to configure transmission resources, e.g. time and carrier, for transmitting the wireless signal generated by the wireless signal generator 522. In one embodiment, each CI of the time series of CI has one or more components each corresponding to a carrier or sub-carrier of the transmission of the wireless signal. The detection of the motion may be based on motion detections on any one or any combination of the components.

The power module 508 can include a power source such as one or more batteries, and a power regulator, to provide regulated power to each of the above-described modules in FIG. 5. In some embodiments, if the Bot 500 is coupled to a dedicated external power source (e.g., a wall electrical outlet), the power module 508 can include a transformer and a power regulator.

The various modules discussed above are coupled together by a bus system 530. The bus system 530 can include a data bus and, for example, a power bus, a control signal bus, and/or a status signal bus in addition to the data bus. It is understood that the modules of the Bot 500 can be operatively coupled to one another using any suitable techniques and mediums.

Although a number of separate modules or components are illustrated in FIG. 5, persons of ordinary skill in the art will understand that one or more of the modules can be combined or commonly implemented. For example, the processor 502 can implement not only the functionality described above with respect to the processor 502, but also implement the functionality described above with respect to the wireless signal generator 522. Conversely, each of the modules illustrated in FIG. 5 can be implemented using a plurality of separate components or elements.

Figure 6:
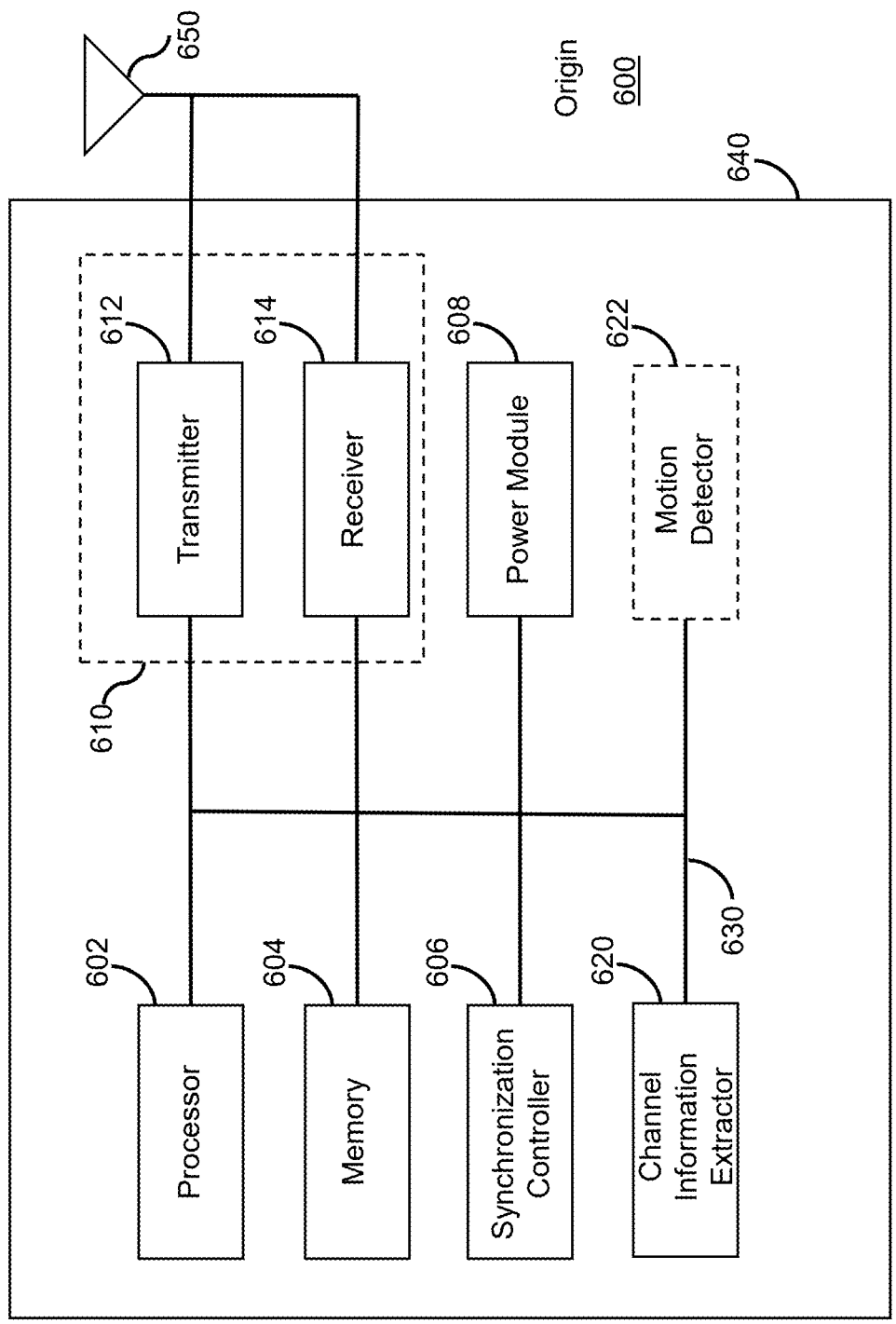
FIG. 6 illustrates an example block diagram of a second wireless device of a system for wireless sensing, according to some embodiments of the present disclosure.

FIG. 6 illustrates an example block diagram of a second wireless device, e.g. an Origin 600, of a wireless sensing system, according to one embodiment of the present teaching. The Origin 600 is an example of a device that can be configured to implement the various methods described herein. The Origin 600 in this example may serve as Origin 101 in FIG. 1 for detecting object motion in a venue. As shown in FIG. 6, the Origin 600 includes a housing 640 containing a processor 602, a memory 604, a transceiver 610 comprising a transmitter 612 and a receiver 614, a power module 608, a synchronization controller 606, a channel information extractor 620, and an optional motion detector 622.

In this embodiment, the processor 602, the memory 604, the transceiver 610 and the power module 608 work similarly to the processor 502, the memory 504, the transceiver 510 and the power module 508 in the Bot 500. An antenna 650 or a multi-antenna array 650 is typically attached to the housing 640 and electrically coupled to the transceiver 610.

The Origin 600 may be a second wireless device that has a different type from that of the first wireless device (e.g. the Bot 500). In particular, the channel information extractor 620 in the Origin 600 is configured for receiving the wireless signal through the wireless multipath channel impacted by the motion of the object in the venue, and obtaining a time series of channel information (CI) of the wireless multipath channel based on the wireless signal. The channel information extractor 620 may send the extracted CI to the optional motion detector 622 or to a motion detector outside the Origin 600 for detecting object motion in the venue.

The motion detector 622 is an optional component in the Origin 600. In one embodiment, it is within the Origin 600 as shown in FIG. 6. In another embodiment, it is outside the Origin 600 and in another device, which may be a Bot, another Origin, a cloud server, a fog server, a local server, and an edge server. The optional motion detector 622 may be configured for detecting the motion of the object in the venue based on motion information related to the motion of the object. The motion information associated with the first and second wireless devices is computed based on the time series of CI by the motion detector 622 or another motion detector outside the Origin 600.

The synchronization controller 606 in this example may be configured to control the operations of the Origin 600 to be synchronized or un-synchronized with another device, e.g. a Bot, another Origin, or an independent motion detector. In one embodiment, the synchronization controller 606 may control the Origin 600 to be synchronized with a Bot that transmits a wireless signal. In another embodiment, the synchronization controller 606 may control the Origin 600 to receive the wireless signal asynchronously with other Origins. In another embodiment, each of the Origin 600 and other Origins may receive the wireless signals individually and asynchronously. In one embodiment, the optional motion detector 622 or a motion detector outside the Origin 600 is configured for asynchronously computing respective heterogeneous motion information related to the motion of the object based on the respective time series of CI.

The various modules discussed above are coupled together by a bus system 630. The bus system 630 can include a data bus and, for example, a power bus, a control signal bus, and/or a status signal bus in addition to the data bus. It is understood that the modules of the Origin 600 can be operatively coupled to one another using any suitable techniques and mediums.

Although a number of separate modules or components are illustrated in FIG. 6, persons of ordinary skill in the art will understand that one or more of the modules can be combined or commonly implemented. For example, the processor 602 can implement not only the functionality described above with respect to the processor 602, but also implement the functionality described above with respect to the channel information extractor 620. Conversely, each of the modules illustrated in FIG. 6 can be implemented using a plurality of separate components or elements.

In one embodiment, in addition to the Bot 500 and the Origin 600, the system may also comprise: an assistance device, a third wireless device, e.g. another Bot, configured for transmitting an additional heterogeneous wireless signal through an additional wireless multipath channel impacted by the motion of the object in the venue, or a fourth wireless device, e.g. another Origin, that has a different type from that of the third wireless device. The fourth wireless device may be configured for: receiving the additional heterogeneous wireless signal through the additional wireless multipath channel impacted by the motion of the object in the venue, and obtaining a time series of additional channel information (CI) of the additional wireless multipath channel based on the additional heterogeneous wireless signal. The additional CI of the additional wireless multipath channel is associated with a different protocol or configuration from that associated with the CI of the wireless multipath channel. For example, the wireless multipath channel is associated with LTE, while the additional wireless multipath channel is associated with Wi-Fi. In this case, the optional motion detector 622 or a motion detector outside the Origin 600 is configured for detecting the motion of the object in the venue based on both the motion information associated with the first and second wireless devices and additional motion information associated with the third and fourth wireless devices computed by at least one of: an additional motion detector and the fourth wireless device based on the time series of additional CI.

In some embodiments, the present teaching discloses systems and methods for wireless sensing with classifier probing and refinement.

Figure 7:
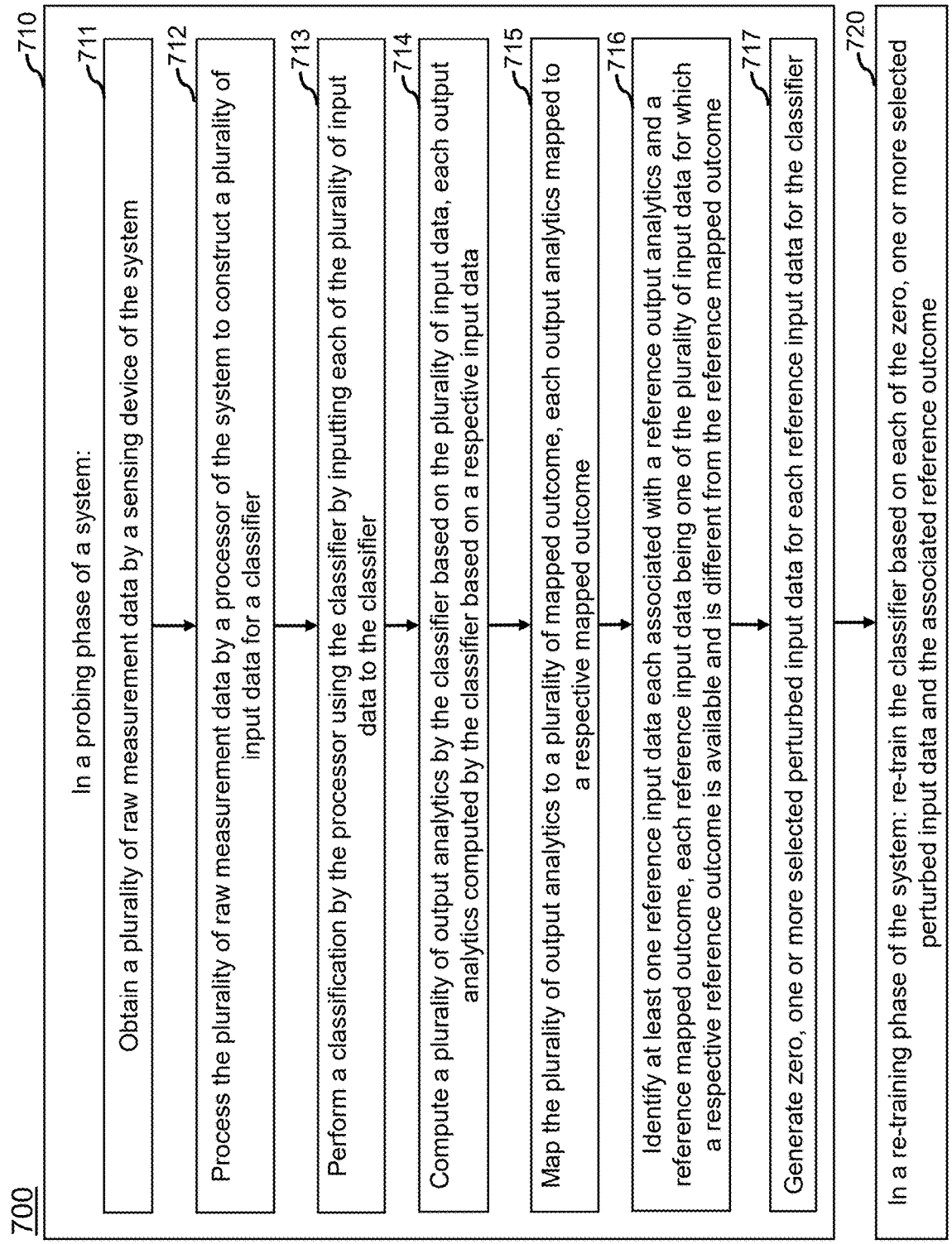
FIG. 7 illustrates a flow chart of an example method for performing wireless sensing with classifier probing and refinement, according to some embodiments of the present disclosure.

FIG. 7 illustrates a flow chart of an example method 700 for performing wireless sensing with classifier probing and refinement, according to some embodiments of the present disclosure. In various embodiments, the method 700 can be performed by the systems disclosed above. As shown in FIG. 7, the operation 710 in this example includes multiple sub-operations 711~717 performed in a probing phase of a system. At sub-operation 711, a plurality of raw measurement data is obtained by a sensing device of the system. The plurality of raw measurement data is processed by a processor of the system to construct a plurality of input data for a classifier at sub-operation 712. At sub-operation 713, a classification is performed by the processor using the classifier by inputting each of the plurality of input data to the classifier. A plurality of output analytics is computed at sub-operation 714 by the classifier based on the plurality of input data, each output analytics computed by the classifier based on a respective input data.

At sub-operation 715, the plurality of output analytics is mapped to a plurality of mapped outcome, each output analytics mapped to a respective mapped outcome. At least one reference input data is identified at sub-operation 716, each associated with a reference output analytics and a reference mapped outcome, each reference input data being one of the plurality of input data for which a respective reference outcome is available and is different from the reference mapped outcome. At sub-operation 717, zero or at least one selected perturbed input data is generated for each reference input data for the classifier. At operation 720, the classifier is re-trained in a re-training phase of the system, based on each of the zero or at least one selected perturbed input data and the associated reference outcome.

Figure 8:
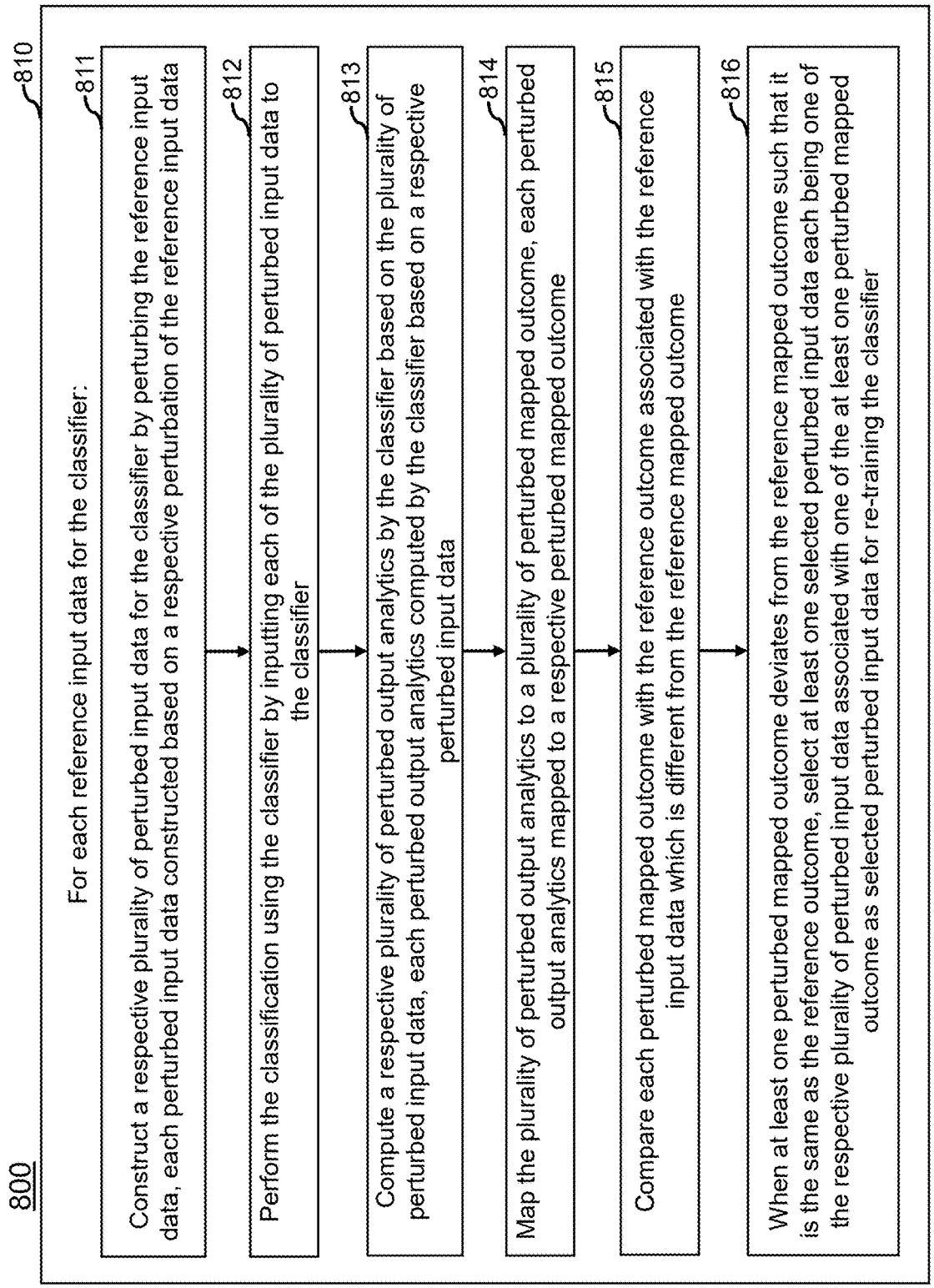
FIG. 8 illustrates a flow chart of an example method for generating at least one selected perturbed input data, according to some embodiments of the present disclosure.

FIG. 8 illustrates a flow chart of an example method 800 for generating at least one selected perturbed input data, according to some embodiments of the present disclosure. In various embodiments, the method 800 can be performed by the systems disclosed above. The operation 810 in this example includes multiple sub-operations 811~816 performed for each reference input data for the classifier. At sub-operation 811, a respective plurality of perturbed input data is constructed for the classifier by perturbing the reference input data, each perturbed input data constructed based on a respective perturbation of the reference input data. At sub-operation 812, the classification is performed using the classifier by inputting each of the plurality of perturbed input data to the classifier. At sub-operation 813, a respective plurality of perturbed output analytics is computed by the classifier based on the plurality of perturbed input data, each perturbed output analytics computed by the classifier based on a respective perturbed input data. At sub-operation 814, the plurality of perturbed output analytics is mapped to a plurality of perturbed mapped outcome, each perturbed output analytics mapped to a respective perturbed mapped outcome. At sub-operation 815, each perturbed mapped outcome is compared with the reference outcome associated with the reference input data which is different from the reference mapped outcome. At sub-operation 816, when at least one perturbed mapped outcome deviates from the reference mapped outcome such that it is the same as the reference outcome, at least one selected perturbed input data is selected, each being one of the respective plurality of perturbed input data associated with one of the at least one perturbed mapped outcome as selected perturbed input data for re-training the classifier. In some embodiments, the method 800 may be performed as part of the operation 717 in the method 700.

Figure 9:
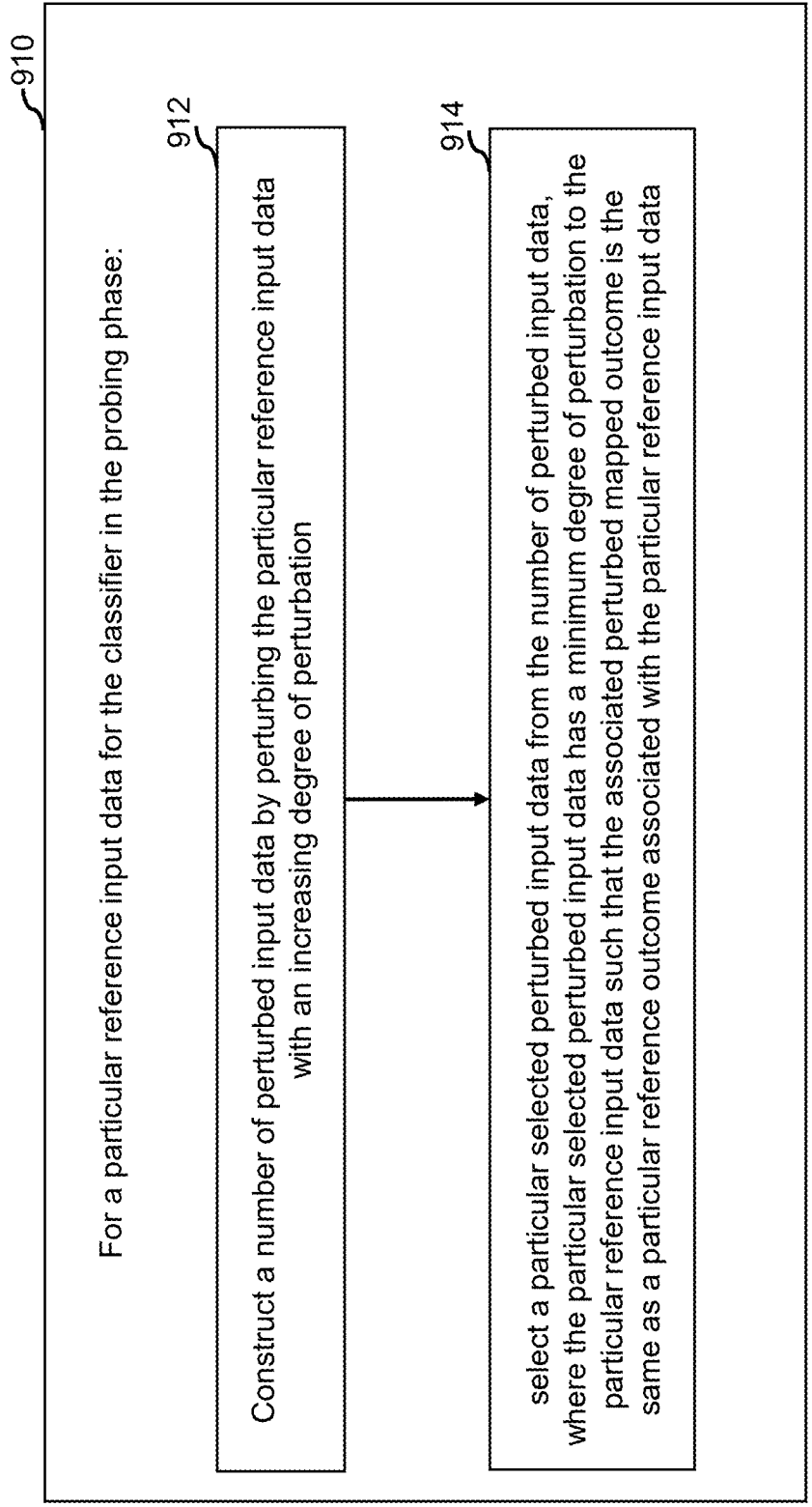
FIG. 9 illustrates a flow chart of an example method for selecting a particular selected perturbed input data, according to some embodiments of the present disclosure.

FIG. 9 illustrates a flow chart of an example method 900 for selecting a particular selected perturbed input data, according to some embodiments of the present disclosure. In various embodiments, the method 900 can be performed by the systems disclosed above. The operation 910 in this example includes multiple sub-operations 912~914 performed for a particular reference input data for the classifier in the probing phase. At sub-operation 912, a number of perturbed input data is constructed by perturbing the particular reference input data with an increasing degree of perturbation. At sub-operation 914, a particular selected perturbed input data is selected from the number of perturbed input data. The particular selected perturbed input data has a minimum degree of perturbation to the particular reference input data such that the associated perturbed mapped outcome is the same as a particular reference outcome associated with the particular reference input data.

Figure 10:
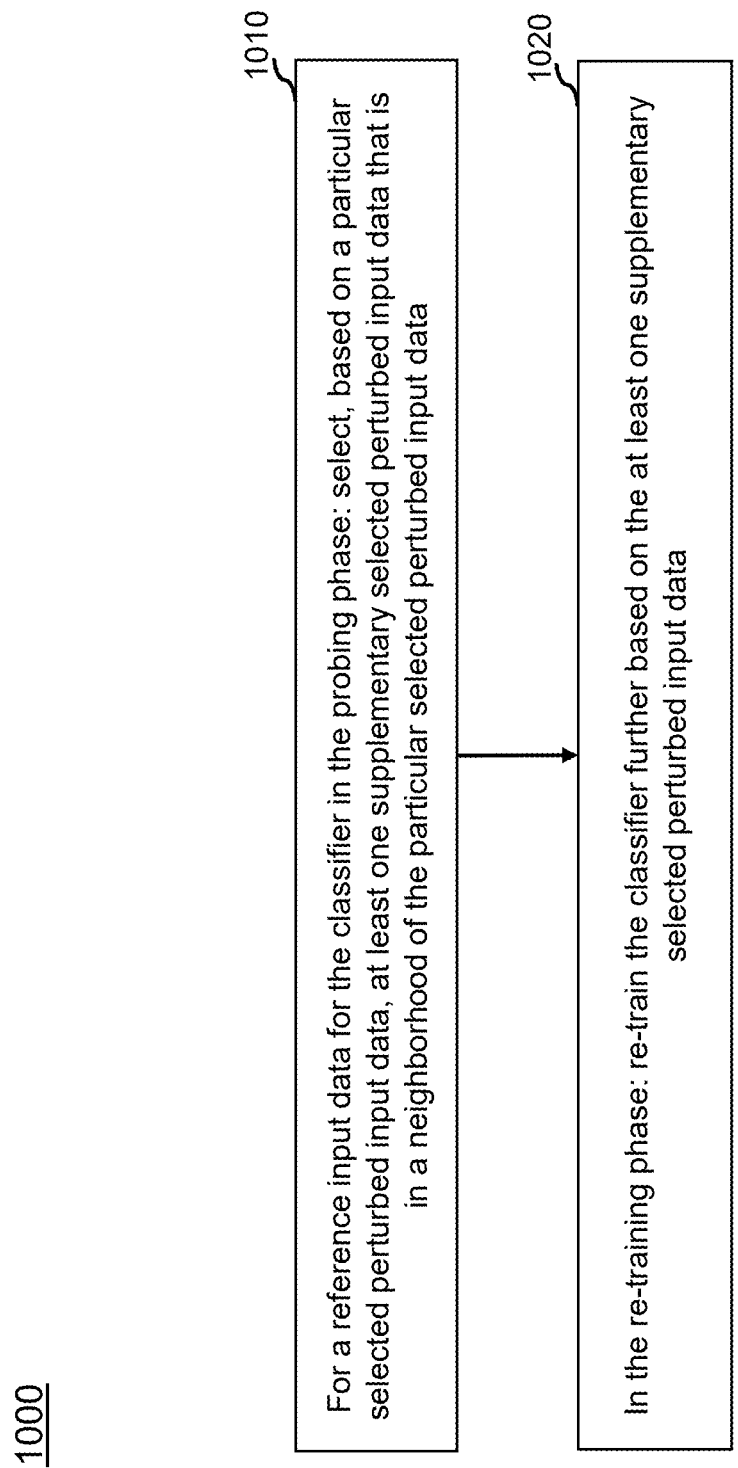
FIG. 10 illustrates a flow chart of an example method for re-training a classifier based on supplementary selected perturbed input data, according to some embodiments of the present disclosure.

FIG. 10 illustrates a flow chart of an example method 1000 for re-training a classifier based on supplementary selected perturbed input data, according to some embodiments of the present disclosure. In various embodiments, the method 1000 can be performed by the systems disclosed above. At operation 1010, at least one supplementary selected perturbed input data is selected for a reference input data for the classifier in the probing phase, based on a particular selected perturbed input data. The at least one supplementary selected perturbed input data is in a neighborhood of the particular selected perturbed input data. At operation 1020, the classifier is further re-trained based on the at least one supplementary selected perturbed input data, in the re-training phase.

Figure 11:
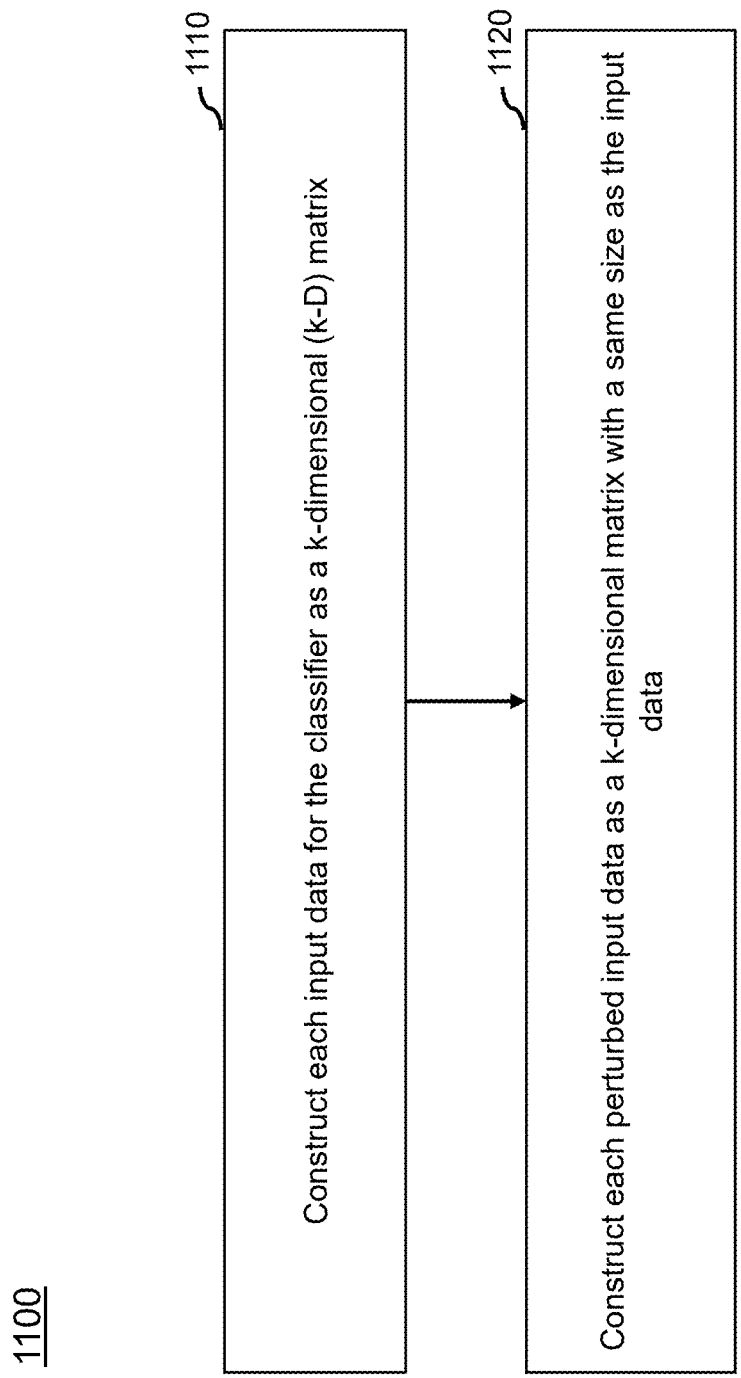
FIG. 11 illustrates a flow chart of an example method for constructing input data, according to some embodiments of the present disclosure.

FIG. 11 illustrates a flow chart of an example method 1100 for constructing input data, according to some embodiments of the present disclosure. In various embodiments, the method 1100 can be performed by the systems disclosed above. At operation 1110, each input data is constructed for the classifier as a k-dimensional (k-D) matrix. At operation 1120, each perturbed input data is constructed as a k-dimensional matrix with a same size as the input data.

Figure 12:
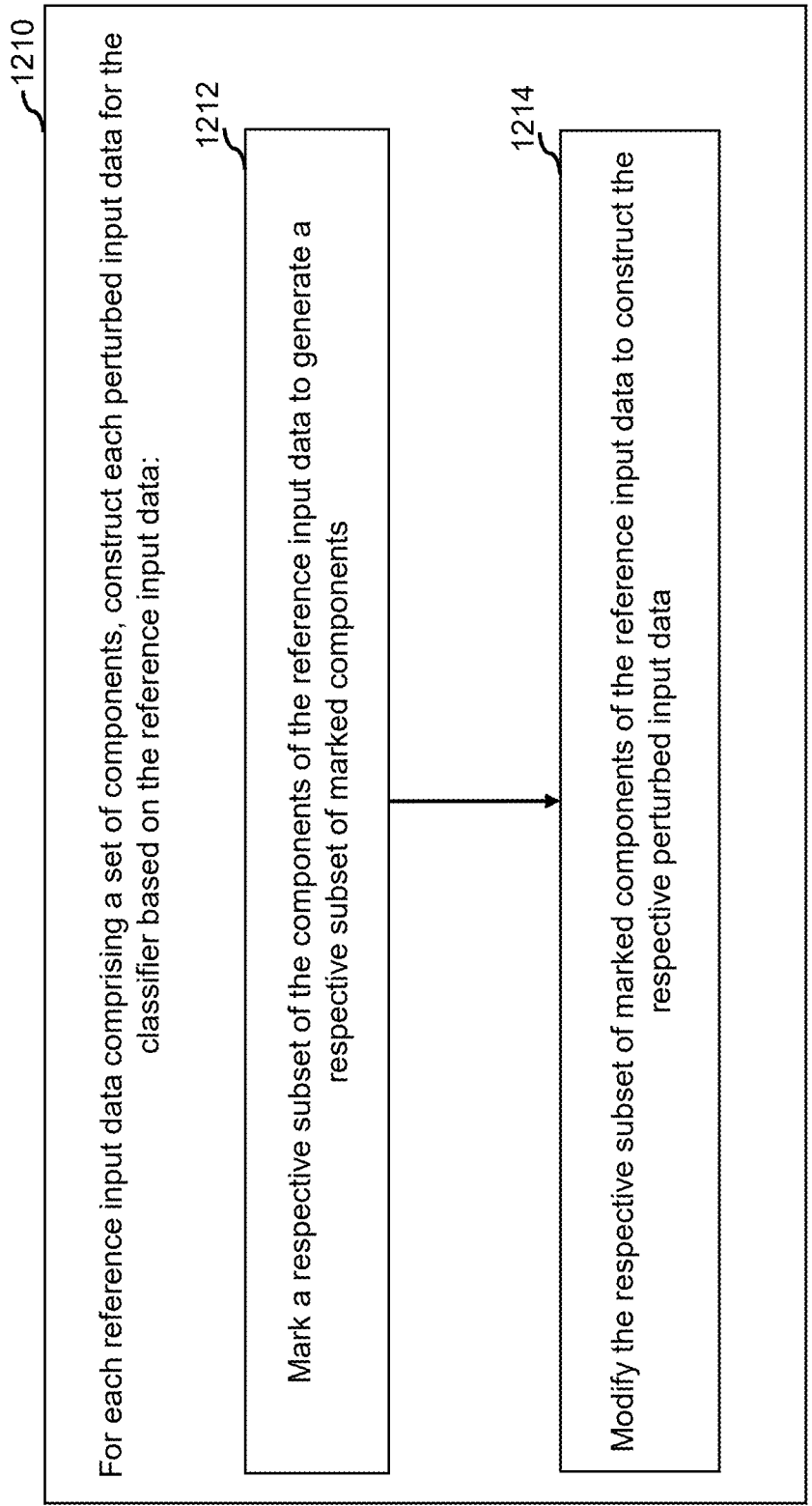
FIG. 12 illustrates a flow chart of an example method for constructing perturbed input data based on reference input data, according to some embodiments of the present disclosure.

FIG. 12 illustrates a flow chart of an example method 1200 for constructing perturbed input data based on reference input data, according to some embodiments of the present disclosure. In various embodiments, the method 1200 can be performed by the systems disclosed above. The operation 1210 in this example includes multiple sub-operations 1212~1214 performed for each reference input data comprising a set of components to construct each perturbed input data for the classifier based on the reference input data. At sub-operation 1212, a respective subset of the components of the reference input data is marked to generate a respective subset of marked components. At sub-operation 1214, the respective subset of marked components of the reference input data is modified to construct the respective perturbed input data. In some embodiments, the method 1200 may be performed as part of the operation 811 in the method 800. In some embodiments, the method 1200 may be performed as part of the operation 1120 in the method 1100.

Figure 13:
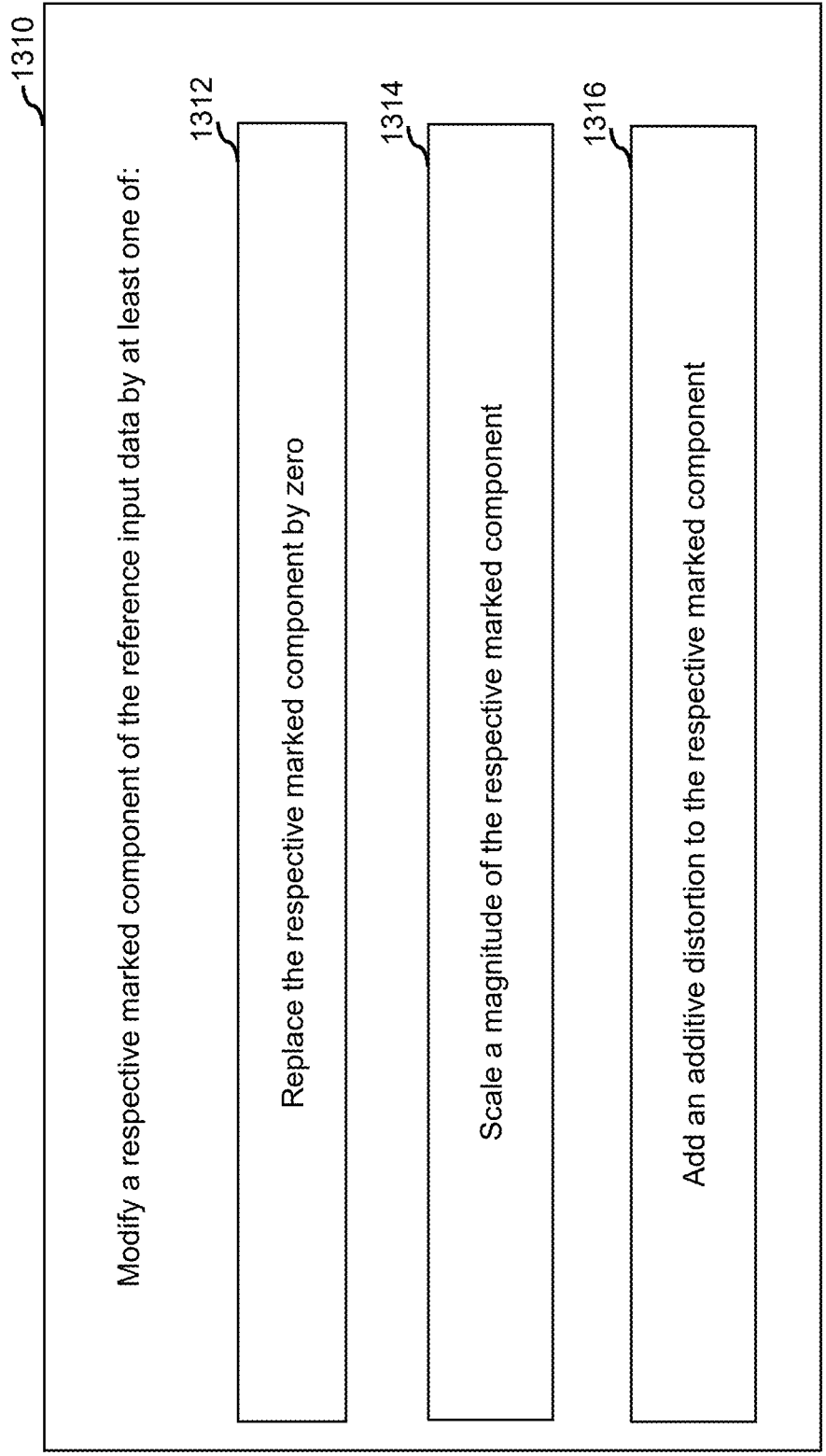
FIG. 13 illustrates a flow chart of an example method for modifying a respective marked component of the reference input data, according to some embodiments of the present disclosure.

FIG. 13 illustrates a flow chart of an example method 1300 for modifying a respective marked component of the reference input data, according to some embodiments of the present disclosure. In various embodiments, the method 1300 can be performed by the systems disclosed above. At operation 1310, a respective marked component of the reference input data is modified. In this example, the operation 1310 is performed by at least one of the sub-operations 1312~1316. At sub-operation 1312, the respective marked component is replaced by zero. At sub-operation 1314, a magnitude of the respective marked component is scaled. At sub-operation 1316, an additive distortion is added to the respective marked component. In some embodiments, the method 1300 may be performed as part of the operation 1214 in the method 1200.

Figure 14:
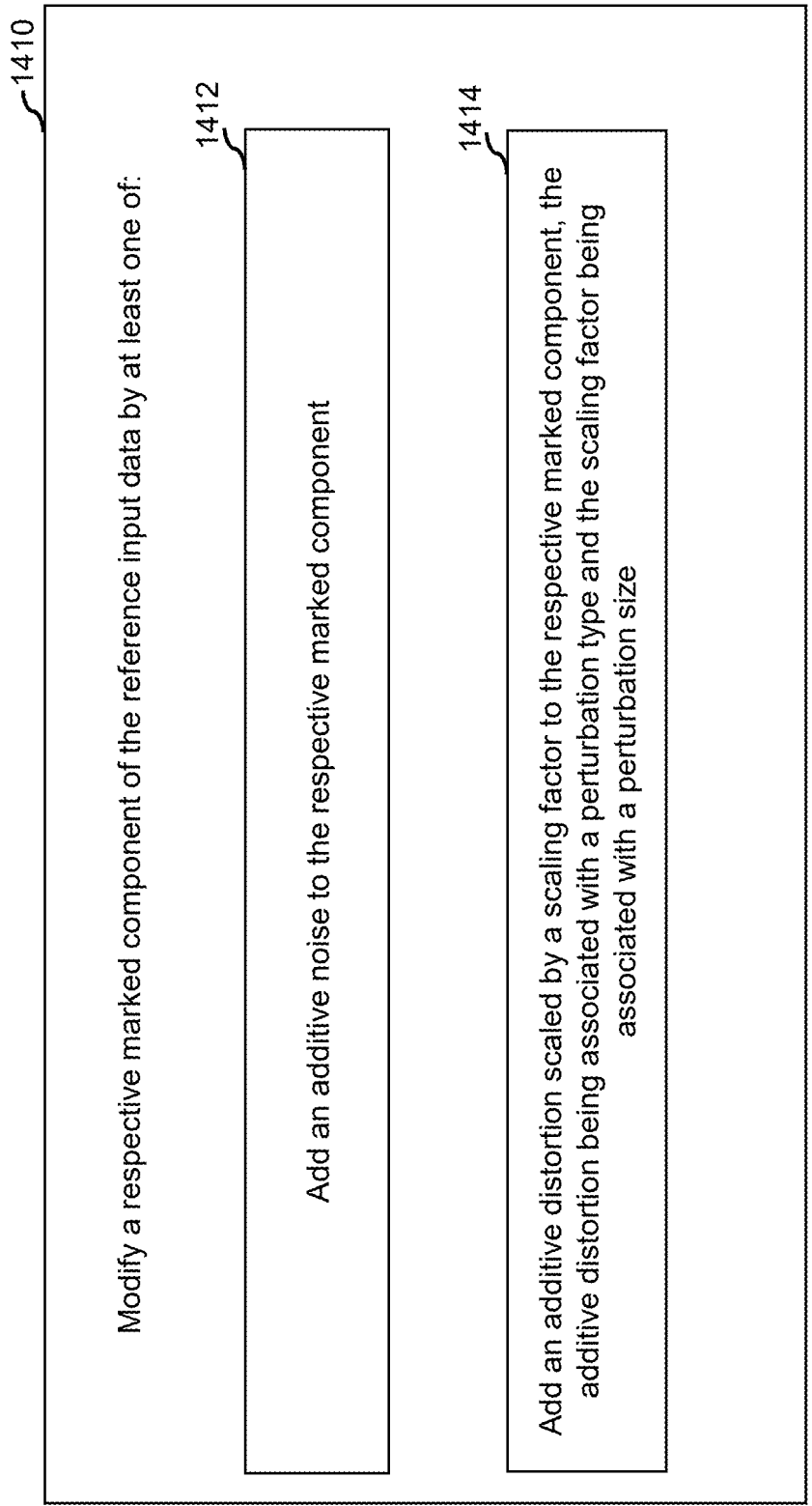
FIG. 14 illustrates a flow chart of another example method for modifying a respective marked component of the reference input data, according to some embodiments of the present disclosure.

FIG. 14 illustrates a flow chart of another example method 1400 for modifying a respective marked component of the reference input data, according to some embodiments of the present disclosure. In various embodiments, the method 1400 can be performed by the systems disclosed above. At operation 1410, a respective marked component of the reference input data is modified. In this example, the operation 1410 is performed by at least one of the sub-operations 1412~1414. At sub-operation 1412, an additive noise is added to the respective marked component. At sub-operation 1414, an additive distortion scaled by a scaling factor is added to the respective marked component. The additive distortion is associated with a perturbation type. The scaling factor is associated with a perturbation size. In some embodiments, the method 1400 may be performed as part of the operation 1214 in the method 1200.

Figure 15:
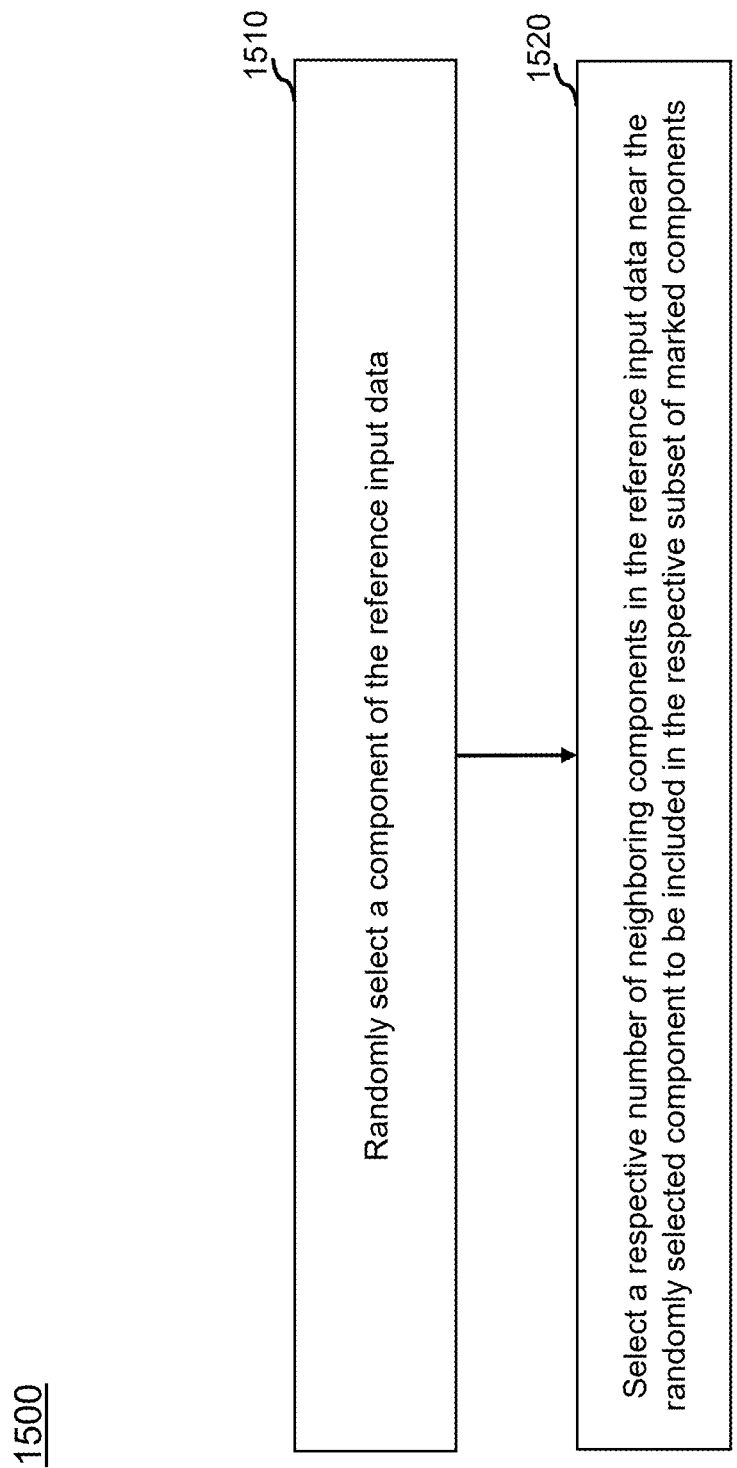
FIG. 15 illustrates a flow chart of an example method for generating a subset of marked components, according to some embodiments of the present disclosure.

FIG. 15 illustrates a flow chart of an example method 1500 for generating a subset of marked components, according to some embodiments of the present disclosure. In various embodiments, the method 1500 can be performed by the systems disclosed above. At operation 1510, a component of the reference input data is randomly selected. At operation 1520, a respective number of neighboring components is selected in the reference input data near the randomly selected component to be included in the respective subset of marked components. In some embodiments, the method 1500 may be performed as part of the operation 1212 in the method 1200.

In some embodiments, an explainable learning approach is disclosed to perform smart detection/recognition/classification/monitoring (e.g. FallAware, an explainable learning approach to robust fall detection with WiFi). A disclosed system may comprise at least one device (e.g. Type1 heterogeneous wireless devices/TX. Type2 heterogeneous wireless devices/RX) to perform sensing and/or to obtain/capture/sense raw measurement results (e.g. channel information, CSI, CIR, CFR). The raw measurement results may be preprocessed.

In some embodiments, the raw measurement results may be processed (e.g. filtered, permuted, arranged, organized, and/or formatted) to generate a multi-dimensional input data (e.g. a vector, a 2-dimensional/2D matrix, a 3-dimensional/3D matrix, a k-dimensional/k-D matrix, and/or a sequence/series/collection/set of k-D matrix) that is fed into a classifier which computes a classification analytics (based on the input data). A classification result may be obtained/computed for a classification/sensing task based on the classification analytics.

In some embodiments, in a training phase, a plurality of training raw measurement results may be obtained/captured/sensed, which may be processed to generate multi-dimensional training input data ("training data") to train the classifier.

In some embodiments, in a refining/enhancement/targeted-training/fine-tuning/perturbation/deviation phase, some additional raw measurement results may be obtained and processed to generate a particular multi-dimensional input data (called "reference input"). The particular input data is fed into the classifier which outputs/computes a particular classification analytics (called "reference analytics"). The reference input may comprise a plurality of components/elements (e.g. elements of k-dimensional matrix). It may be a 1-D matrix, which is an M-tuple vector with M components. It may be a M×N 2-D matrix with MN components. It may be a M×N×K 3-D matrix with MNK components. It may a k-D matrix of dimension N1× N2× ... ×Nk with N1*N2* ... *Nk components. Or it may be a collection/series/sequence/set of k-D matrices.

In some embodiments, a plurality of modified/variant/perturbed input data may be computed/generated based on the reference input. To generate each modified/variant input datum (data), a respective subset of components of the reference input may be marked/defined/identified/determined. For example, the respective subset of marked components may be determined by generating a random number P (e.g. a random number between 1 and Q, wherein Q is less than or equal to a cardinality of the plurality of components; different modified/variant/perturbed input data may have different P) and then randomly selecting P components among all the plurality components as the respective subset of marked components. In another example, a random number P may be generated and then P random components of the reference input may be selected. For each of the P selected random components, a set of components in a respective neighborhood of the selected random component may be selected to constitute/form/generate the respective subset of marked components. If the reference input is a k1-D matrix, the neighborhood of the random component may be (all or part of, such as a subsampled/downsampled/punctured version of) a k2-D sub-matrix of the k-D matrix, wherein k2<=k1. For different selected random components, different neighborhood (e.g. any of 1D/2D/3D/ . . . neighborhood, or multiple k2-D neighborhood with different amount of neighbors) may be used.

In some embodiments, to generate each modified/variant/perturbed input data, a respective modification procedure may be applied to the respective subset of marked components of the reference input. The modification may comprise any of: forcing components to be zero, reducing magnitude of components, filtering/blurring/averaging/lowpassing the components, or adding noise to the components.

In some embodiments, each modified/variant/perturbed input data may be fed into the classifier to output/compute a respective classification analytics (called "modified analytics" or "variant analytics" or "perturbed analytics"). The respective modified/variant/perturbed analytics may be compared with the reference analytics. A respective analytics deviation (or first similarity score, or deviation score, or perturbation score) between the reference analytics and the modified/variant/perturbed analytics (e.g. comprising a difference, a quotient/division, and/or an aggregation). For each modified/variant/perturbed input data, a desirable/desired/allowed/ideal deviation may be obtained (e.g. from a user). The respective analytics deviation (perturbation score) may be further compared with the desired deviation.

In some embodiments, in the refining phase, the classifier may be modified/varied/adjusted/adapted such that, among all the plurality of modified/variant/perturbed input data, the respective analytics deviation (perturbation score) may be comparable/similar to the desired deviation. Additional reference input data may be used such that the classifier may be modified in such a way so that the respective analytics deviation (perturbation score) may be comparable/similar to the respective desired deviation for all the reference input and for all modified/variant/perturbed input data associated with each reference input. A desirability score/second similarity score (e.g. correlation) between the desired deviation and the respective analytics deviation (perturbation score) may be computed.

In some embodiments, in the refining phase, a modified/variant/perturbed input data associated with a large/high similarity between the desired deviation and respective first analytics deviation/similarity score (e.g. as indicated by large (or small) desirability score/second similarity score, greater than (or smaller than) a first threshold) may be selected to be used as additional training data to modify/adjust/adapt/train/reinforce the classifier, while a modified/variant/perturbed input data associated with a small/low similarity (e.g. as indicated by small (or large) desirability score/second similarity score, less than (or greater than) a second threshold) may not be selected. Alternatively, a modified/variant/perturbed input data associated with the small/low similarity may be selected to be negative training data to modify/adjust/adapt/train/suppress the classifier.

In some embodiments, the classifier may be modified/varied/adjusted/adapted/trained to favor (or respond to or be sensitive to) modified/variant/perturbed input data with high (or low) desirability score/second similarity score and to avoid (or not respond to or be insensitive to) from modified/variant/perturbed input data with low (or high) desirability score/second similarity score.

In some embodiments, a classifier may take "input data" (e.g. any of CI, TSCI, ACF, STI/MI/MS, input analytics) as input and may output numerical "output analytics" or simply "output" or "analytics" (e.g. one or more scalar quantity, vector/matrix, etc.) that may be used to determine many possible outcomes. The possible outcome may be determined based on/by thresholding/mapping/vector quantization of some output analytics. Each input data may be arranged/organized/formed/computed as a k-dimensional (k-D) matrix. Each input data may comprise a k-D matrix.

In some embodiments, in a testing/probing stage (or phase) for the classifier, some identified input data (e.g. training data used for training classifier, operation data collected for continuous improvement) with corresponding feedback of classifier outcome (e.g. training outcome of labeled training data, user feedback, or feedback obtained from "long term" analysis of input data and corresponding outcome wherein "long-term" may be a duration such as one or more day/week/month/year, etc.) available may be identified. The identified input data ("reference input data") may be fed into the classifier to obtain/generate corresponding classifier output/outcome ("reference output"/"reference outcome").

In some embodiments, some "perturbed data" may be generated based on some respective perturbation/modification/distortion/change to each of the identified input data. The perturbed data may be fed to the classifier to obtain/generate corresponding classifier output/outcome ("perturbed output"/"perturbed outcome"). For each identified input data, each of the perturbed output/outcome may be compared with the reference output/outcome. Some of perturbed data associated with the identified input data may be selected (e.g. those with perturbed outcome being difference/deviated from the reference outcome). The identified input with at least one selected perturbed data may be marked. An identified input without any selected perturbed data may not be marked.

In some embodiments, after the testing/probing stage, in a classifier adaptation/ongoing-learning/improvement/enhancement/refinement/retraining stage, the selected perturbed data may be used to train/re-train/enhance/adapt/improve the identifier. A number, N2, of perturbed data may be generated systematically/stochastically based on each of a number, N1, of identified input data. The set of N1 identified input data may comprise any/all input data. Alternatively the set of N1 identified input data may comprise some/all input data that give rise to correct/incorrect/borderline outcome.

In some embodiments, different perturbed data perturbed from a particular/same identified input data may have different type/amount of perturbation/distortion/deviation w.r.t. the particular/same identified input data. In the case of the particular input data being a multi-dimensional data, different perturbed data may have same/different perturbation/distortion/deviation "types", with perturbation/deviation/ distortion in same/different dimensions (or directions), and/or same/different combination/amount of dimensions (or directions).

In some embodiments, for perturbed data of the same perturbation/distortion/deviation type (i.e. with same combination/amount of dimensions/directions), different perturbed data may have same/different perturbation/distortion/deviation "size", with same/different amount of deviation/perturbation/distortion in respective common dimensions/directions. For example, the particular input data may be k-dimensional (k-D). Some perturbed data may have distortion/perturbation/deviation in one dimension, some in two dimensions, . . . , some in k–1 dimensions, and/or some in k dimensions. For those with distortion/perturbation/deviation in one dimension, some may be in first dimension, some in second dimension, . . . some in k^{th} dimension. For those with distortion/perturbation/deviation in one direction, some may be in first direction, some in second direction, etc. For those with distortion in a particular dimension/direction, some may have different distortion/distance: some with distance/distortion of 1, some with distance 1.7, some with distance 2, and so on. Any distance/distortion may be L1, L2. L3, and so on.

In some embodiments, each perturbed data perturbed from the particular input data (reference input data) may be fed into the classifier to give the respective perturbed output analytics which determine the respective perturbed outcome. Some of such respective perturbed outcomes may be the same as the particular outcome of the particular input (reference outcome), while some may be different. There may be four cases: (a) reference outcome is correct and respective perturbed outcome is correct/same, (b) reference outcome is correct and perturbed outcome is incorrect/different, (c) reference outcome is incorrect and perturbed outcome is incorrect/same, (d) reference outcome is incorrect and perturbed outcome is correct/different.

In some embodiments, for each perturbation/distortion/deviation type (i.e. for each combination of dimensions/directions), a corresponding perturbation size (e.g. distortion/deviation size) may be determined such that the perturbed outcome is flipped/changed/toggled/different. When the perturbation size is zero, the perturbed outcome is same as the reference outcome, because there is zero distortion/perturbation. As the perturbation size increases (e.g. by performing a search in a respective search range, from 0 up to a respective search range limit; different type may have different search range limit; the different search range limit may be associated with a (stochastic) distribution of "reasonable" perturbation), there may be a particular perturbation size when the corresponding perturbed outcome becomes different/flipped/toggled/changed. The perturbed data associated with the particular perturbation size may be selected to be a selected perturbed data for refining the classifier in a refining stage. A reasonable perturbation of a reference input data may be a deviation/perturbation/distortion/change that may reasonably be generated by the same state/venue/object(s)/motion/action/movement that generated the reference input data. In addition, for the distortion type, one or more additional perturbed data with perturbation size in a neighborhood of the particular perturbation size may be selected. Suppose m is the particular perturbation size at which the perturbed outcome first flipped/changed/toggled/differed. The additional selected perturbed data may comprise one or more of those with perturbation size of m+1, m+2 . . . m–1, m–2, m–3, . . . .

In some embodiments, a "borderline" input data may be an input data of which at least one selected perturbed data is found in the respective search range. In a way, the collection of all possible borderline input data may define the decision boundary (e.g. hyper boundary, manifold) of the input data corresponding to various outcome (for the classifier). Such borderline input data may be useful as supplementary/refinement/enhancement/additional/adaptation data to improve/retrain the classifier.

In some embodiments, in the search of perturbation size in a search range (e.g. from 1 to respective limit associated with the perturbation/distortion/deviation type), if the perturbed outcome do not flip/change (i.e. no perturbation size with flipped/changed perturbed outcome (compared with the particular outcome) is found), no perturbed data may be selected. In some embodiments, in the search of perturbation size in the search range, if the perturbed outcome flipped/changed more than one time, then the perturbation size at/near the change point (e.g. the perturbation sizes before and after the change) may be selected.

In some embodiments, the refining stage may happen after the testing/probing stage. In the refining stage, the classifier may be further trained/re-trained/enhanced with all the selected perturbed data.

In some embodiments, for a particular (reference) input data, the classifier may output a particular output analytics (reference analytics/output/output analytics). The classifier may comprise any of: support vector machine (SVM), kernel-based SVM, neural network (NN), deep neural network (DN), convolutional NN (CNN), recurrent NN (RNN), long short-term memory network (LSTM), deep belief network (DBN), generative adversarial network (GAN), conditional GAN (cGAN), transformer, encoder-decoder, denoising autoencoder (DAE), neural radiance field, radial basis function network, multilayer perceptron (MLP), or self organizing map (SOM). The possible outcome may comprise any of: state, event, location, gesture, action, identity, such as "event happened", "event not happened", "fall down detected", "fall down not detected", "motion/movement detected", "motion/movement not detected", "object at location 1", "object at location 2", "event 1", "event 2", "object walking", "object running", "object dancing", "intruder detected", "pet detected", "vacuum cleaner detected", "father detected", "mother detected", "child detected", etc.

In some embodiments, the input data may be a k-D matrix A. It may have many components/elements (e.g. matrix elements). Suppose it is a 2D matrix A=[a(i,j)]. Then the components/elements are all the matrix elements a(i,j), where (i,j) is a component coordinate/location. A "distance" (e.g. component-to-component distance) may be defined between any two components a(i1, j1) and a(i2, j2). The distance may be L1-distance which is abs(i1–i2)+abs(j1–j2), or L2-distance which is sqrt[(i1–i2)^2+(j1–j2)^2], or any Lk-distance. Based on the distance, a neighborhood can be defined for any component a(i,j), and the neighboring components can be identified. A neighborhood may be un-directional or omni-directional, comprising all components within a distance D. Such a neighborhood may resemble a ball/circle/sphere/high-dimensional sphere, if it is defined using L2-distance in all directions. It may resemble a square/cube/hyper-cube/high-dimensional cube, if it is defined using L1-distance in all directions. It neighborhood may be directional with different distance in difference direction.

In some embodiments, the classifier may be refined/improved/adjusted/adapted/trained by reinforcing the classifier's "correct" responses and suppressing "incorrect" responses. The classifier may be designed to react strongly to some input variations/perturbations and react mildly to other input variations/perturbations. When an input data is perturbed/varied in a first way, it may be desirable that the output is perturbed strongly (i.e. large deviation from or low similarity to the output/response to initial/unperturbed input data). And it may undesirable that the output is perturbed only mildly (i.e. small deviation from or high similarity to the output/response to initial/unperturbed input data). When the input data is perturbed/varied in a second way, it may be desirable that the output is perturbed mildly (i.e. small deviation from or high similarity to the output/response to initial/unperturbed input data). In other words, it may be undesirable that the output is perturbed strongly.

In some embodiments, to test whether the classifier is responding in a desired way to input data perturbation, many reference input data may be identified. For each reference input data, perturbation may be applied and a number of variants (perturbations) of the reference input data (called "perturbed input data") may be obtained. Each perturbed input data may be fed as input into the classifier to get corresponding output (called "perturbed analytics").

In some embodiments, to gauge the sensitivity of the classifier to input perturbation (e.g. strong/weak response to input perturbation), deviation of each perturbed analytics from the reference analytics (analytics deviation, or perturbation score) may be computed. In some embodiments, to gauge the correctness of the response to input perturbation, an analytics deviation (e.g. perturbation score) may be compared with some desired values-a desirability score between the perturbation score and the desired value may be computed. If the analytic deviations resemble the desired values (with high degree of similarity, e.g. desirability score greater than some threshold), the response is "correct".

In some embodiments, there may be many possible perturbations. The classifier output response may be "correct" (e.g. desirability score greater than first threshold) for some perturbation and not so correct (e.g. desirability score less than second threshold) for other perturbation.

In some embodiments, to reinforce the correct responses and suppress the incorrect responses, the input perturbation (i.e. perturbed input data) corresponding to correct responses may be used as positive training data to re-train/adapt the classifier and input perturbation corresponding to incorrect responses may be used as negative training data. Some input perturbation may not be associated with any correct or incorrect responses and may not be used to re-train/adapt the classifier.

The following numbered clauses provide examples for wireless sensing with classifier probing and refinement.

Clause 1. A method/system/device/software of refining a classifier, comprising: in a refining phase: obtaining a plurality of raw measurement data by a sensing device of the system; processing the plurality of raw measurement data by a processor to construct at least one reference input data for a classifier; performing a classification by using each of the at least one reference input data as input to the classifier; computing at least one reference output analytics by the classifier based on the at least one reference input data, each reference output analytics computed by the classifier based on a respective reference input data; for each reference input data: construct a respective plurality of perturbed input data for the classifier by perturbing the reference input data by the processor, each perturbed input data constructed based on a respective perturbation of the reference input data, performing a classification by using each of the plurality of perturbed input data as input to the classifier, computing a respective plurality of perturbed output analytics by the classifier based on the plurality of perturbed input data, each perturbed output analytics computed by the classifier based on a respective perturbed input data, computing a plurality of perturbation scores by the processor based on the plurality of perturbed output analytics and the reference output analytics associated with the reference input data, each perturbation score being between the reference output analytics and a respective perturbed output analytics, and computing a plurality of desirability scores by the processor based on the plurality of perturbation scores and a plurality of desired similarity scores, each desirability score being between a respective perturbation score and a respective desired similarity score; adjusting the classifier based on the plurality of reference input data, the plurality of perturbed input data associated with each reference input data, the plurality of desirability scores.

Clause 2. The method/system/device/software of refining the classifier of clause 1, further comprising: preprocessing the plurality of raw measurement data.

Clause 3. The method/system/device/software of refining the classifier of any of clauses 1 to 2, wherein: the plurality of raw measurement data comprises a time series of channel information (TSCI) of a wireless channel of a venue obtained from a wireless signal transmitted by a Type1 heterogeneous wireless device through the wireless channel and received by a Type2 heterogeneous wireless device; the sensing device is the Type2 device.

Clause 4. The method/system/device/software of refining the classifier of any of clauses 1 to 3, further comprising: constructing the at least one reference input data for the classifier as a k-dimensional (k-D) matrix.

Clause 5. The method/system/device/software of refining the classifier of any of clauses 1 to 4, further comprising: wherein the reference input data comprises a set of components; for each reference input data, constructing each perturbed input data for the classifier based on the reference input data by: marking a respective subset of the components of the reference input data, and modifying the respective subset of marked components of the reference input data to construct the respective perturbed input data.

Clause 6. The method/system/device/software of refining the classifier of clause 5, further comprising: modifying a respective marked component of the reference input data by replacing the respective marked component by zero.

Clause 7. The method/system/device/software of refining the classifier of clause 5, further comprising: modifying a respective marked component of the reference input data by scaling a magnitude of the respective marked component.

Clause 8. The method/system/device/software of refining the classifier of clause 5, further comprising: modifying a respective marked component of the reference input data by adding an additive distortion to the respective marked component.

Clause 9. The method/system/device/software of refining the classifier of clause 8, further comprising: modifying a respective marked component by adding additive noise to the marked component.

Clause 10. The method/system/device/software of refining the classifier of clause 5, further comprising: modifying the subset of marked components by filtering the subset of marked components.

Clause 11. The method/system/device/software of refining the classifier of clause 5, further comprising: marking the subset of the components of the reference input data by: randomly selecting a component of the reference input data, and selecting a respective number of neighboring components in the reference input data near the randomly selected component to be included in the subset of marked components.

Clause 12. The method/system/device/software of refining the classifier of clause 11: wherein each input data is a k-dimensional (k-D) matrix, the input data being the reference input data or any perturbed input data; wherein each component of the input data is a matrix element of the k-D matrix; wherein a first matrix element of the k-D matrix is a neighboring component near a second matrix element of the k-D matrix if a distance between the two matrix elements is less than a threshold.

Clause 13. The method/system/device/software of refining the classifier of clause 12: wherein the respective number of selected neighboring components in the reference input data comprise a sub-matrix of matrix elements of the k-D matrix near the randomly selected component.

Clause 14. The method/system/device/software of refining the classifier of clause 13: wherein the sub-matrix is a k-D sub-matrix comprising the randomly selected component.

Clause 15. The method/system/device/software of refining the classifier of clause 11, further comprising: selecting the respective number of neighboring components in the reference input data near the randomly selected component as the subset of marked components.

Clause 16. The method/system/device/software of refining the classifier of clause 5, further comprising: for each reference input data and for each of the set of components of the respective reference input data: selecting a respective number of neighboring components in the reference input data near the respective component of the respective reference input data to be included in the subset of marked components associated with a respective perturbed input data.

Clause 17. The method/system/device/software of refining the classifier of clause 16: wherein each input data is a k-dimensional (k-D) matrix, the input data being the reference input data or any perturbed input data; wherein each component of the input data is a matrix element of the k-D matrix; wherein a first matrix element of the k-D matrix is a neighboring component near a second matrix element of the k-D matrix if a distance between the two matrix elements is less than a threshold.

Clause 18. The method/system/device/software of refining the classifier of clause 17: wherein the respective number of selected neighboring components in the reference input data comprise a sub-matrix of matrix elements of the k-D matrix near the respective component of the respective reference input data.

Clause 19. The method/system/device/software of refining the classifier of clause 18: wherein the sub-matrix is a (k2)-dimensional (k2-D) sub-matrix comprising the respective component, wherein $k2 \leq k$.

Clause 20. The method/system/device/software of refining the classifier of clause 19: wherein the sub-matrix is a k-D sub-matrix comprising the respective component.

Clause 21. The method/system/device/software of refining the classifier of clause 16, further comprising: selecting the respective number of neighboring components in the reference input data near the respective component of the respective reference input data as the subset of marked components associated with a respective perturbed input data.

Clause 22. The method/system/device/software of refining the classifier of clause 1, wherein: each perturbation score comprises at least one of: a correlation, a difference, a distance, a square of a difference, a deviation, a ratio, or a percentage.

Clause 23. The method/system/device/software of refining the classifier of clause 1, wherein: each desirability score comprises at least one of: a correlation, a difference, a distance, a square of a difference, a deviation, a ratio, or a percentage.

Clause 24. The method/system/device/software of refining the classifier of clause 1, further comprising: in an operating phase, performing a classification task based on the adjusted classifier and an input of at least one operating input data to the adjusted classifier.

Clause A1. A method/system/device/software of classifier probing and refinement, comprising: in a probing phase: obtaining a plurality of raw measurement data by a sensing device of the system, processing the plurality of raw measurement data by a processor to construct a plurality of input data for a classifier, performing a classification by the processor using the classifier by using each of the plurality of input data as input to the classifier, computing a plurality of output analytics by the classifier based on the plurality of input data, each output analytics computed by the classifier based on a respective input data, mapping the plurality of output analytics to a plurality of mapped outcome, each output analytics mapped to a respective mapped outcome, identifying at least one reference input data each associated with respective output analytics and mapped outcome, each reference input data being one of the plurality of input data for the classifier for which a respective reference outcome is available and is different from the respective mapped outcome, and for each reference input data for the classifier: constructing a respective plurality of perturbed input data for the classifier by perturbing the reference input data, each perturbed input data constructed based on a respective perturbation of the reference input data, performing the classification using the classifier by using each of the plurality of perturbed input data as input to the classifier, computing a respective plurality of perturbed output analytics by the classifier based on the plurality of perturbed input data, each perturbed output analytics computed by the classifier based on a respective perturbed input data, mapping the plurality of perturbed output analytics to a plurality of perturbed mapped outcome, each perturbed output analytics mapped to a respective perturbed mapped outcome, comparing each of the perturbed mapped outcome with the reference outcome associated with the reference input data which is different from the reference mapped outcome, and when at least one perturbed mapped outcome deviates from the reference mapped outcome such that it is the same as the reference outcome, selecting at least one selected perturbed input data each being one of the respective plurality of perturbed input data associated with one of the at least one perturbed mapped outcome as selected perturbed input data for refining the classifier in the re-training phase; and in a re-training phase: re-training the classifier based on each of the selected perturbed input data and the associated reference outcome.

In some embodiments, there may be multiple perturbation type, and multiple perturbation size (e.g. amount/degree) for each perturbation type. For each type of perturbation, a number of perturbed input data may be generated by applying the type of perturbation with various amount/size/degree (e.g. in an increasing manner, or in a decreasing manner). For example, each input data may be a N1-component vector. Each perturbation type may be (associated with) a random N1-component noisy vector (e.g. multi-variate Gaussian). For example, the random N1-component noisy vector may have energy/power/norm (e.g. L2-norm, Lk-norm, square of L2-norm, sum of square) of 1. The input data may be perturbed/corrupted/distorted by adding to the input data the (additive) N1-component noisy vector scaled by a scaling factor (scalar). As the scaling factor increases from 0 to a certain limit, a number of perturbed input data may be constructed/generated. In another example, each input data may be a k-dimensional (k-D) matrix. Each input data may be a N1×N2× . . . ×Nk matrix, with N1*N2* . . . *Nk components. Each perturbation type may be (associated with) a random k-D matrix, of size N1*N2* . . . *Nk. Each random k-D matrix may have energy/power/norm (e.g. L2-norm, Lk-norm, square of L2-norm, sum of square) of 1. The input data may be perturbed/corrupted/distorted by adding to the input data the (additive) k-D random matrix, scaled by a scaling factor (scalar). As the scaling factor increases from 0 to a certain limit, a number of perturbed input data may be constructed/generated. For example, 300 perturbed input data can be generated by increasing the scaling factor from 0 to 150, in steps of 0.5, resulting in 300 increasing scaling factors: 0.5, 1, 1.5, 2, 2.5, 3, 3.5, 4, 149, 149.5, 150). A particular selected perturbed input data associated with a particular reference input data may be associated with a minimum degree/size/amount of perturbation of the particular reference input data.

Clause A2. The method/system/device/software of classifier probing and refinement of clause A1, comprising: for a particular reference input data for the classifier in the probing phase: constructing a number of perturbed input data by perturbing the particular reference input data with an increasing degree of perturbation; from among the number of perturbed input data, selecting a particular selected perturbed input data as the perturbed input data with minimum degree of perturbation to the reference input data such that the associated perturbed mapped outcome is the same as a particular reference outcome associated with the particular reference input data.

In some embodiments, to identify/find the particular selected perturbed input data from among the number of perturbed data with increasing degree of perturbation, a search may be performed among the number of perturbed input data.

Clause A3. The method/system/device/software of classifier probing and refinement of clause A2, comprising: for the particular reference input data for the classifier in the probing phase: performing a search among the number of perturbed input data in search of the selected particular selected perturbed input data.

In some embodiments, it may be a full search such that all the number of perturbed input data are tested/examined.

Clause A4. The method/system/device/software of classifier probing and refinement of clause A3: wherein the search is a full exhaustive search.

In some embodiments, the search may be a quickest/greedy search such that it may stop half-way as long as the particular selected perturbed input data is found (early termination; step/terminate early before all number of perturbed input data are tested/examined). The perturbation size/degree/amount may be k*step-size, where k=1, 2, . . . , N2. Here are the steps of the quickest/greedy/sequential search: Step 1: Initialize (current k) k=1; Step 2: Perform the classification by using current perturbed input data associated with k as input to the classifier; Step 3: Map the output of the classifier, the perturbed output analytics, to perturbed mapped outcome; Step 4: Compare perturbed mapped outcome with reference outcome associated with particular reference input data; Step 5: If perturbed mapped outcome is the same as reference output, select the current perturbed input data as selected perturbed input data and stop. If not, increment current k (i.e. k=k+1); Step 6: if k<N2, go to step 2, else stop.

Clause A5. The method/system/device/software of classifier probing and refinement of clause A3, comprising: for the particular reference input data for the classifier in the probing phase: performing a quickest search among the number of perturbed input data by initializing a current perturbed input data as one of the number of perturbed input data with minimal non-zero perturbation, and recursively testing the current perturbed input data by: performing the classification using the classifier by using the current perturbed input data as input to the classifier, mapping the perturbed output analytics, the associated output of the classifier, to the perturbed mapped outcome, comparing the perturbed mapped outcome with the reference outcome associated with the reference input data, and when the perturbed mapped outcome is the same as the reference outcome, selecting the current perturbed input data as the particular selected perturbed input data, otherwise updating the current perturbed input data by incrementing the degree of perturbation and repeating the testing of the updated current perturbed input data.

In some embodiments, more than one selected perturbed input data may be selected for a (e.g. for each) perturbed.

Clause A6. The method/system/device/software of classifier probing and refinement of clause A1, comprising: for a reference input data for the classifier in the probing phase: selecting at least one supplementary selected perturbed input data based on a particular selected perturbed input data; and in the re-training phase: re-training the classifier further based on the at least one supplementary selected perturbed input data.

Clause A7. The method/system/device/software of classifier probing and refinement of clause A6: wherein the supplementary selected perturbed input data is in a neighborhood of the particular selected perturbed input data.

In some embodiments, one or more perturbed input data with slightly lower degree of perturbation may be selected as supplementary selected perturbed input data. If the selected perturbed input data has k=k1, these supplementary selected perturbed input data may have k=k1−1, or k=k1−2, etc.

Clause A8. The method/system/device/software of classifier probing and refinement of clause A7, comprising: wherein the at least one supplementary selected perturbed input data comprise at least one of the number of perturbed input data next to the selected perturbed input data with minimal decrease of degree of perturbation compared with the selected perturbed input data.

In some embodiments, one or more perturbed input data with slightly higher degree of perturbation may be selected as supplementary selected perturbed input data. If the selected perturbed input data has k=k1, these supplementary selected perturbed input data may have k=k1+1, or k=k1+2, etc.

Clause A9. The method/system/device/software of classifier probing and refinement of clause A7, comprising: wherein the at least one supplementary selected perturbed input data comprise at least one of the number of perturbed input data next to the selected perturbed input data with minimal increase of degree of perturbation compared with the selected perturbed input data.

In some embodiments, as the degree of perturbation increases from zero, the selected perturbed input data may be the first time the mapped outcome flipped (from being "different from reference outcome" to being "same as reference outcome"). In the case that the mapped outcome flipped two times, a second selected perturbed input data may be selected as the second time the mapped outcome flipped (from being "same as reference outcome" to being "different from reference outcome"). Characteristics of the second selected perturbed input data is (a) it has more distortion/perturbation that the selected perturbed input data, and (b) the second flipping occurs.

Clause A10. The method/system/device/software of classifier probing and refinement of clause A6, comprising: for the particular reference input data for the classifier in the probing phase: from among the number of perturbed input data, selecting a second particular selected perturbed input data as a perturbed input data with (a) higher degree of perturbation compared with the particular selected perturbed input data, and (b) minimum degree of perturbation such that the associated perturbed mapped outcome is different from the particular reference outcome associated with the particular reference input data.

In some embodiments, raw measurement data may be time series of channel information (CI/TSCI, e.g. CSI, CIR, CFR) extracted/obtained from wireless signal received by the sensing device (e.g. Type2 heterogeneous wireless device).

Clause A11. The method/system/device/software of classifier probing and refinement of clause A1, comprising: transmitting a wireless signal from a Type1 heterogeneous wireless device to a Type2 heterogeneous wireless device through a wireless channel of a venue, wherein the Type2 device is the sensing device and wherein the plurality of raw measurement data comprise a time series of channel information (TSCI) of the wireless channel obtained by the Type2 device based on the received wireless signal.

Clause A12. The method/system/device/software of classifier probing and refinement of clause A11, comprising: preprocessing the TSCI.

In some embodiments, input data may be ACF/features of ACF/STI/MI/MS/analytics computed from raw measurement/sensing data (e.g. TSCI).

Clause A13. The method/system/device/software of classifier probing and refinement of clause A12, comprising: constructing the input data for the classifier based on an auto-correlation function (ACF) of the TSCI.

Clause A14. The method/system/device/software of classifier probing and refinement of clause A1, comprising: constructing each input data for the classifier as a k-dimensional (k-D) matrix.

In some embodiments, entries/elements/components of the k-dimensional (k-D) matrix may be computed based on ACF of TSCI.

Clause A15. The method/system/device/software of classifier probing and refinement of clause A14, comprising: constructing the k-D matrix based on an auto-correlation function (ACF) of the TSCI.

Clause A16. The method/system/device/software of classifier probing and refinement of clause A1, comprising: mapping each output analytics to a respective mapped outcome based on a nonlinear function of the output analytics.

Clause A17. The method/system/device/software of classifier probing and refinement of clause A16, comprising: mapping each output analytics to a respective mapped outcome based on a vector quantization of the output analytics.

Clause A18. The method/system/device/software of classifier probing and refinement of clause A17, comprising: mapping each output analytics to a respective mapped outcome based on a thresholding of the output analytics.

In some embodiments, there may be multiple perturbation types. If input is k-D matrix, each perturbation type may comprise an additive k-D distortion/perturbation matrix. For each perturbation types, there may be multiple perturbation size/degree/amount. The k-D perturbation matrix may be scaled by a scaling factor (scalar) and added to the reference input data to get/give/obtain the perturbed input data. Multiple scaling factors may be used. The multiple scaling factors may be the multiple perturbation size/degree/amount.

Clause A19. The method/system/device/software of classifier probing and refinement of clause A14, comprising: for each of a plurality of perturbation type, construct at least one perturbed input data by perturbing a reference input data based on the perturbation type.

Clause A20. The method/system/device/software of classifier probing and refinement of clause A19, comprising: for each of a plurality of perturbation type and each of a plurality of perturbation size associated with the perturbation type, construct a perturbed input data based on the perturbation type and the perturbation size.

In some embodiments, perturbed input data constructed from a reference input data may have identical size/dimension as the reference input data.

Clause A21. The method/system/device/software of classifier probing and refinement of clause A20, comprising: constructing each perturbed input data as a k-dimensional matrix with same size as the input data.

In some embodiments, each input data may be k-D matrix of size $N1 \times N2 \times \ldots \times Nk$. One way to generate perturbed input data is to choose/mark some of the k dimensions and some components/elements/entries in those dimensions of the k-D matrix and perturb only the chosen/marked dimensions/components/elements/entries. In a special case: all k dimensions are chosen/marked, and all components in all k dimensions are chosen/marked such that effective all components/elements/entries of the k-D matrix are perturbed/modified/changed/distorted. Different dimensions/components of different reference input data may be chosen/marked.

Clause A22. The method/system/device/software of classifier probing and refinement of clause A21, comprising: wherein the reference input data comprises a set of components; for each reference input data, constructing each perturbed input data for the classifier based on the reference input data by: marking a respective subset of the components of the reference input data, and modifying the respective subset of marked components of the reference input data to construct the respective perturbed input data.

In some embodiments, some chosen/marked dimension/components may be zero-ed (e.g. multiplied by zero).

Clause A23. The method/system/device/software of classifier probing and refinement of clause A22, further comprising: modifying a respective marked component of the reference input data by replacing the respective marked component by zero.

In some embodiments, some chosen/marked dimension/components may be scaled. Multiplication perturbation/distortion may be additive perturbation/distortion in the logarithmic domain.

Clause A24. The method/system/device/software of classifier probing and refinement of clause A22, further comprising: modifying a respective marked component of the reference input data by scaling a magnitude of the respective marked component.

In some embodiments, additive distortion may be applied/added to some chosen/marked dimension/components.

Clause A25. The method/system/device/software of classifier probing and refinement of clause A22, further comprising: modifying a respective marked component of the reference input data by adding an additive distortion to the respective marked component.

In some embodiments, additive random/noisy (may be positive or negative) distortion may be applied/added to some chosen/marked dimension/components.

Clause A26. The method/system/device/software of classifier probing and refinement of clause A25, further comprising: modifying a respective marked component by adding additive noise to the marked component.

Clause A27. The method/system/device/software of classifier probing and refinement of clause A25, further comprising: modifying a respective marked component by adding additive distortion scaled by a scaling factor to the marked component, wherein the additive distortion is associated with a perturbation type and the scaling factor is associated with a perturbation size.

In some embodiments, filtering (e.g. linear/nonlinear filtering, temporal/spatial/directional/subspace filtering, low-pass/highpass/bandpass filtering) may be applied/added to some chosen/marked dimension/components.

Clause A28. The method/system/device/software of classifier probing and refinement of clause A22, further comprising: modifying the subset of marked components by filtering the subset of marked components.

In some embodiments, the marked/chosen dimensions/components/elements/entries may constitute a local neighborhood. A random dimension and/or a random component in the random dimension may be chosen/marked. A local neighborhood of the random component in the random dimension may be chosen/marked.

Clause A29. The method/system/device/software of classifier probing and refinement of clause A22, further comprising: marking the subset of the components of the reference input data by: randomly selecting a component of the reference input data, and selecting a respective number of neighboring components in the reference input data near the randomly selected component to be included in the subset of marked components.

In some embodiments, "distance" between two matrix elements/components/entries of k-D matrix may be L1-distance (absolute distance), L2-distance (Euclidean distance), or Lk-distance between "coordinates" of the two matrix elements/components/entries. Distance may be needed to define neighborhood. L1 neighborhood may be a rectangular submatrix. L2 neighborhood may be circular.

Clause A30. The method/system/device/software of classifier probing and refinement of clause A29: wherein each input data is a k-dimensional (k-D) matrix, the input data being the reference input data or any perturbed input data; wherein each component of the input data is a matrix element of the k-D matrix; wherein a first matrix element of the k-D matrix is a neighboring component near a second matrix element of the k-D matrix if a distance between the two matrix elements is less than a threshold.

Clause A31. The method/system/device/software of classifier probing and refinement of clause A30: wherein the respective number of selected neighboring components in the reference input data comprise a local neighborhood of matrix elements of the k-D matrix near the randomly selected component.

In some embodiments, distance is needed to define neighborhood. An L1 neighborhood may be a rectangular submatrix. An L2 neighborhood may be circular.

Clause A32. The method/system/device/software of classifier probing and refinement of clause A31: wherein the sub-matrix is a k-D sub-matrix comprising the randomly selected component.

Clause A33. The method/system/device/software of classifier probing and refinement of clause A22, further comprising: selecting the respective number of neighboring components in the reference input data near the randomly selected component as the subset of marked components.

Clause A34. The method/system/device/software of classifier probing and refinement of clause A22, further comprising: for each reference input data and for each of the set of components of the respective reference input data: selecting a respective number of neighboring components in the reference input data near the respective component of the respective reference input data to be included in the subset of marked components associated with a respective perturbed input data.

Clause A35. The method/system/device/software of classifier probing and refinement of clause A34: wherein each input data is a k-dimensional (k-D) matrix, the input data being the reference input data or any perturbed input data; wherein each component of the input data is a matrix element of the k-D matrix; wherein a first matrix element of the k-D matrix is a neighboring component near a second matrix element of the k-D matrix if a distance between the coordinates of two matrix elements is less than a threshold.

Clause A36. The method/system/device/software of classifier probing and refinement of clause A35: wherein the respective number of selected neighboring components in the reference input data comprise a sub-matrix of matrix elements of the k-D matrix near the respective component of the respective reference input data.

Clause A37. The method/system/device/software of classifier probing and refinement of clause A36: wherein the sub-matrix is a (k2)-dimensional (k2-D) sub-matrix comprising the respective component, wherein k2<=k.

Clause A38. The method/system/device/software of classifier probing and refinement of clause A37: wherein the sub-matrix is a k-D sub-matrix comprising the respective component.

Clause A39. The method/system/device/software of classifier probing and refinement of clause A16, further comprising: selecting the respective number of neighboring components in the reference input data near the respective component of the respective reference input data as the subset of marked components associated with a respective perturbed input data.

Clause A40. The method/system/device/software of classifier probing and refinement of clause A1: wherein the classifier may comprise any of: support vector machine (SVM), kernel-based SVM, neural network (NN), deep neural network (DN), convolutional NN (CNN), recurrent NN (RNN), long short-term memory network (LSTM), deep belief network (DBN), generative adversarial network (GAN), conditional GAN (cGAN), transformer, encoder-decoder, denoising autoencoder (DAE), neural radiance field, radial basis function network, multilayer perceptron (MLP), or self organizing map (SOM).

The features described above may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., C. Java), including compiled or interpreted languages, and it may be deployed in any form, including as a stand-alone program or as a module, component, subroutine, a browser-based web application, or other unit suitable for use in a computing environment.

Suitable processors for the execution of a program of instructions include, e.g., both general and special purpose microprocessors, digital signal processors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

While the present teaching contains many specific implementation details, these should not be construed as limitations on the scope of the present teaching or of what may be claimed, but rather as descriptions of features specific to particular embodiments of the present teaching. Certain features that are described in this specification in the context of separate embodiments may also be implemented in combination in a single embodiment. Conversely, various features that are described in the context of a single embodiment may also be implemented in multiple embodiments separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Particular embodiments of the subject matter have been described. Any combination of the features and architectures described above is intended to be within the scope of the following claims. Other embodiments are also within the scope of the following claims. In some cases, the actions recited in the claims may be performed in a different order and still achieve desirable results. In addition, the processes depicted in the accompanying figures do not necessarily require the particular order shown, or sequential order, to achieve desirable results. In certain implementations, multitasking and parallel processing may be advantageous.

We claim:

1. A method performed by a system for wireless sensing with classifier probing and refinement, comprising:
in a probing phase of the system:
obtaining a plurality of raw measurement data by a sensing device of the system,
processing the plurality of raw measurement data by a processor of the system to construct a plurality of input data for a classifier,
performing a classification by the processor using the classifier by inputting each of the plurality of input data to the classifier,
computing a plurality of output analytics by the classifier based on the plurality of input data, each output analytics computed by the classifier based on a respective input data,
mapping the plurality of output analytics to a plurality of mapped outcome, each output analytics mapped to a respective mapped outcome,
identifying at least one reference input data each associated with a reference output analytics and a reference mapped outcome, each reference input data being one of the plurality of input data for the classifier for which a respective reference outcome is available and is different from the reference mapped outcome, and
for each reference input data for the classifier:
constructing a respective plurality of perturbed input data for the classifier by perturbing the reference input data, each perturbed input data constructed based on a respective perturbation of the reference input data,
performing the classification using the classifier by inputting each of the plurality of perturbed input data to the classifier,
computing a respective plurality of perturbed output analytics by the classifier based on the plurality of perturbed input data, each perturbed output analytics computed by the classifier based on a respective perturbed input data,
mapping the plurality of perturbed output analytics to a plurality of perturbed mapped outcome, each perturbed output analytics mapped to a respective perturbed mapped outcome,
comparing each perturbed mapped outcome with the reference outcome associated with the reference input data which is different from the reference mapped outcome, and
when at least one perturbed mapped outcome deviates from the reference mapped outcome such that it is the same as the reference outcome, selecting at least one selected perturbed input data each being one of the respective plurality of perturbed input data associated with one of the at least one perturbed mapped outcome as selected perturbed input data for re-training the classifier; and
in a re-training phase of the system:
re-training the classifier based on each of the at least one selected perturbed input data and the associated reference outcome,
wherein for each input data being the reference input data or any perturbed input data:
the input data is a k-dimensional (k-D) matrix,
each component of the input data is a matrix element of the k-D matrix,
a first matrix element of the k-D matrix is a neighboring component near a second matrix element of the k-D matrix if a distance between coordinates of the first matrix element and the second matrix element is less than a threshold.

2. The method of claim 1, further comprising:
for a particular reference input data for the classifier in the probing phase:
constructing a number of perturbed input data by perturbing the particular reference input data with an increasing degree of perturbation; and
selecting a particular selected perturbed input data from the number of perturbed input data, wherein the particular selected perturbed input data has a minimum degree of perturbation to the particular reference input data such that the associated perturbed mapped outcome is the same as a particular reference outcome associated with the particular reference input data.

3. The method of claim 2, further comprising:
for the particular reference input data for the classifier in the probing phase:
performing a search among the number of perturbed input data in search of the particular selected perturbed input data, wherein the search comprises one of: full exhaustive search, sequential search with early termination, binary search, or another fast search.

4. The method of claim 1, further comprising:
for a reference input data for the classifier in the probing phase:
selecting, based on a particular selected perturbed input data, at least one supplementary selected perturbed input data that is in a neighborhood of the particular selected perturbed input data; and
in the re-training phase:
re-training the classifier further based on the at least one supplementary selected perturbed input data.

5. The method of claim 4, wherein:
the at least one supplementary selected perturbed input data comprise at least one of a number of perturbed input data that (1) are next to the particular selected perturbed input data and (2) have a minimal decrease or increase of degree of perturbation compared with the particular selected perturbed input data.

6. The method of claim 1, further comprising:
receiving, by the sensing device, a wireless signal from a wireless device through a wireless channel of a venue, wherein the plurality of raw measurement data comprise a time series of channel information (TSCI) of the wireless channel obtained by the sensing device based on the received wireless signal.

7. The method of claim 1, further comprising:
mapping each output analytics to a respective mapped outcome based on at least one of: a nonlinear function of the output analytics, a vector quantization of the output analytics, or a thresholding of the output analytics.

8. The method of claim 1, further comprising:
for each of a plurality of perturbation types, constructing at least one perturbed input data by perturbing a reference input data based on the perturbation type.

9. The method of claim 1, further comprising:
constructing each input data for the classifier as a k-dimensional (k-D) matrix; and
constructing each perturbed input data as a k-dimensional matrix with a same size as the input data.

10. The method of claim 9, further comprising:
for each reference input data comprising a set of components, constructing each perturbed input data for the classifier based on the reference input data by:
marking a respective subset of the components of the reference input data to generate a respective subset of marked components, and
modifying the respective subset of marked components of the reference input data to construct the respective perturbed input data.

11. The method of claim 10, further comprising:
modifying a respective marked component of the reference input data by at least one of:
replacing the respective marked component by zero,
scaling a magnitude of the respective marked component, or
adding an additive distortion to the respective marked component.

12. The method of claim 10, further comprising:
modifying a respective marked component of the reference input data by at least one of:
adding an additive noise to the respective marked component; or
adding an additive distortion scaled by a scaling factor to the respective marked component, wherein the additive distortion is associated with a perturbation type and the scaling factor is associated with a perturbation size.

13. The method of claim 10, wherein marking the respective subset of the components of the reference input data to generate the respective subset of marked components comprises:
randomly selecting a component of the reference input data; and
selecting a respective number of neighboring components in the reference input data near the randomly selected component to be included in the respective subset of marked components.

14. The method of claim 13, wherein:
the respective number of selected neighboring components in the reference input data comprise a local neighborhood of matrix elements of the k-D matrix near the randomly selected component; and
the respective number of selected neighboring components in the reference input data are the respective subset of marked components.

15. The method of claim 13, wherein:
the respective number of selected neighboring components in the reference input data comprise a sub-matrix of matrix elements of the k-D matrix near the randomly selected component; and
the sub-matrix is a (k2)-dimensional (k2-D) sub-matrix comprising the randomly selected component, wherein $k2<=k$.

16. The method of claim 1, wherein the classifier comprises at least one of:
support vector machine (SVM), kernel-based SVM, neural network (NN), deep neural network (DN), convolutional NN (CNN), recurrent NN (RNN), long short-term memory network (LSTM), deep belief network (DBN), generative adversarial network (GAN), conditional GAN (cGAN), transformer, encoder-decoder, denoising autoencoder (DAE), neural radiance field, radial basis function network, multilayer perceptron (MLP), or self organizing map (SOM).

17. A system for wireless sensing with classifier probing and refinement, comprising:
  a sensing device configured to obtain a plurality of raw measurement data in a probing phase of the system; and
  a classifier comprising a memory and a processor configured in the probing phase of the system to:
    process the plurality of raw measurement data to construct a plurality of input data,
    perform a classification using each of the plurality of input data as input to the classifier,
    compute a plurality of output analytics based on the plurality of input data, each output analytics computed based on a respective input data,
    map the plurality of output analytics to a plurality of mapped outcome, each output analytics mapped to a respective mapped outcome,
    identify at least one reference input data each associated with a reference output analytics and a reference mapped outcome, each reference input data being one of the plurality of input data for the classifier for which a respective reference outcome is available and is different from the reference mapped outcome, and
    for each reference input data for the classifier:
      construct a respective plurality of perturbed input data for the classifier by perturbing the reference input data, each perturbed input data constructed based on a respective perturbation of the reference input data,
      perform the classification using each of the plurality of perturbed input data as input to the classifier,
      compute a respective plurality of perturbed output analytics based on the plurality of perturbed input data, each perturbed output analytics computed based on a respective perturbed input data,
      map the plurality of perturbed output analytics to a plurality of perturbed mapped outcome, each perturbed output analytics mapped to a respective perturbed mapped outcome,
      compare each perturbed mapped outcome with the reference outcome associated with the reference input data which is different from the reference mapped outcome, and
      when at least one perturbed mapped outcome deviates from the reference mapped outcome such that it is the same as the reference outcome, select at least one selected perturbed input data each being one of the respective plurality of perturbed input data associated with one of the at least one perturbed mapped outcome as selected perturbed input data for re-training the classifier,
  wherein the processor is configured to re-train the classifier based on each of the at least one selected perturbed input data and the associated reference outcome in a re-training phase of the system,
  wherein for each input data being the reference input data or any perturbed input data:
    the input data is a k-dimensional (k-D) matrix,
    each component of the input data is a matrix element of the k-D matrix,
    a first matrix element of the k-D matrix is a neighboring component near a second matrix element of the k-D matrix if a distance between coordinates of the first matrix element and the second matrix element is less than a threshold.

18. The system of claim 17, wherein the processor is further configured to:
  for a particular reference input data for the classifier in the probing phase:
    construct a number of perturbed input data by perturbing the particular reference input data with an increasing size of perturbation; and
    select a particular selected perturbed input data from the number of perturbed input data, wherein the particular selected perturbed input data has a minimum size of perturbation to the particular reference input data such that the associated perturbed mapped outcome is the same as a particular reference outcome associated with the particular reference input data.

19. The system of claim 18, wherein the processor is further configured to:
  for the particular reference input data for the classifier in the probing phase:
    perform a search among the number of perturbed input data in search of the particular selected perturbed input data, wherein the search comprises one of: full exhaustive search, sequential search with early termination, binary search, or another fast search.

20. The system of claim 17, wherein the processor is further configured to:
  for a reference input data for the classifier in the probing phase:
    select, based on a particular selected perturbed input data, at least one supplementary selected perturbed input data that is in a neighborhood of the particular selected perturbed input data; and
  in the re-training phase:
    re-train the classifier further based on the at least one supplementary selected perturbed input data.

21. The system of claim 17, wherein the processor is further configured to:
  map each output analytics to a respective mapped outcome based on at least one of: a nonlinear function of the output analytics, a vector quantization of the output analytics, or a thresholding of the output analytics.

22. The system of claim 17, wherein the processor is further configured to:
  construct each input data for the classifier as a k-dimensional (k-D) matrix; and
  construct each perturbed input data as a k-dimensional matrix with a same size as the input data.

23. The system of claim 22, wherein the processor is further configured to:
  for each reference input data comprising a set of components, construct each perturbed input data for the classifier based on the reference input data by:
    marking a respective subset of the components of the reference input data to generate a respective subset of marked components, and
    modifying the respective subset of marked components of the reference input data to construct the respective perturbed input data.

24. The system of claim 23, wherein the processor is further configured to:
  modify a respective marked component of the reference input data by at least one of:
    replacing the respective marked component by zero,
    scaling a magnitude of the respective marked component, or
    adding an additive distortion to the respective marked component.

25. The system of claim 23, wherein the processor is further configured to:
modify a respective marked component of the reference input data by at least one of:
adding an additive noise to the respective marked component; or
adding an additive distortion scaled by a scaling factor to the respective marked component, wherein the additive distortion is associated with a perturbation type and the scaling factor is associated with a perturbation size.

26. The system of claim 23, wherein marking the respective subset of the components of the reference input data to generate the respective subset of marked components comprises:
randomly selecting a component of the reference input data; and
selecting a respective number of neighboring components in the reference input data near the randomly selected component to be included in the respective subset of marked components.

27. A device for wireless sensing with classifier probing and refinement, comprising:
a receiver configured to obtain a plurality of raw measurement data in a probing phase of the device; and
a classifier comprising a memory and a processor configured in the probing phase of the device to:
process the plurality of raw measurement data to construct a plurality of input data,
perform a classification using each of the plurality of input data as input to the classifier,
compute a plurality of output analytics based on the plurality of input data, each output analytics computed based on a respective input data,
map the plurality of output analytics to a plurality of mapped outcome, each output analytics mapped to a respective mapped outcome,
identify at least one reference input data each associated with a reference output analytics and a reference mapped outcome, each reference input data being one of the plurality of input data for the classifier for which a respective reference outcome is available and is different from the reference mapped outcome, and
for each reference input data for the classifier:
construct a respective plurality of perturbed input data for the classifier by perturbing the reference input data, each perturbed input data constructed based on a respective perturbation of the reference input data,
perform the classification using each of the plurality of perturbed input data as input to the classifier,
compute a respective plurality of perturbed output analytics based on the plurality of perturbed input data, each perturbed output analytics computed based on a respective perturbed input data,
map the plurality of perturbed output analytics to a plurality of perturbed mapped outcome, each perturbed output analytics mapped to a respective perturbed mapped outcome,
compare each perturbed mapped outcome with the reference outcome associated with the reference input data which is different from the reference mapped outcome, and
when at least one perturbed mapped outcome deviates from the reference mapped outcome such that it is the same as the reference outcome, select at least one selected perturbed input data each being one of the respective plurality of perturbed input data associated with one of the at least one perturbed mapped outcome as selected perturbed input data for re-training the classifier,
wherein the processor is configured to re-train the classifier based on each of the at least one selected perturbed input data and the associated reference outcome in a re-training phase of the device,
wherein for each input data being the reference input data or any perturbed input data:
the input data is a k-dimensional (k-D) matrix,
each component of the input data is a matrix element of the k-D matrix,
a first matrix element of the k-D matrix is a neighboring component near a second matrix element of the k-D matrix if a distance between coordinates of the first matrix element and the second matrix element is less than a threshold.

28. The device of claim 27, wherein the processor is further configured to:
for a particular reference input data for the classifier in the probing phase:
construct a number of perturbed input data by perturbing the particular reference input data with an increasing degree of perturbation; and
select a particular selected perturbed input data from the number of perturbed input data, wherein the particular selected perturbed input data has a minimum degree of perturbation to the particular reference input data such that the associated perturbed mapped outcome is the same as a particular reference outcome associated with the particular reference input data.

29. The device of claim 27, wherein the processor is further configured to:
for a reference input data for the classifier in the probing phase:
select, based on a particular selected perturbed input data, at least one supplementary selected perturbed input data that is in a neighborhood of the particular selected perturbed input data; and
in the re-training phase:
re-train the classifier further based on the at least one supplementary selected perturbed input data.

30. The device of claim 27, wherein the processor is further configured to:
map each output analytics to a respective mapped outcome based on at least one of: a nonlinear function of the output analytics, a vector quantization of the output analytics, or a thresholding of the output analytics.

* * * * *